US007277797B1

(12) United States Patent
Kunitsyn et al.

(10) Patent No.: US 7,277,797 B1
(45) Date of Patent: Oct. 2, 2007

(54) PREDICTION SYSTEM AND METHOD

(76) Inventors: Viatcheslav E. Kunitsyn, M. Dzhaliya Street, 23/56, Apt. 159, Moscow,115580 (RU); Andre V. Smirnov, 4697 S. Hampton Cir., Boulder, CO (US) 80301; Douglas A. Rekenthaler, 3400 Jennings Chapel Rd., Woodbine, MD (US) 21797-7510

( * ) Notice: Subject to any disclaimer, the term of this patent is extended or adjusted under 35 U.S.C. 154(b) by 0 days.

(21) Appl. No.: 11/391,329

(22) Filed: Mar. 29, 2006

Related U.S. Application Data

(60) Provisional application No. 60/665,858, filed on Mar. 29, 2005.

(51) Int. Cl.
*G01V 1/28* (2006.01)
(52) U.S. Cl. ...................................... 702/15
(58) Field of Classification Search ................ 702/15, 702/2, 3, 4
See application file for complete search history.

(56) References Cited

U.S. PATENT DOCUMENTS

| 3,136,943 | A | 6/1964 | Slichter |
| 4,825,165 | A | 4/1989 | Helms et al. |
| 5,811,974 | A | 9/1998 | Hata |
| 6,229,479 | B1 | 5/2001 | Kozlov et al. |
| 6,246,964 | B1 | 6/2001 | Blaunstein |
| 6,859,416 | B2 * | 2/2005 | Inubushi ................. 367/14 |
| 6,873,265 | B2 * | 3/2005 | Bleier ..................... 340/690 |
| 2003/0052777 | A1 * | 3/2003 | Bleier ..................... 340/540 |
| 2004/0093161 | A1 * | 5/2004 | Inubushi ................. 702/2 |

OTHER PUBLICATIONS

Edward L. Afraimovich, et al., "The use of GPS arrays in detecting the ionospheric response during rocket launchings," Earth Planets Space, 52, 1061-1066, 2000.
E.L. Afraimovich, et al., "Geomagnetic control of the spectrum of traveling ionospheric disturbances based on data from a global GPS network," Annales Geophysicae, 19: 723-721, 2001.
E.L. Afraimovich, et al., "The shock-acoustic waves generated by earthquakes," Annales Geophysicae, 19: 395-409, 2001.
R.R. Ahmadov, et al., "Simulation of generation and propagation of acoustic gravity waves in the atmosphere during a rocket flight," International Journal of Geomagnetism and Aeronomy, vol. 5, G12002, doi: 10.1029/2004GI000064, 2004.
E.S, Andreeva et al., "Radiotomographical Detection of Ionosphere Disturbances Caused by Ground Explosions," Cosmic Research, vol. 39, No. 1, 2001, pp. 10-14.

(Continued)

*Primary Examiner*—Donald E McElheny, Jr.
(74) *Attorney, Agent, or Firm*—Dickstein Shapiro LLP

(57) ABSTRACT

Method and apparatus to predict the onset of earthquakes, one to three days prior to the event. Predictions of latitude, longitude, and time of occurrence of an incipient earthquake, by monitoring and exploiting unique changes in the ionosphere and atmosphere, may be obtained. The methodology, focused on radio-tomography of the ionosphere, includes data receiving, transmission, and analysis stations on the earth's surface; data from satellite transmitters; and mechanisms to extract earthquake-related signatures that are correlated, processed, interpreted, and disseminated as warnings from central analysis centers. Additionally, data from ground-based radars that display unique clutter maps during earthquake pre-cursor activity and data from cellular telephone networks that display signal fading may also be used.

22 Claims, 17 Drawing Sheets

OTHER PUBLICATIONS

D.N. Arabelos, et al., "Atmospheric tide disturbances as Earthquake precusory phenomena," Natural Hazards and Earth System Sciences, 4: 1-7, 2004.
Juliette Artru, et al., "Normal modes modeling of post-seismic ionospheric oscillations," Geophysical Research Letters, vol. 28, No. 4, pp. 697-700, Feb. 15, 2001.
Juliette Artru, et al., "Acoustic waves generated from seismic surface waves: propagation properties determined from Doppler sounding observations and normal-mode modeling," Geophys. J. Int. 158, 1067-1077, 2004.
P.F. Biagi, et al., "Possible earthquake precursors revealed by LF radio signals, " Natural Hazards and Earth System Sciences, 1: 99-104, 2001.
P.F. Biagi, et al., "VLF-LF radio signals collected at Bari (South Italy): a preliminary analysis on signal anomalies associated with earthquakes," Natural Hazards and Earth System Sciences, 4: 685-689, 2004.
PROF. Bruce A. Bolt, "Seismic Air Waves from the Great 1964 Alaskan Earthquake," Nature, No. 4937, pp. 1095-1096, Jun. 13, 1964.
N. Borisov, et al., "A new ionospheric mechanism of electromagnetic ELF precursors to earthquakes, "Journal of Atmospheric and Solar-Terrestrial Physics, 63, pp. 3-10, 2001.
Eric Calais, et al., "GPS detection of ionospheric perturbations following the Jan. 17, 1994, Northridge earthquake," Geophysical Research Letters, vol. 22, No. 9, pp. 1045-1048, May 1, 1995.
Eric Calais et al., "GPS, earthquakes, the ionosphere, and the Space Shuttle," Physics of the Earth and Planetary Interiors, 105, pp. 167-181, 1998.
E. Calais, et al., "Detection of ionospheric perturbations using a dense GPS array in Southern California," Geophysical Research Letters, vol. 30, No. 12, 1628, doi:10.1029/2003GL017708, 2003.
Vesna Ducic, "Ionospheric remote sensing of the Denali Earthquake Rayleigh surface waves," Geophysical Research Letters, vol. 30, No. 18, 1951, doi: 10.1029/2003GL017812, 2003.
K. Eftaxias, et al., "Experience of short term earthquake precursors with VLF-VHF electromagnetic emissions," Natural Hazards and Earth System Sciences (2003), 3: 217-228, 2003.
Article in Russian, pp. 120-131.
T. Joseph Fitzgerald, "Observations of total electron content perturbations on GPS signals caused by a ground level explosion," Journal of Atmospheric and Solar-Terrestrial Physics, vol. 59, No. 7, pp. 829-834, 1997.
Samuel H. Francis, "Global propagation of atmospheric gravity waves: A review," Journal of Atmospheric and Terrestrial Physics, vol. 37, pp. 1011 to 1054, 1975.
Article in Russian, pp. 451-467.
Robert J. Geller, "Earthquake prediction: a critical review," Geophys. J. Int. (1997) 131, 425-450.
Article in Russian, pp. 95-108.
Article in Russian, pp. 52-55.
Article in Russian, pp. 67-69.
V. Grimalsky, et al., "Acoustic and Acousto-Gravity Wave Pulses Caused by Sources of a Seismic Origin," Geophysical Research Abstracts, vol. 5, 04514, 2003.
Kosuke Heki, "Ionospheric Perturbation by the Surface Wave of the 2003 Tokachi-Oki Earthquake (MJMA=8.0) Detected Using a Dense GPS Array."
Masashi Kamogawa, "Atmospheric Field Variations before the Mar. 31, 2002 M6.8 Earthquake in Taiwan," TAO, vol. 15, No. 3, 397-412, Sep. 2004.
E. Kazimirovsky, et al., "Effects on the Ionosphere Due to Phenomena Occurring Below It," Surveys in Geophysics, 24: 139-184, 2003.
V.I. Keilis-Borok, et al., "Premonitory patterns of seismicity months before a large earthquake : Five case histories in Southern California," PNAS, 16562-16567, vol. 99, No. 26, Dec. 24, 2002.
J. Kouba, "Measuring Seismic Waves Induced by Large Earthquakes with GPS, " Stud. Geophys. Geod., 47 (2003), 741-755.
V. Kunitsyn, "Improved radio occultation sounding of the Arctic atmosphere using simulations with a high resolution atmospheric model," Physics and Chemistry of the Earth 29 (2004) 277-286.
V.E. Kunitsyn, et al., "Ionosphere Radio Tomography Using High-Orbit Navigation Systems," Moscow University Physics Bulletin, vol. 60, No. 1, pp. 94-108, 2005.
Article in Russian, pp. 87-93.
Y.Q. Li, et al., "The blast wave of the Shuttle plume at ionospheric heights," Geophysical Research Letters, vol. 21, No. 24, pp. 2737-2740, Dec. 1, 1994.
Article in Russian, pp. 314-317.
V.A. Liperovsky, et al., "Modification of Sporadic E-Layers Caused by Seismic Activity," Surveys in Geophysics, 21: 449-486, 2000.
J.Y. Liu, et al., "A study on the TEC perturbations prior to the Rei-Li, Chi-Chi and Chia-Yi earthquakes," 11 pgs.
J.Y. Liu, et al., "Pre-earthquake ionospheric anomalies registered by continuous GPS TEC measurements," Annales Geophysicae (2004) 22: 1585-1593.
O. Molchanov, "Preseismic ULF electromagnetic effect from observation at Kamchalka," Natural Hazards and Earth System Sciences (2003) 3: 203-209.
O. Molchanov, "Lithosphere-atmosphere-ionosphere coupling as governing mechanism for preseismic short-term events in atmosphere and ionosphere," Natural Hazards and Earth System Sciences (2004) 4: 757-767.
V.A. Morgounov et al., "Spatial Scale of the Mosaicity of Electromagnetic Emission Precursors," Physics of the Solid Earth, vol. 39, No. 11, 2003, pp. 885-897.
SH. Naaman, et al., "Comparison of simultaneous variations of the ionospheric total electron content and geomagnetic field associated with strong earthquakes," Natural Hazards and Earth System Sciences (2001) 1: 53-59.
Tadanori Ondoh, "Anomalous sporadic-E layers observed before M 7.2 Hyogo-ken Nanbu earthquake; Terrestrial gas emanation model," Adv. Polar Upper Atomos. Res. 17, 96-108, 2003.
V.V. Plotkin, "GPS detection of ionospheric perturbation before the Feb. 13, 2001, El Salvador earthquake," Natural Hazards and Earth System Sciences (2003) 3: 249-253.
K.V. Popov, "On Precursors of Earthquakes with Scaled of 2-3 Hours in F-Region of Ionosphere," Geophysical Research Abstracts, vol. 5, 08416, 2003.
Pulinets and Boyarchuk, "Chapter 5 Main Phenomenological Features of Ionospheric Precursors of Earthquakes," pp. 173-205.
S.A. Pulinets, "Seismic Activity as a Source of the Ionospheric Variability," Adv. Space Res. vol. 22, No. 6, pp. 903-906, 1998.
S.L. Shalimov, "Lithosphere-ionosphere relationship: A new way to predict earthquakes?," pp. 252-254, Dec. 1992.
A.V. Shvets et al., "Results of subionospheric radio LF monitoring prior to the Tokachi (M=8, Hokkaido, Sep. 25, 2003) earthquake," Natural Hazards and Earth System Sciences (2004) 4: 647-653.
A. Ya. Sidorin, "Search for earthquake precursors in multidisciplinary data monitoring of geophysical and biological parameters," Natural Hazards and Earth System Sciences (2003) 3: 153-158.
A.S. Silina, "Ionospheric phenomena before strong earthquakes," Natural Hazards and Earth System Sciences, (2001) 1: 113-118.
P. Varotsos et al., "Physical Properties of the Variations of the Electric Field of the Earth Preceding Earthquakes, I," Tectonophysics, 110 (1984) 73-98.
P. Varotsos, et al., "Physical Properties of the Variations of the Electric Field of the Earth Preceding Earthquakes. II. Determination of Epicenter and Magnitude," Tectronophysics, 110 (1984) 99-125.
P.Varotsos et al., "Physical properties of the variations in the electric field of the earth preceding earthquakes, III," Tectronophysics, 136 (1987) 335-339.
E.F. Vershinin et al., "Correlations of Seismic Activity with Electromagnetic Emissions and Variations in Kamchatka Region," pp. 23-24.
Article in Russian, pp. 20-31.
Max Wyss, "Second Round of Evaluations of Proposed Earthquake Precursors," Pure appl. geophys. 149 (1997) 3-16.
V.E. Kunitsyn, et al., "Ionospheric Tomography," 1) Introduction 2) Contents 3) 2. Ray Radio Tomography, pp. 21-72. 4) 5. Statistical Radio Tomography of a Randomly Inhomogeneous Ionosphere.

* cited by examiner

FROM FIG.15C

ESTIMATE THE EARTHQUAKE OCCURRENCE PROBABILITY BY CONSTRUCTING THE FUNCTIONAL OF AN EARTHQUAKE CONTAINING INFORMATION ABOUT THE CHARACTERISTICS AND PARAMETERS OF THE IONOSPHERE AND ATMOSPHERE WITHIN A GIVEN SEISMIC REGION BY CONSTRUCTING THE PREDICTOR WITH AND ITERATIVE, SELF-LEARNING PROCEDURE, USING ALL AVAILABLE INFORMATION ABOUT ALL PREVIOUS STRONG EARTHQUAKES IN A GIVEN REGION, ARCHIVAL DATA, LESSONS LEARNED IN THE COURSE OF SUCCESSFUL AND FAILED PREDICTIONS, AND DRAWING ON INFORMATION ABOUT SUBSEQUENT EARTHQUAKES —438

CLUTTER RADAR ANALYSIS —440

CELLULAR TELEPHONE SIGNAL FADING —450

STOP

FIG. 15D

PREDICTION SYSTEM AND METHOD

This application claims priority from provisional application No. 60/665,858, filed Mar. 29, 2005, which is hereby incorporated by reference in its entirety.

FIELD OF THE INVENTION

The present invention relates to a method and apparatus for predicting the geo-position and time of incipient earthquakes during the earthquake preparation stage, accomplished by monitoring and exploiting anomalous changes in the physical characteristics of the atmosphere and ionosphere.

BACKGROUND

Heretofore, there has been no capability to accurately and timely predict earthquakes. The preponderance of private, university, and government research monies dedicated to earthquakes have been expended on seismological studies, with only negligible funding of alternative concepts. The seismological work has focused on statistical predictions and understanding of seismic and geological process. Those types of statistics have resulted in forecasts such as "a magnitude 7 earthquake is likely to occur within the next decade in Southern California." Predictions of that nature are of little practical value in terms of human activity: there is no inducement to evacuate buildings based on that kind of prediction. Predictions of incipient earthquakes, which are more than a few days or tens of hours in the future are rightly ignored. Conversely, predictions, which provide scant seconds, also preclude effective response. To be truly useful for preservation of life and property, predictions must have several features:

(1) Geo-positional precision. That is, a prediction must forecast the latitude and longitude of the forthcoming event with sufficient accuracy so that economically efficient response is realizable. It is wasteful to forecast an earthquake for "Southern California" if the forecast could be further refined to "the region centered on a specific locale, and the area around that locale to a distance of 5 kilometers." The latter forecast can be acted upon. An invocation to evacuate Southern California cannot.

(2) Temporal accuracy. There is little or no utility in forecasting an earthquake to occur in weeks or months, or in seconds. Humanity responds to warnings of days, hours, and minutes—outside those parameters predictions lose practical utility.

(3) Accurate prediction of magnitude of the incipient earthquake. Earthquakes over magnitude 5 are inherently dangerous to persons and property.

(4) Low false alarm rate and a correlatively high probability of accurate prediction. False alarms are counterproductive. There must be a high probability of accurate prediction, with a commensurately low false alarm rate. If predictions are made for earthquakes to occur with a weekly frequency, the predictions will be wrong most of the time, and the public will be dissuaded from responding to the frequent errors in prediction.

(5) Reliable, sustainable, and realistic physics-based predictions. The use of barking dogs, nervous cats, falling water levels in wells, and other sporadic phenomena are often cited as good indicators of an impending earthquake. None of those techniques (and many others) could be construed as reliable methods for earthquake prediction. A viable earthquake prediction system must be commensurate with trust, based on demonstrated success, reliable operation, and a foundation in physics.

As is discussed further below, embodiments of the present invention are based principally on the use of radio-tomographic techniques to discriminate earthquake pre-cursors, which manifest themselves in the ionosphere and atmosphere. In particular, noticeable changes (most often - reduction) in the electron density occur in ionospheric regions above an area where an earthquake is imminent. These often appear a few days before the event occurs. Uniqueness of particular irregularities in electron density and turbulence in the ionosphere above the earthquake's eventual epicenter, as well as other ionospheric phenomena appear. Such observations have been made by ionosondes, satellites, and other experimental means, none of which are capable of spatially imaging the electron density distribution.

Based on such data it is impossible to divorce the ionospheric effect of earthquake preparation processes from a multitude of "natural" non-seismic processes in the ionosphere, such as those processes caused by the influence of the sun and cosmic effects. Ionosondes are incapable of discerning the fine spatio-temporal structures in the ionosphere, which uniquely identify earthquake-precursor-related anomalies. A method of the present invention uses three-dimensional ("3D") and two-dimensional ("2D") tomographic images, which makes it possible to study the spatial structure of ionospheric disturbances and to separate the ionospheric effects of earthquake preparation from other solar and terrestrial influences. Prior techniques all fail to do this, and thus fail to deliver viable earthquake prediction capabilities.

SUMMARY

The present invention relates to a method of earthquake prediction which is reliable, inexpensive, and has a negligible false alarm rate.

The present invention may also be used to provide warnings of the impending arrival of tsunamis and aid in predicting the tracks of hurricanes.

The present invention may also be used to provide warnings of large entity events.

The present invention provides a prediction of the incipient earthquake's geo-position with an approximate 10 to 30 kilometer radius of uncertainty.

The present invention provides warnings on the order of one to three days prior to an earthquake.

The present invention provides predictions of earthquakes at magnitudes five and above.

The present invention has demonstrated a negligible false alarm rate, while accurately predicting every earthquake above magnitude 5, occurring in Southern California over a 60 day demonstration period.

The present invention generally relates to a method and apparatus for predicting earthquakes by monitoring changes in the ionosphere with radio-tomographic means, supplemented in other embodiments for improved geo-positional accuracy by radar and cellular telephone signal fading, which are evident shortly before the earthquake's occurrence. More specifically, the present invention relates to monitoring the ionosphere on a continuous basis, using ground stations to record the signals from satellites such as the Global Positioning System, processing those signals to discern the evolution of anomalous signatures that are uniquely indicative of an incipient earthquake, and using the early warning from the ionospheric anomalies to further refine the location of the incipient earthquake by monitoring anomalous signatures evident on Nexrad (and similar) radar returns, as well as cellular telephone signal fading.

According to the National Earthquake Information Center, an average of 22,000 people die, worldwide, in earthquakes and earthquake-related events each year. Some years show significantly more deaths, injuries, and property damage. The undersea earthquake, which precipitated the Sumatra tsunami is a case in point, with current estimates of the number dead near 300,000. The 2005 earthquake in Northern Pakistan is likely to cause a comparable number of casualties due to indirect results—cold, starvation, lack of shelter—end effects of the earthquake itself. Estimates of the cost of an earthquake in Los Angeles run into the tens of billions of dollars, and the loss of life could equal the numbers cited for the Asian casualties.

The invention responds to a long-felt need in the field. The United States Geological Survey has taken the position that "it is impossible to predict earthquakes," and the best that can be hoped for is to mitigate losses through improved construction techniques, inter alia. That posture is clearly incorrect in view of the present invention. Many other investigators have attempted to predict earthquakes, universally without success in terms of consistency, reliability, pragmatic utility, and other pertinent factors. Minutes, hours, or days of warning (i.e., reliable warning) could significantly mitigate those losses. The present invention provides the capability and opportunity to do exactly that.

Novel features the invention include (a) the ability to predict earthquakes one to three days before an event, giving it pragmatic utility in terms of time to evacuate or take other measures to prevent property loss and harm to persons; (b) accurate predictions: where tested, the invention has a virtually perfect record of predictions with no false alarms; (c) predictions over a broad geographic region - not predictions at a single point—predictions from the present invention can be made for the entire West coast of the United States, for example; and (d) predictions consisting of the time, location (with high geo-positional accuracy), and magnitude of the forthcoming event. Elements of the invention utilize acoustic gravity waves, internal gravity waves, solitions, solitary waves, total electron content, man-made and natural noise sources, magnetospheric influences, archival records, seasonal affects, phase, amplitude, and frequency fluctuations in the ionosphere, perturbations in the atmosphere, and the time-values of the above parameters, since they change rapidly; and, in some embodiments, the invention uses cellular telephone signal fading, radar, and satellite transmissions through the ionosphere to provide time, position, and magnitude of impending earthquakes.

Those skilled in the art of the field of the invention will immediately recognize that the invention is not limited to earthquake prediction. It also applies to detection of large entity events such as "seaquakes," earthquakes occurring at sea, and the resulting tsunamis which may result from such seaquakes. Furthermore, because such seaquakes induce infrasonic surges which travel along the channel at the bottom of the sea, at a faster transit speed than the surface tsunami wave, there are effects at the littoral sea/land surface boundaries where the tsunamis may eventually strike, and those effects, characterized in part by out-gassing of unique aerosols, can be discriminated by the present invention. Thus, the present invention may predict earthquakes, seaquakes, and tsunamis.

The invention also aids in determining the probable track of hurricanes, another large entity event. The inventors have demonstrated that the track of hurricane Ivan passed directly over the site of, and at the time of, a magnitude 5 seaquake north of Venezuela, pausing for an extended time over the site of the quake. The seaquake preparation process "captured" the track of the hurricane for a substantial period of time. This track could have been predicted by the present invention.

Definitions. As used herein, the following definitions apply:

"RTI" means radio-tomography of the ionosphere, accomplished by reception of multi-frequency signals from orbiting satellites, measurement of changes in those signals which are caused by the perturbations in the ionospheric signal path, and computation of the 4-dimensional (time and space position information) electron content characteristic of the ionosphere in a region of interest. The RTI methodology uses signals and data from either high orbiting signal sources (GPS, GLONASS, and others), or low orbiting satellite signal sources (Transit, NNSS, and others), or both in the preferred embodiment of the present invention.

"Geospheric" means lithospheric, atmospheric, tropospheric, ionospheric, and magnetospheric.

"Geo-position" means the latitude and longitude of an incipient earthquake. The invention predicts the geo-position of an earthquake, based on the earthquake pre-cursors, in terms of the probable latitude and longitude, typically within a range of ten to thirty kilometers.

"Earthquake prediction" means the invention's forecast of an expected earthquake event comprising a zone of uncertainty (approximately 10 to 30 kilometers from the anticipated epicenter), an expected time window (typically one to three days prior to the earthquake, down to a few hours), and an estimated event magnitude (typically 4.0 or greater).

"HORT" means High Orbiting Radio-Tomopraphy and the process by which the invention uses GPS, Glonass, Galileo (or other future) high orbiting satellite systems for RTI.

"LORT" means Low Orbiting Radio-Tomography and the use of Transit, or other current and future low orbiting satellites systems for RTI.

"EM" means Electro-Magnetic.

"EME" means EM emissions.

"VLF" means very low frequency.

"VHF" means very high frequency.

"UHF" means ultra-high frequency.

"LF" means low frequency.

"ULF" means ultra-low frequency.

"ELF" means extremely low frequency.

"GPS" means the United States Global Positioning System, which provides free access to dual frequency transmissions, which are suitable for the HORT version of RTI according to the present invention.

"GLONASS" means the Russian satellite system, which is equivalent to the GPS.

"GALILEO" means the proposed European satellite system, which will be equivalent to the GPS.

"NNSS" means the Navy Navigation Satellite System (Transit system) satellites, and their equivalent, which typify the LORT version of RTI according to the present invention. "Transit" is another name for the NNSS.

"AGW" means the Acoustic Gravity Wave modeling method, which is used by the present invention.

"IGW" means the Internal Gravity Wave modeling method, which is used by the present invention.

"Ionosphere" means the region of space at an altitude of 50 to 1,000 kilometers above the earth's surface.

"Atmosphere" means the region of space from the earth's surface to 10 kilometers in altitude.

"TEC" means the total electron content in a region of the ionosphere, as determined by the present invention's RTI processes and apparatus.

"K&T" refers to the book by Kunitsyn and Tereschenko, titled *Ionospheric Tomography*, Springer-Verlag (2003). Some of the mathematical techniques, physics, algorithms, and methods contained in the K&T book are referred to at various points in this disclosure and are hereby incorporated by reference.

"Nexrad" refers to the radars and network of weather radars which provide coverage of the US and coastal areas.

"K-Radar" means a continuous wave, amplitude-modulated, 3-frequency, K-band (35 Gigahertz) radar constructed in accordance with an embodiment of the invention. This radar transceives with three frequencies centered close to 35 GHz. It has polarization diversity and cross-polarization capability, and thus provides multiple combinations of wavelength and polarity for clutter analysis.

"CTSF" means cellular telephone signal fading. Fading and increased noise levels in cellular telephone signals may be measured either at a cellular telephone system transceiver node, or at a cellular telephone. Increased noise and correlative signal fading are often in evidence as pre-cursors to earthquakes, and in some circumstances may delimit the predicted geo-position and time of an incipient earthquake.

BRIEF DESCRIPTION OF THE DRAWINGS

The foregoing and other advantages and features of the invention will become more apparent from the detailed description of exemplary embodiments provided below with reference to the accompanying drawings in which:

FIGS. 15*a*-15*d* illustrate a prediction method according to embodiments of the invention.

DETAILED DESCRIPTION

Figure 1:
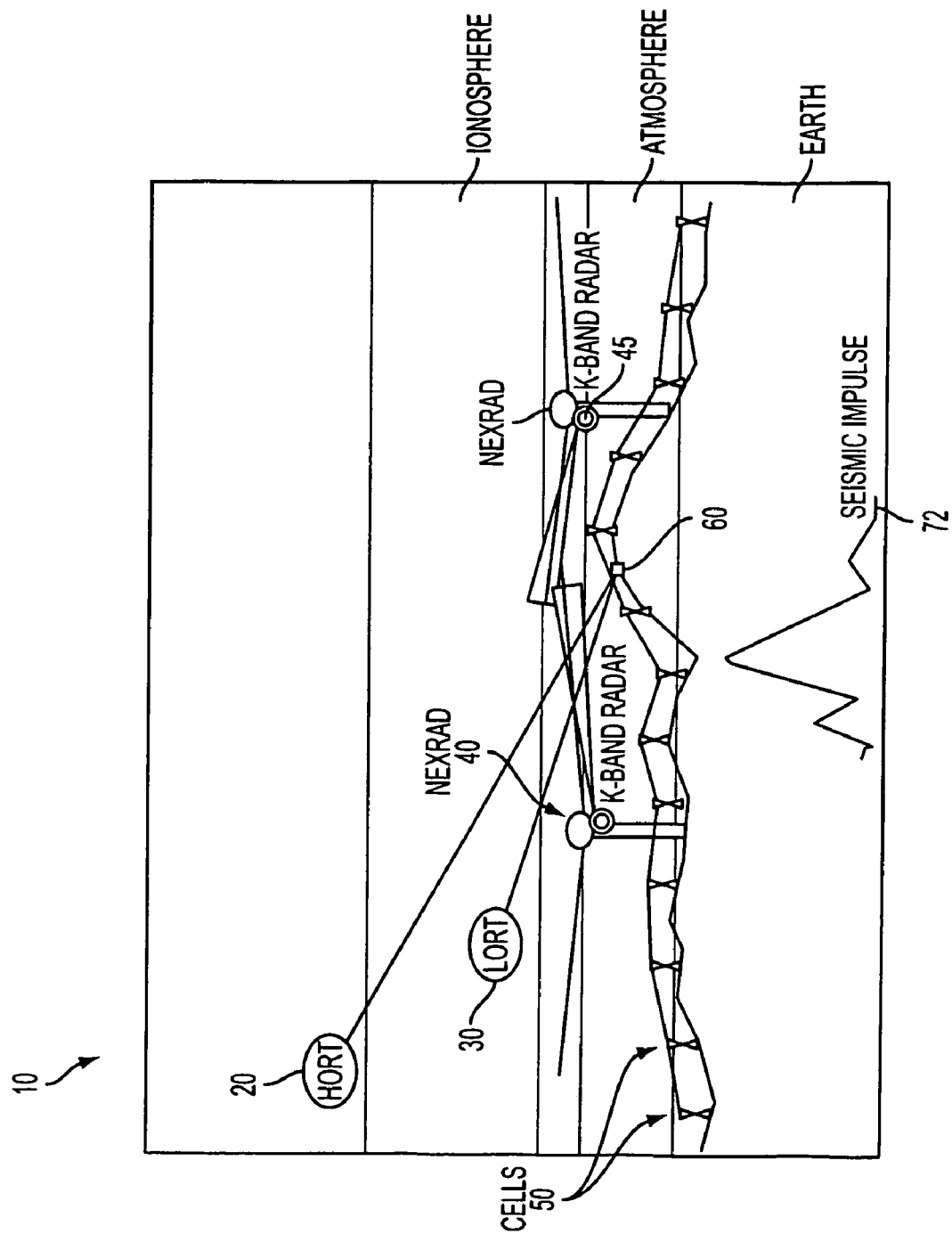
FIG. 1 is a diagram of a prediction system according to an embodiment of the invention.

The novelty of the present invention lies in (a) the ability to predict earthquakes one to three days before an event, giving it pragmatic utility in terms of time to evacuate or take other measures to prevent property loss and harm to persons; (b) accuracy of predictions: where tested, the present invention has a virtually perfect record of predictions with no false alarms; (c) predictions over a broad geographic region—not predictions at a single point; and (d) predictions consist of the time, location (with high geo-positional accuracy), and magnitude of the forthcoming event.

In addition, the elements comprising the invention prediction process encompasses acoustic gravity waves, internal gravity waves, solitions, solitary waves, total electron content, man-made and natural noise sources, magnetospheric influences, archival records, seasonal affects, phase, amplitude, and frequency fluctuations in the ionosphere, perturbations in the atmosphere, and the time-values of the above parameters, since they change rapidly and, in some embodiments, innovative use is made of cellular telephone signal fading, radar, and satellite transmissions through the ionosphere to provide time, position, and magnitude of impending earthquakes. Many conceptual predictors have been offered by previous researchers in this field, yet none have succeeded in even a few of the measures the present invention does. Many others have conceived of ways to predict: almost none have demonstrated success with real world, actual earthquakes.

Those skilled in the art of the present invention will immediately recognize that the invention is not limited to earthquake prediction. It also applies to detection of large entity events such as "seaquakes," earthquakes occurring at sea, and the resulting tsunamis, which may result from such seaquakes. Furthermore, because such seaquakes induce infrasonic surges which travel along the channel at the bottom of the sea, at a faster transit speed than the surface tsunami wave, there are effects at the littoral sea/land surface boundaries where the tsunamis may eventually strike, and those effects, characterized in part by out-gassing of unique aerosols, can be discriminated by the invention. Thus, the present invention may predict earthquakes, seaquakes, and tsunamis.

The present invention also aids in determining the probable track of hurricanes, another large entity event. The inventors have demonstrated that the track of hurricane Ivan passed directly over the site of, and at the time of, a magnitude 5 seaquake north of Venezuela, pausing for an extended time over the site of the quake. The seaquake preparation process "captured" the track of the hurricane for a substantial period of time. This track could have been predicted by the present invention.

The present invention includes a method and apparatus for predicting earthquakes, and other large entity events (i.e., seaquakes, tsunamis and hurricane tracks) where the resulting predictions will provide timely (one to three days, to a few hours of warning time), of the expected geo-positional and temporal nature of the incipient event.

Figure 2:
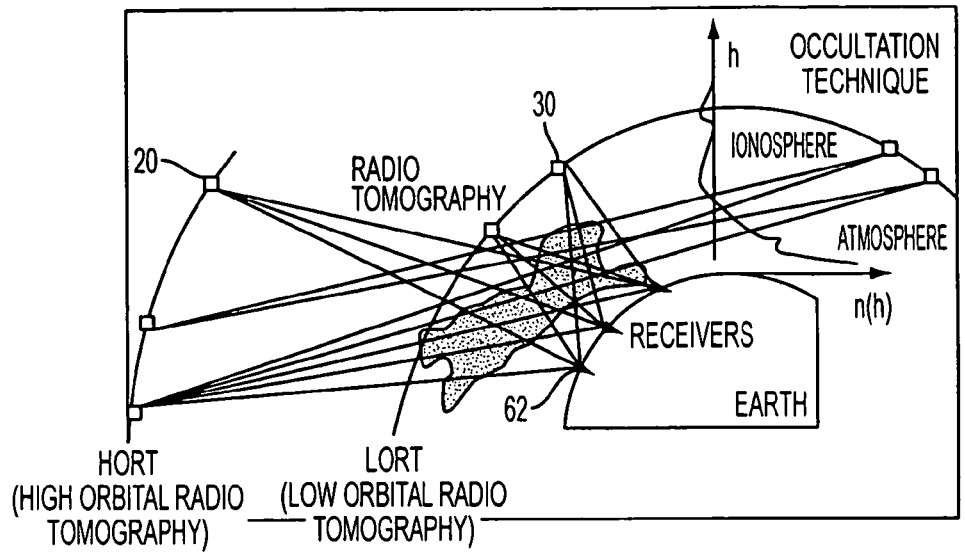
FIGS. 2-3 illustrate portions of the FIG. 1 system.
Figure 3:
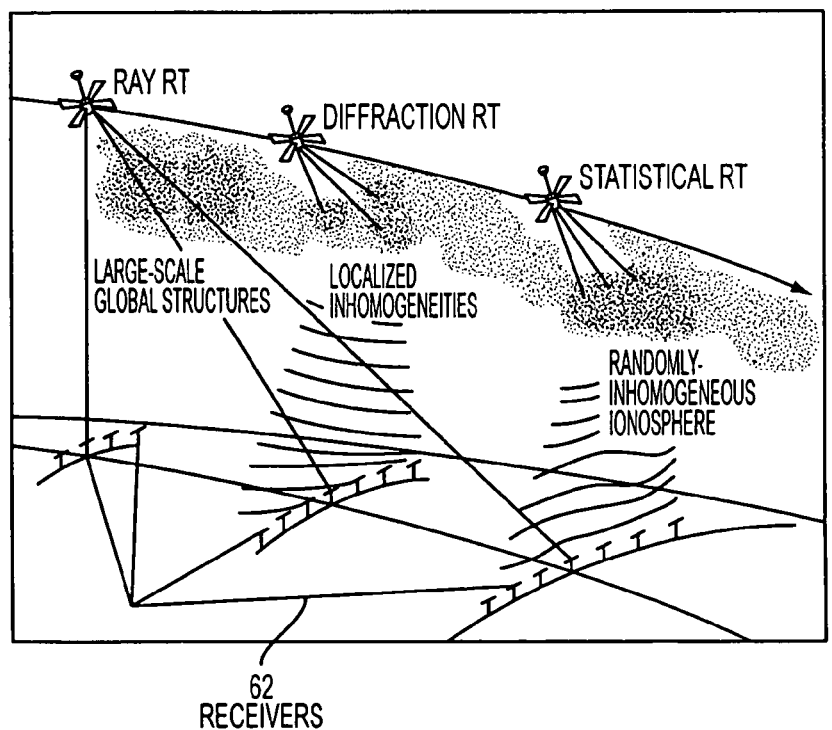

As is illustrated in FIGS. 1-3, the present invention concerns a system 10 comprising four methods of predicting earthquakes. The techniques include HORT 20, LORT 30, radar clutter analysis using Nexrad 40 and/or a K-band radar 45 constructed in accordance with the invention, and cellular telephone signal fading analysis at various cell sites (cells) 50. An analysis center 60 is used to process information from the system components, received at various receiving sites (receivers) 62, in an effort to predict a seismic event 72 (shown as an impulse). As will be described further, two of the techniques, HORT 20 and LORT 30, are functionally related, while the others are supportive of HORT 20 and/or LORT 30. The supportive predictive techniques are referred to herein as "cellular telephone signal fading" (CTSF) and "radar clutter" (also referred to as "Nexrad" technique).

The above techniques are specified and described below in much more detail: their interrelationship in terms of warning times for incipient earthquakes is shown below in Table 1.

TABLE 1

Relationship between prediction techniques and the warning times.

| | | Warning Time | | | | | | |
|---|---|---|---|---|---|---|---|---|
| | Channels | 3 days | 2 days | 1 day | 12 hours | 6 hours | 3 hours | EQ |
| Method for exploiting anomalous changes in the ambient environment | HORT | X | X | X | X | X | X | |
| | LORT | X | X | X | X | X | X | |
| | Nexrad | | | X | X | X | X | |
| | K radar | | | | | X | X | X |
| | CTSF | | | | | | X | X |

All of the techniques share certain common aspects and may exploit similar principles to one extent or another. Such shared aspects include the use of IBM personal computers for computations, communications over the internet, data recording and transmission, and the other functions described below.

Over the past 15 years, radio tomography of the ionosphere (RTI) methods have been developed which are capable of reconstructing the spatial distribution of the ionospheric electron density using dual-frequency signal data from satellites whose data transmissions transit the ionosphere. The existing low-orbital (LO or LORT) satellite navigational systems (like the Russian Tsikada and American Transit satellites—Navy Navigational Satellite System, with nearly circular orbits at altitudes of 1000-1150 km) and a set of ground-based receivers make it possible to determine linear integrals of ionospheric refractivity along the rays from a satellite to receivers and to create a series of tomographic images. The high velocity of satellite motion (~7.9 km/s) and, correspondingly rapid (as compared to the typical time scales of variations in the studied ionospheric processes) crossing of the studied regions by a satellite allow determination of two-dimensional sections of electron density in a plane containing the satellite path.

As a rule, the length of an RTI record is 10-15 minutes. Important advantages of a method of ray tomography of the ionosphere are relative simplicity of its implementation and high spatial-temporal resolution, provided that the number of receiving points is sufficient. In the inventors' RTI experiments, two coherent satellite signals at 150 and 400 MHz and the phase difference between these signals (the reduced phase) are measured at a chain of several ground receivers arranged along the ground projection of the satellite path and spaced a few hundreds of kilometers apart. With these systems it is possible to obtain RTI models and reconstructions of sections of the ionosphere within a region of one to three thousand square kilometers in less than 15 minutes.

In other words, ionospheric tomography allows exploitation of the ionospheric precursors caused by the Earthquake preparation processes. To predict earthquakes, the method of the present invention reconstructs electron density irregularities above the seismoactive region, delimiting wavelike and quasi-wave structures; in particular, ionospheric manifestations of acoustic gravity waves, or "AGW" structures like solitary waves, to determine the energy of perturbations, and to carry out regional monitoring of the electron density level.

Figure 4:
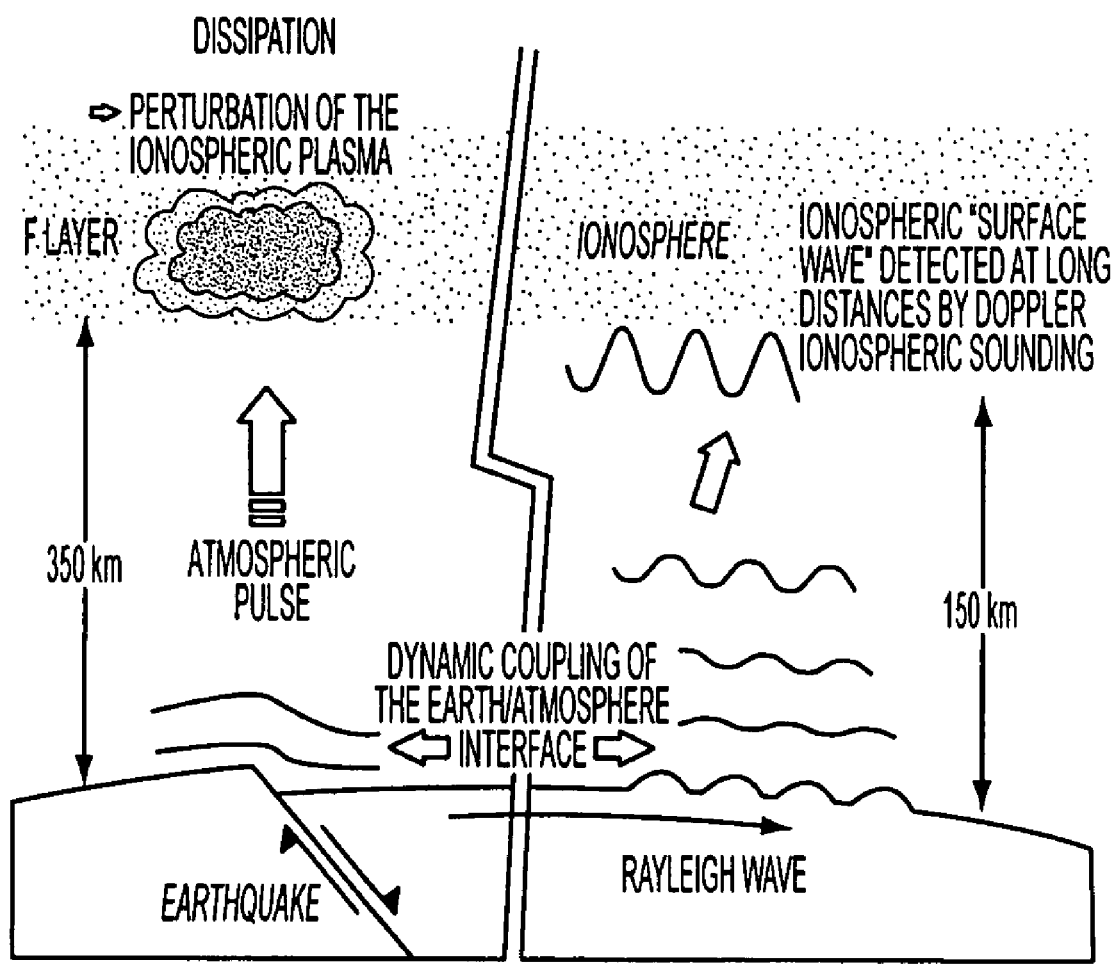
FIG. 4 illustrates post-seismic dynamic coupling between the earth and the atmosphere at an epicenter and at teleseismic distances.

There is a very significant increase in the amplitude of AGW's generated by minor vibrations of the Earth's surface during earthquake preparation as the waves propagate to the upper atmosphere. Small in the lower troposphere, the amplitudes of AGW noticeably increase due to the density drop in the atmosphere, and the plasma density variations caused can be easily detected by radio physical methods. FIG. 4 illustrates the propagation of acoustic gravity waves. Specifically, FIG. 4 illustrates post-seismic dynamic coupling between the solid Earth and atmosphere at the epicenter and at tele-seismic distances. The amplitude of the atmospheric wave increases exponentially with altitude, and leads to large vertical oscillations in the upper atmosphere and ionosphere.

It must be emphasized that earthquake precursors differ in the near-Earth space (in the ionosphere) from precursors defined by the solid Earth itself. The near-Earth space reacts to the processes of earthquake preparation in a small region, the size of the region being dependent on earthquake magnitude, where mosaic anomalies of geophysical fields are concentrated; thus, an "averaging" of the near-Earth environment's reaction to the earthquake preparation processes takes place. The near-Earth space (the ionosphere) reacts to the anomalies of geophysical fields located both in the hypocenter of the forthcoming earthquake and outside the hypocenter. As a result of such averaging, the influence of the mosaicity of the anomalies over the corresponding area is suppressed, which allows effective short-term earthquake prediction.

Two variants of ionospheric radio tomography are disclosed herein: (1) RTI with low-orbiting (LO or LORT) satellites, like the Russian "Tsikada" satellites and the American "Transit" Navy Navigation Satellite System (NNSS) satellites, and (2) RTI with high-orbiting (HO or HORT) systems like GPS/GLONASS.

HORT relies on use of data acquired by the extensive network of ground-based GPS and GLONASS receivers, and similar data from proposed systems such as the European Galileo network of high orbiting satellites. In the preferred embodiment of the invention, both HORT and LORT are used, with the dual frequency (L1 and L2) data streams from the GPS or Glonass satellites acquired by and transferred from a plurality of GPS-data receiving ground stations and passed to one or more central receiving and analysis centers. At those centers, the data are filtered, processed, analyzed, correlated with other related data sets, compared to archival data, interpreted, graphically displayed, evaluated for the presence of tell-tale earthquake precursors, and alerts and/or warnings are disseminated over various types of media.

Similarly, LORT relies on dual-frequency data from low orbiting satellites such as Transit, Tsikada, NNSS, and others. New satellite designs may transmit three frequencies, and the invention exploits the third frequency as well. Dual frequency signals are essential—three are an enhancement.

FIGS. 15a-15d illustrate a method 400 of the present invention. The method 400 may use HORT and/or LORT information. It is preferred that both HORT and LORT data be used, but it should be appreciated that the invention is not limited to the use of both forms of data. In step 402, the present invention measures the combined signals from a plurality of ground-based receiving sites in a given region of the wave field characteristics (phases, phase delays, group delays, amplitudes of navigational signals at two coherent frequencies L1, L2, $f_1$, and $f_2$) transmitted from high and low orbiting navigational satellites.

Next, at step 404, the invention measures, at numerous receiving sites in a given region of the wave field, characteristics (phases, phase delays, group delays, phase and amplitude variances, correlation functions, coherence functions, moments and distribution functions, and amplitudes of navigational satellites at two or three coherent frequencies $f_1$, $f_2$ and $f_3$) transmitted from specialized satellite systems.

At step 406, characteristics of the wave fields (variances, correlation functions, coherence functions, their moments and distribution functions of phases and amplitudes of signals at two coherent frequencies $f_1$ and $f_2$) are measured at numerous receiving sites in a given region of fluctuation.

At step 408, the method 400 generates space-time images of the ionospheric electron density and refraction index distribution in the neutral atmosphere by tomographic methods, using phase-difference radio tomography (see K&T formula 2.1, page 23, which is hereby incorporated by reference) employing phase difference data in time or location of the satellite-borne transmitter, reducing the reconstruction problem to a function of differences of linear integrals, avoiding ambiguity of phase measurements and increasing reconstruction accuracy (as compared to tomography based on information about linear integrals themselves).

At step 410, the method 400 generates a space-time image of the statistic characteristics of the ionospheric electron concentration and density of the neutral atmosphere by tomographic methods using the data on statistical (fluctuation) characteristics of the wave fields. In the case of imaging the spatial-temporal structures of the statistical characteristics of the ionospheric electron density and atmospheric neutral density as determined by tomographic methods, multi-point measurements of the statistical (fluctuation) parameters of the wave fields are derived from data transmitted from satellites, which passes through the ionosphere and atmosphere (satellite tomography of the ionosphere and atmosphere).

These measurements for RTI quantities are all related, via integral equations, with the distribution of N. The electron density N, integrated along rays between the ground receiver and satellite transmitter is proportional to the absolute (total) phase $\Phi$ including the unknown initial phase $\phi_0$:

$$\alpha \lambda r_e \int_L N \, d\sigma = \Phi = \varphi + \varphi_0 \quad (1)$$

where $\lambda$ is the probing wavelength, $r_e$ is the classical electron radius, non-dimensional coefficient of proportionality (scaling factor), and $\alpha \sim 1$ is defined by the frequencies chosen. Integration is carried out along rays L linking the transmitters with the receivers. Equations for amplitudes - logarithmic ratio of amplitudes $\chi = \ln(A/A_0)$ look similar (see K&T, equations 2.1, p. 23).

Here (1) is a system of linear equations relating integrals of the distributions N with the measured phase. Thus, there is a set of rays L={Lij}, as a rule, comprising thousands to tens of thousands of rays, each of them linking the i-th transmitter with the j-th receiver. The set of rays intersects the region of interest in different directions. Integrals over the set of rays generate a system of linear equations, which are solved using various methods of ray tomography (see K&T, points 2.1-2.5, pp. 23-72). Due to ambiguity of the initial phase $\phi_0$, integrals of N yield relative total electron content (TEC).

These relations hold for both LORT and HORT (see K&T, formula 6.3, p. 203). However, in case of HORT, additional possibilities arise for TEC determinations, not only from phase (phase path) but also from the pseudo-range quantities $P_1$ and $P_2$ (the group paths of the radio signals). The GPS receivers are capable of providing different kinds of information. For purposes of ionospheric monitoring, the radio signal phase path runs from the satellite to ground receiving stations. Two carrier phases are used. For GPS systems, these fixed carriers are $f_1$=1575.42 MHz and $f_2$=1227.60 MHz. The corresponding data are usually called $L_1$ and $L_2$: they are the phase paths of signals, measured in units of wavelengths of the probing signals. Additionally, the pseudo-range quantities $P_1$ and $P_2$ (the group paths of the radio signals) are measured (estimated and determined) from the time (duration) of the wave train propagation at frequencies $f_1$ and $f_2$, which can also be used.

From phase data $L_1$ and $L_2$ one can calculate the total electron content (TEC) along the ray propagation according to the formula:

$$TEC = \left(\frac{L_1}{f_1} - \frac{L_2}{f_2}\right) \frac{f_1^2 f_2^2}{f_1^2 - f_2^2} \frac{c}{K} + const,$$

where $K=K=40.308$ m$^3$s$^{-2}$, $c=3\cdot 10^8$ m/s—speed of light in vacuum. Note that, if only phase data $L_1$ и $L_2$ are used, TEC can be calculated only to within an unknown constant that is indicated in the formula as an additional additive term. Pseudo-ranges $P_1$ and $P_2$ also allow calculation of integrated electron density:

$$TEC = \frac{P_2 - P_1}{K\left(\frac{1}{f_2^2} - \frac{1}{f_1^2}\right)}.$$

However, such data are much noisier than phase data. The noise level is usually 30-50% and in some cases reaches even 100%. The above relations for TEC in the case of HORT are complementary to the formula (see K&T, equations 6.3, p. 203). These relations can also be referenced in (V.E.Kunitsyn, E. S. Andreeva, M.A.Kozharin, I.A. Nesterov, *Radio Tomography of the Ionosphere using high orbital navigation systems*, Moscow University Physics Bulletin, V.61, No.1, pp. 6-10, 2005). In atmospheric sounding, the system of equations for tomography looks like equation (1) above to an- accuracy of electron density N replacement by the refractivity $N_A$ of the atmosphere (non-dimensional scaling factor associated with the refraction index of the atmosphere n: $N_A=10^6(n-1)$):

$$\alpha(1/\lambda) \int_L N_A \, d\sigma = \Phi = \varphi + \varphi_0 \quad (1A)$$

The above relations shown in equation (1A) for the atmosphere are similar to the relations for the ionosphere (see K&T, points 2.1-2.5, pp. 23-72). An additional reference to these relations can be given following the paper (Kunitsyn V. E., Zakharov V. I., Dethloff K., Weisheimer A., Neuber R. *Improved radio occultation sounding of the Arctic atmosphere using simulations with a high resolution atmo-*

*spheric model*, Physics and Chemistry of the Earth, 2004, Volume 28, No 2, pp. 277-286, 2004).

All of these steps imply application of the earlier developed methods of statistical RTI (see K&T, equations 5.15, 5.16, points 5.1-5.6), which make use of statistical characteristics of the scattered field. The tomographic problem reduces here to the reconstruction of statistical characteristics of the medium (e.g., a correlation function of the electron density) from the statistical parametric data (e.g., the coherence function) of the measured field of radio waves scattered by the ionosphere.

At step 412, the method 400 determines the structural parameters of the regular and quasi-regular (or ambient) ionosphere (i.e., the height and thickness of layers, concentration levels, parameters of ionization troughs in northern and southern latitudes, parameters of equatorial anomaly in equatorial latitudes).

Figure 5A:
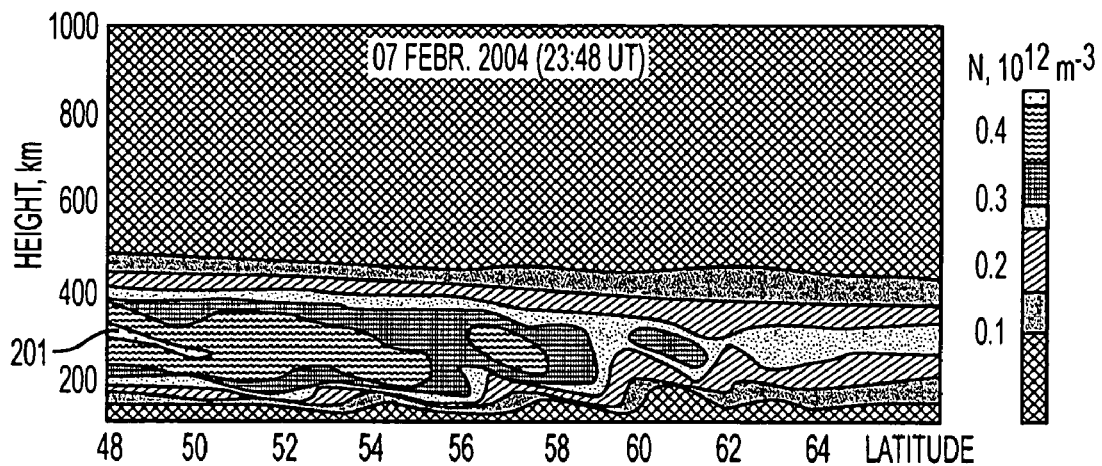
FIGS. 5*a*-5*c* illustrate RTI reconstructions of the ionosphere prior to an earthquake.
Figure 5B:
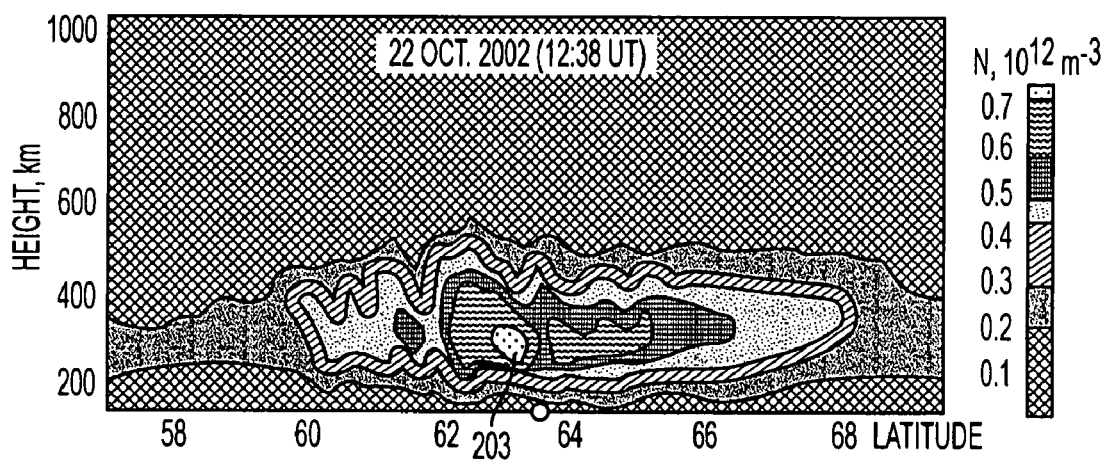
Figure 5C:
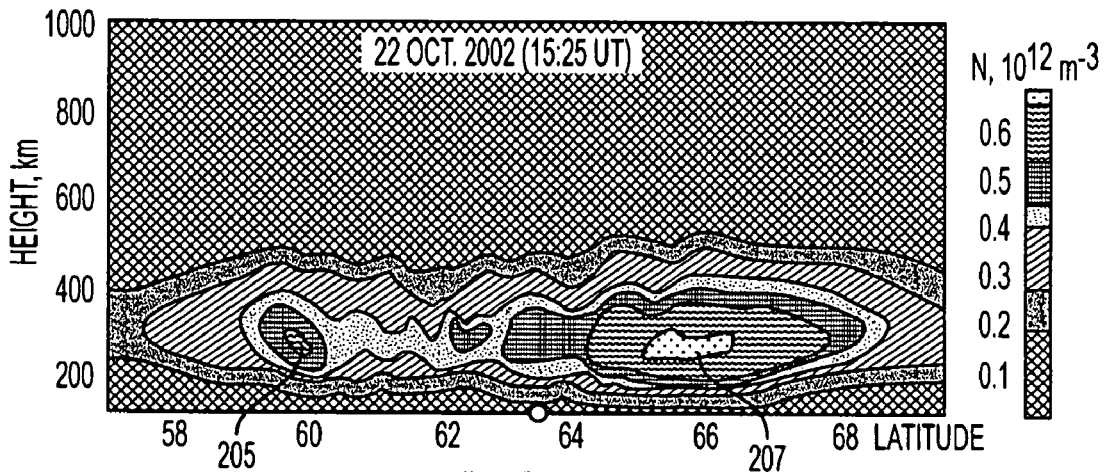

At step 414, the method 400 determines the structure and parameters of the disturbed ionosphere, including determination of the intensity and sizes of perturbations: patches, blobs, bubbles, and other irregularities. Examples of these disturbances, characteristic of a pre-earthquake, perturbed ionosphere, are shown by labels 201, 203, 205, 207 in FIGS. 5a-5c. A typical, non-perturbed ionosphere would appear as a smooth, homogeneously layered zone with no discernable striations in the horizontal or vertical dimension. Similarly, ionospheric models mapped by those who are novices in the field often fail to capture the fine details shown in FIGS. 5a-5c. In addition, the ionosphere changes in a matter of seconds in some instances, so it is essential that those spatiotemporal changes are capable of being acquired and analyzed by the prediction software, hardware, and algorithms. The mathematical procedures used in this step are detailed in the K&T reference, points 2.1-2.5, pp. 23-72, which are hereby incorporated by reference.

At step 416, the method 400 calculates the characteristics and parameters of ionospheric and atmospheric wave perturbations in the ionosphere and atmosphere: amplitude, frequency, wavelength, and velocity of acoustic, internal gravity waves, acoustic-gravity waves in the ionosphere and atmosphere, and estimation of the location of the wave sources.

At step 418, the method 400 calculates the characteristics and parameters of solitary waves, soliton-like waves, isolated perturbations in the ionosphere and atmosphere, including determination of amplitudes and velocities of the perturbations, to aid in location of the wave sources.

At step 420, the method 400 calculates and estimates the earthquake occurrence probability in a given seismic region from the characteristics and parameters of wavelike disturbances in the ionosphere and atmosphere, using amplitude, frequency, wavelength, velocity of acoustic, IGW, and AGW in the atmosphere and ionosphere, by constructing the functional (predictor) of the earthquake containing information about wave activity in said seismic region, determining spectral parameters of wave disturbances and the characteristics of perturbations using wavelet analysis, and separating Acoustic, IGW, and AGW wavelike disturbances by analysis of the RTI images, frequencies, wavelengths, and velocities of the perturbations.

At step 422, the method 400 calculates and estimates the earthquake occurrence probability in a given seismic region from the characteristics and parameters of solitary waves, soliton-like isolated perturbations in the ionosphere and atmosphere, by constructing the functional (predictor) of the earthquake containing information about wave activity in said seismic region, where the wave activity is determined by energy parameters in solitary waves, and in soliton-like isolated perturbations in the ionosphere and atmosphere.

At step 424, the method 400 calculates and estimates the earthquake occurrence probability in a given seismic region from the characteristics and parameters of the structure of the ambient and quasi-ambient ionosphere (height and thickness of layers, concentration levels, parameters of ionization troughs in northern and southern latitudes, and parameters of the equatorial anomaly in equatorial latitudes), wherein the parameters of the structure of the ambient and quasi-ambient ionosphere which define the disturbance level of quasi-stationary electromagnetic fields in said seismic region are related to perturbations in geophysical fields within the region of earthquake preparation, and calculation of the earthquake occurrence probability is performed by constructing the functional (predictor) of the earthquake, containing information about the parameters of the structure of the ambient and quasi-ambient ionosphere—the level of disturbance in the parameters of the structure of ambient and quasi-ambient ionosphere defining the magnitude of the oncoming earthquake.

At step 426, the method 400 calculates and estimates the earthquake occurrence probability in a given seismic region from the characteristics and parameters of the spatial-temporal structure of the statistic characteristics of the electron concentration in the ionosphere and the neutral density in the atmosphere, and from the data about the level of turbulence in the medium, wherein estimation of the earthquake occurrence probability is performed by constructing the functional (predictor) of an earthquake containing information about the statistical characteristics of the electron concentration in the ionosphere and neutral density in the atmosphere, and the perturbation level of the statistical characteristics of electron concentration in the ionosphere and neutral density in the atmosphere defines the level of turbulence in the medium and the magnitude of the oncoming earthquake.

At step 428, the method 400 determines the probability of the epicenter coordinate distribution from the probability distribution of the coordinates of the sources of the waves, solitary waves, and soliton-like isolated perturbations in the ionosphere and atmosphere, wherein the probability distribution of the coordinates of all wave and wavelike disturbances during periods of high probability of an earthquake define the probability of distribution of the coordinates of the oncoming earthquake.

At step 430, the method 400 determines the probability of the epicenter coordinates distribution from the distribution of perturbation amplitudes in the characteristics and parameters of the structure of the ambient and quasi-ambient ionosphere, wherein the distribution of the perturbation amplitudes in the characteristics and parameters of the structure of the ambient and quasi-ambient ionosphere during periods of high probability of an earthquake defines the probability of distribution of the coordinates of the oncoming earthquake.

At step 432, the method 400 determines the probability of the epicenter coordinates distribution from the distribution of the level of perturbations in the characteristics and parameters of the spatial-temporal structure of statistical characteristics of electron concentrations in the ionosphere and the neutral density in the atmosphere, and from the level of turbulence in the medium, wherein the distribution of amplitudes of the statistical characteristics of electron density in the ionosphere, the neutral density in the atmosphere, and the distribution of the level of turbulence in the medium during periods of high probability of an earthquake defines the probability of distribution of the coordinates of the oncoming earthquake.

At step 434, the method 400 discriminates between earthquake precursors based on RTI effects caused by sources of other origin, wherein identification of specific ionospheric and atmospheric structures caused by an earthquake preparation in many cases is complicated by the simultaneous presence of non-seismic perturbations in the medium, including information about the natural conditions and artificial impacts within the target region, data on solar flares, indexes of solar and geophysical activity (Kp, Dst, F10.7), optical phenomena, data from ionosondes, industrial explosions, rocket launchings as well as at experiments on the near-Earth space modification by powerful HF radiators such as EISCAT, HAARP, and SURA, and other artificial sources such as MHD generators, powerful LF, ELF, and ULF facilities, using three-dimensional and two-dimensional tomographic images and the information about their evolution over time (4D RTI) to study the spatial structure of ionospheric disturbances related to the earthquake predictors, and to separate the effects of earthquake preparation processes from influences of other origins.

At step 436, the method 400 estimates the earthquake occurrence probability performed by constructing the functional (predictor) of an earthquake containing information about the characteristics and parameters of the ionosphere and atmosphere within a given seismic region by separating the ionospheric effects caused by the earthquake preparation processes and influences of other "natural" factors, accounting for the level of solar-geophysical disturbance (Kp, Dst, F10.7, optical phenomena, particle precipitation, and similar influencing factors), by acquisition of relevant geophysical data and introducing those data into the process of constructing the earthquake predictor.

At step 438, the method 400 estimates the earthquake occurrence probability by constructing the functional (predictor) of an earthquake containing information about the characteristics and parameters of the ionosphere and atmosphere within a given seismic region by construction of the predictor with an iterative, self-learning procedure, using all available information about all previous strong earthquakes in a given region, archival data, lessons learned in the course of successful and failed predictions, and drawing on information about subsequent earthquakes. At this point, method 400 is completed for the HORT and/or LORT data, but optional processing may be used to augment/supplement the processing.

In another exemplary embodiment, the above described methods are augmented by supportive techniques of radar clutter analysis, and cellular telephone signal fading. The RTI system/technique described above can function separately as an earthquake prediction technique; however, whenever possible, and where radar and cellular telephone data exist, the method 400 augments the RTI system with these other two techniques (via optional steps 440, 450) to increase the confidence level of the prediction in terms of geo-positioning and timing of the incipient earthquake. HORT alone provides warnings of one to three days, and 30 kilometer uncertainty as to geo-position of the impending earthquake. Adding LORT in a combined HORT and LORT configuration can result in a geo-positional uncertainty of about 10 kilometers (and undoubtedly an even lower figure with experience in earthquake prediction in a given region). The addition of radar and cellular telephone fading methods may, in some cases, result in far better definition of the location and time of the impending earthquake.

In cases where the RTI technique forecasts an incipient earthquake, the use of the radar clutter analysis is an aid in confirming the probable location of the earthquake. This relatively simple technique is not essential to the prediction, but it augments the far more sophisticated RTI methodology.

Figure 11:
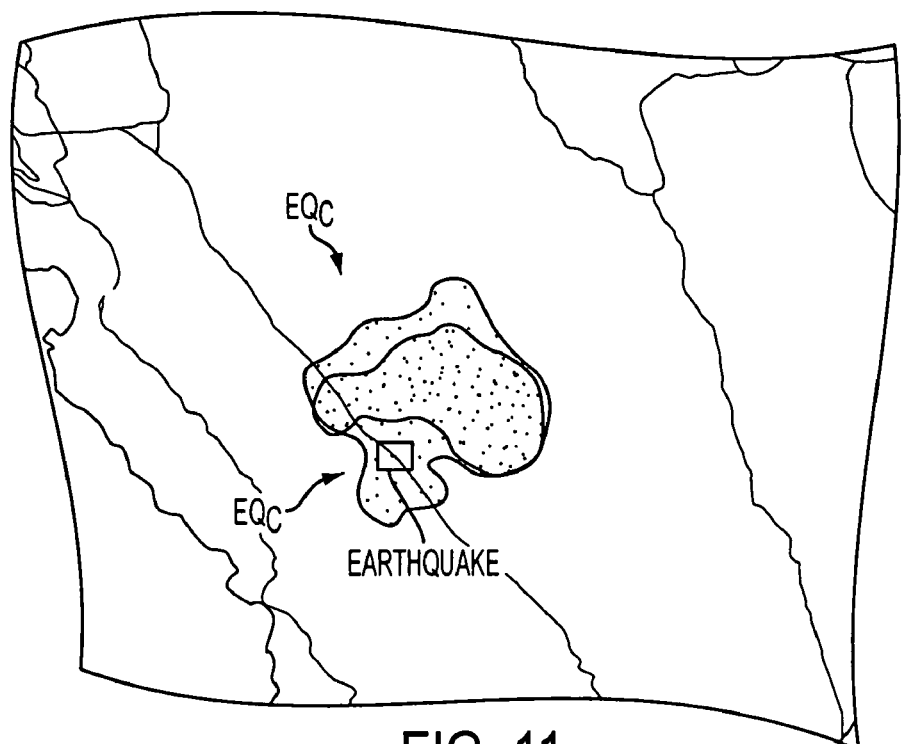
FIGS. 11 and 12 illustrate precursor clutter.
Figure 12:
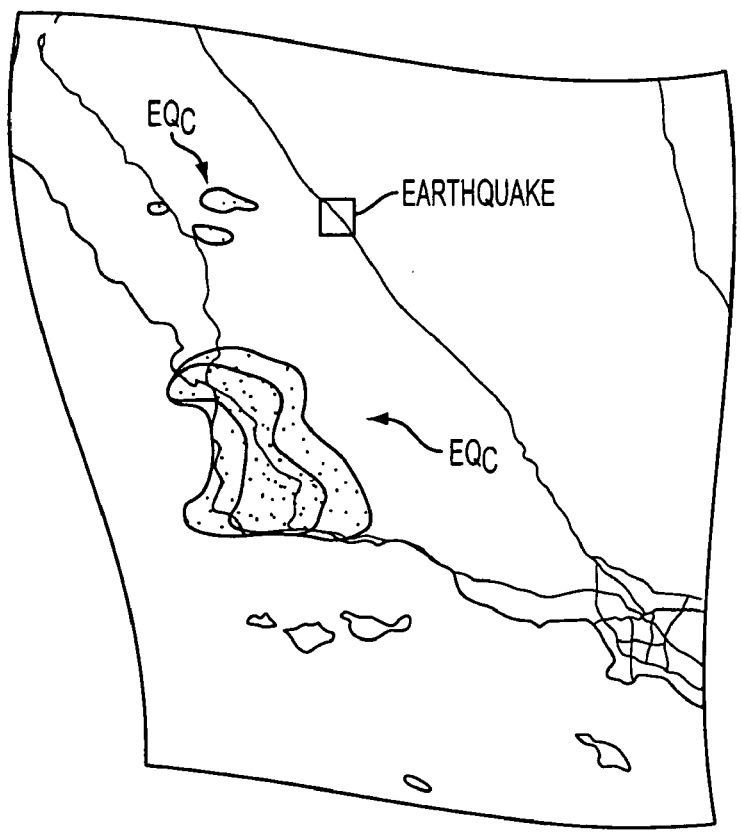
Figure 13:
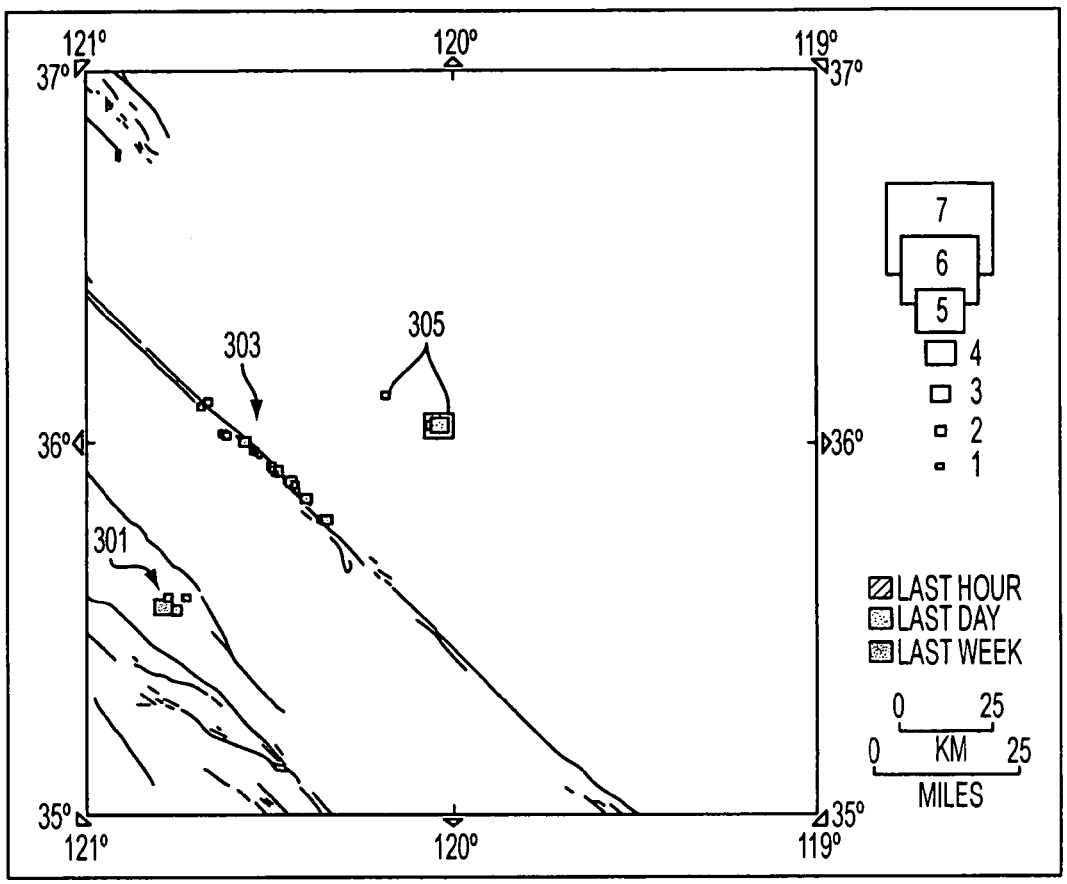
FIG. 13 illustrates the location, time and magnitude of an earthquake associated with the clutter illustrated in FIGS. 11 and 12.

The first of these techniques is use of the Nexrad (or similar) radar system. Nexrad is a U.S. national weather radar system; however, in a preferred embodiment, the invention will combine Nexrad with use the authors' three-frequency, amplitude-modulated radar, as designed by the inventors, which is optimized for this particular application. The inventors have determined that such radar systems, under certain conditions, can image the environmental precursors, comprising electromagnetic field perturbations, aerosols, gaseous emissions, and other influencing factors, which emanate from the surface some days and hours prior to an earthquake. One such radar image, preceding an earthquake in California, is shown in FIGS. 11-13, with the labels EQc identifying earthquake-related clutter. Locations of earthquakes are shown in boxes in FIGS. 11 and 12. FIG. 13 illustrates cites 303, 304 of earthquakes occurring within a week of the data associated with FIGS. 11 and 12, while cites 305 refer to earthquakes occurring within a day of the data associated with FIGS. 11 and 12. The inventors have many samples when Nexrad signatures correlate to post-earthquake-events in both intensity and Doppler channels. The earthquake precursors often take the shape of linear features, similar to the earthquake clouds depicted in FIGS. 8a-8f and 9. In addition, the inventors have frequently observed vortices.

Figure 10:
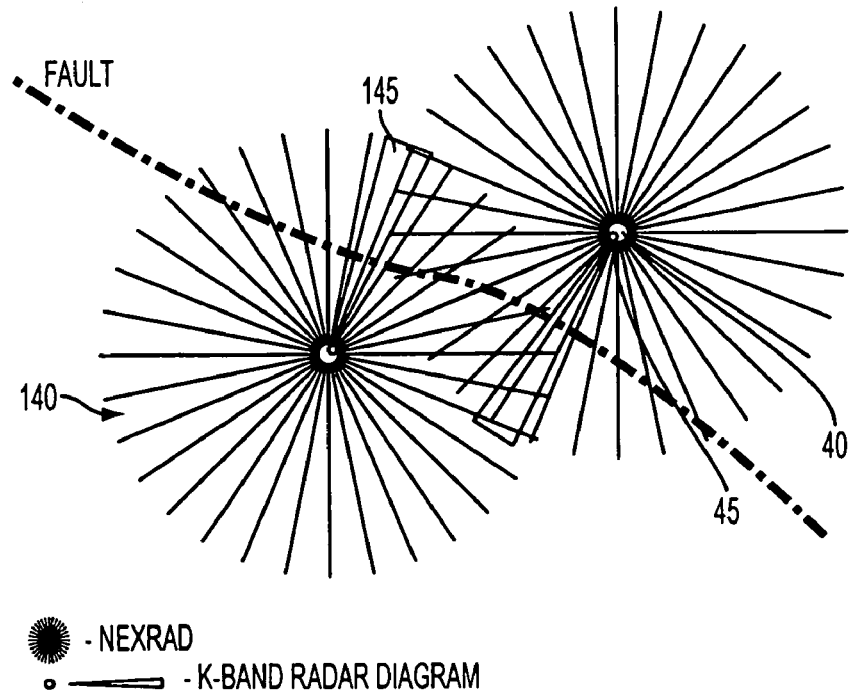
FIG. 10 illustrates a technique for augmenting the HORT and LORT techniques of the invention.

Nexrad functions at a ten centimeter (cm) wavelength. The continuous wave K- band radar 45 of the invention works effectively inside the Nexrad beam 140 as is shown in FIG. 10. The circular mode of the Nexrad 40 covers all-around clutter and "charged" molecules in the air which react differently in different conditions. However, the present invention correlates K- band returns 145 with the beam position of the Nexrad 40. In other words, the Nexrad 40 is similar to a lighthouse, wherein the Nexrad light beam 140 turns 360 degrees, and the observer looks at the light path. The K-band beam 145, however, remains fixed, whereas the Nexrad beam 140 is circular and the invention correlates signals in the time domain. The combination of Nexrad 40 and the K-band radar 45 increases the probability of accurate detection of pre-earthquake events.

The newly designed amplitude modulated, three frequency, polarization diverse radar 45 operating at 35 GHz will significantly enhance the ability to discriminate earthquake precursory phenomena, because the radar 45 will allow the method 400 of the invention to image tell-tale aerosols immediately above the earth's surface. The K-band radar 45 enables the discrimination of charged water molecules, which is not possible with Nexrad 40. Thus, although Nexrad 40 has been suitable for discrimination of radar clutter-based earthquake precursors, the K-band radar 45 will provide a significant improvement to the Nexrad's 40 performance. Accordingly, both the K-band radar 45 and the Nexrad 40 clutter maps are used in the preferred embodiment.

The K-band radar 45 shows that the maximum absorption varies at higher frequencies and at higher temperatures when weaker hydrogen bonding allows a quicker response to changes in the ambient electrical field. Microwave ovens typically use radiation at 2.450 GHz (wavelength 12.24 cm). The water dipole attempts to continuously reorient in electromagnetic radiation's oscillating electric field. The ease of the movement depends on the viscosity and the mobility of the electron clouds. In water these, in turn, depend on the strength and extent of the hydrogen-bonded network. In free liquid water this movement occurs at GHz frequencies. In the literature it has been shown that there is a correlation between variations in electron and proton streams as a function of seismic activity. Space-time analysis of such parameters shows that a significant increase of the electron/proton streams is observed one-two hours before the earthquake. The streams of charged particles can affect the mobility, convection, and diffusion of ions and water molecules in the atmosphere just above the fault lines, similar to out-gassing effects. This activity and the motions of ions and water molecules, or water vapor clusters result in changes in the distribution of turbulence in the atmosphere.

The K-band radar 45 is capable of measuring the distribution of Doppler frequency interference. The mechanism of imaging Doppler spectra returns from the "air" is further dependent on the independent factors of wind speed and atmospheric turbulence, which determine the width of spectra from "atmospheric disturbances."

In cases where the RTI technique forecasts an incipient earthquake, the use of radar clutter analysis is an aid in confirming the probable location of the earthquake. This relatively simple technique is not essential to the prediction, but it augments the far more complicated RTI methodology, which is used in the preferred embodiment as a trigger to bring the radar technique and the cellular telephone signal fading methodologies to bear to enhance geo-position and time predictions. An example of radar clutter correlated with an earthquake is depicted in FIGS. 11-13 (discussed above).

Figure 14:
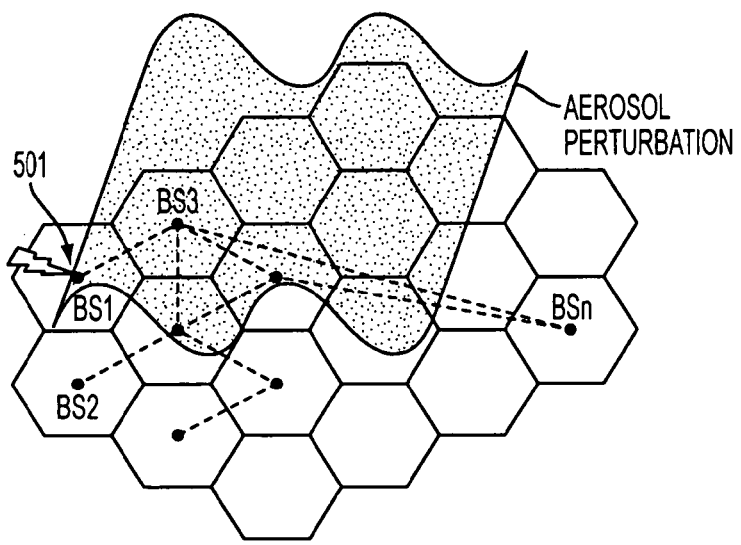
FIG. 14 illustrates aerosol perturbations affecting cellular telephone coverage.
Figure 15A:
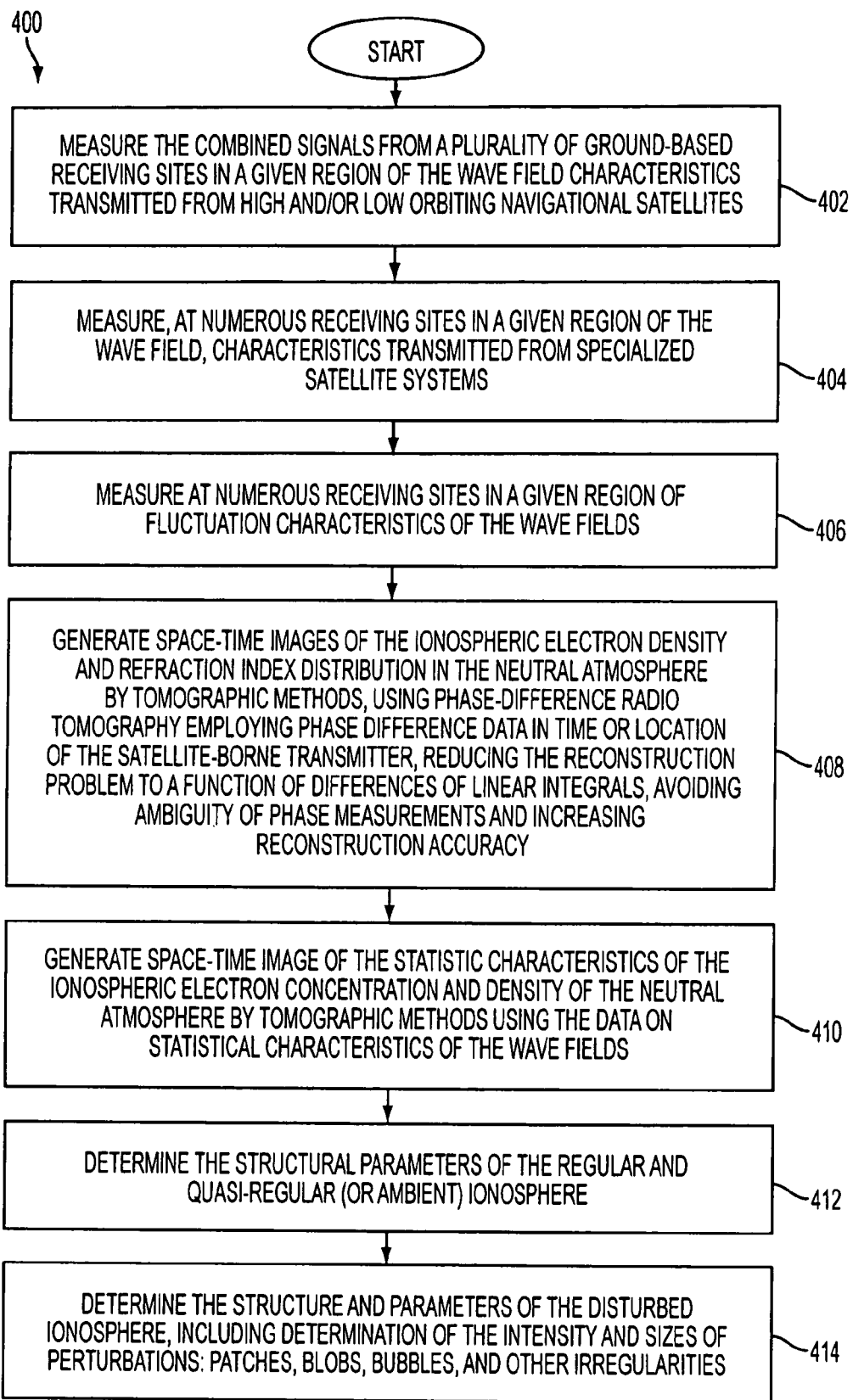
Figure 15B:
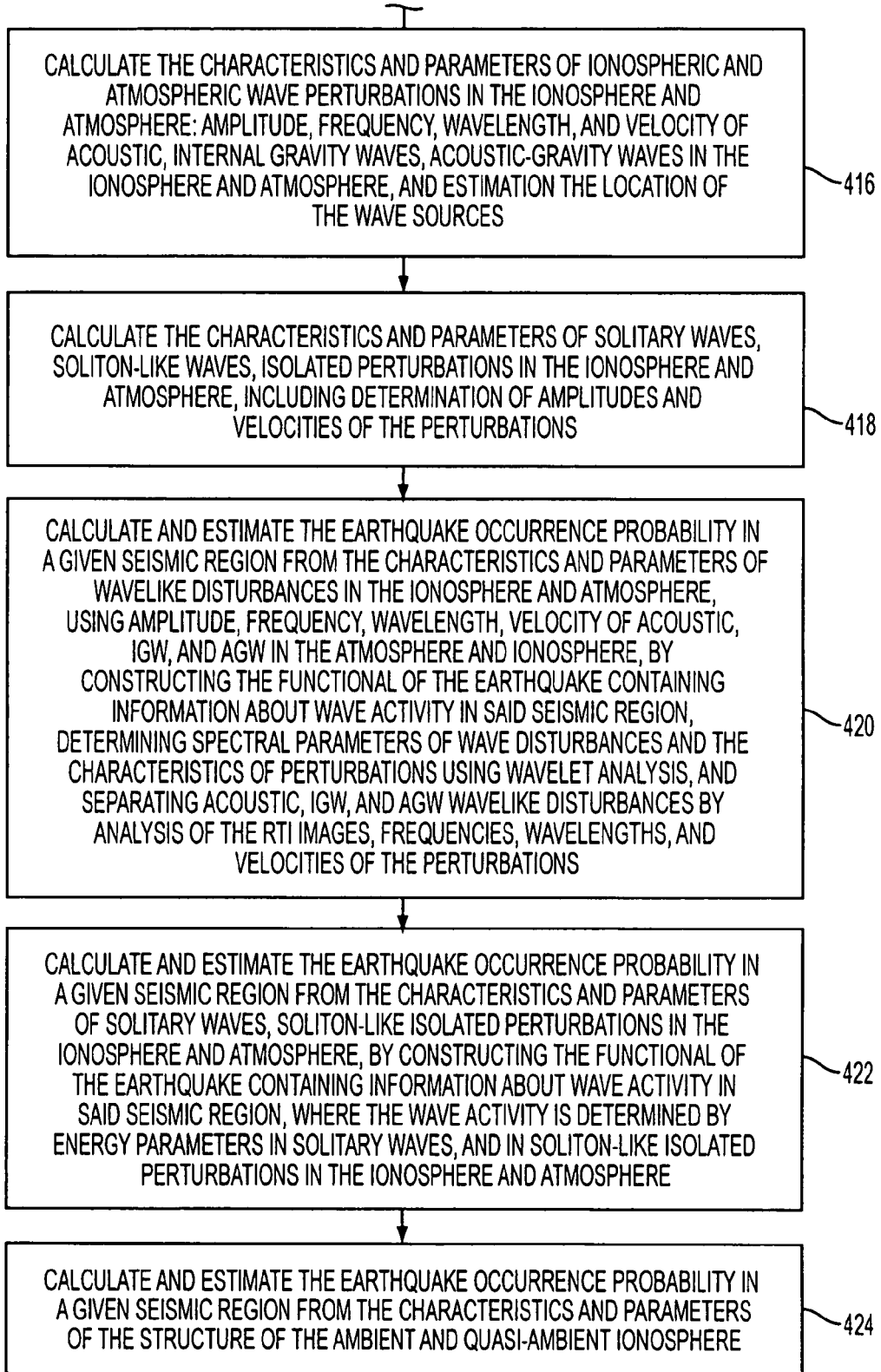
Figure 15C:
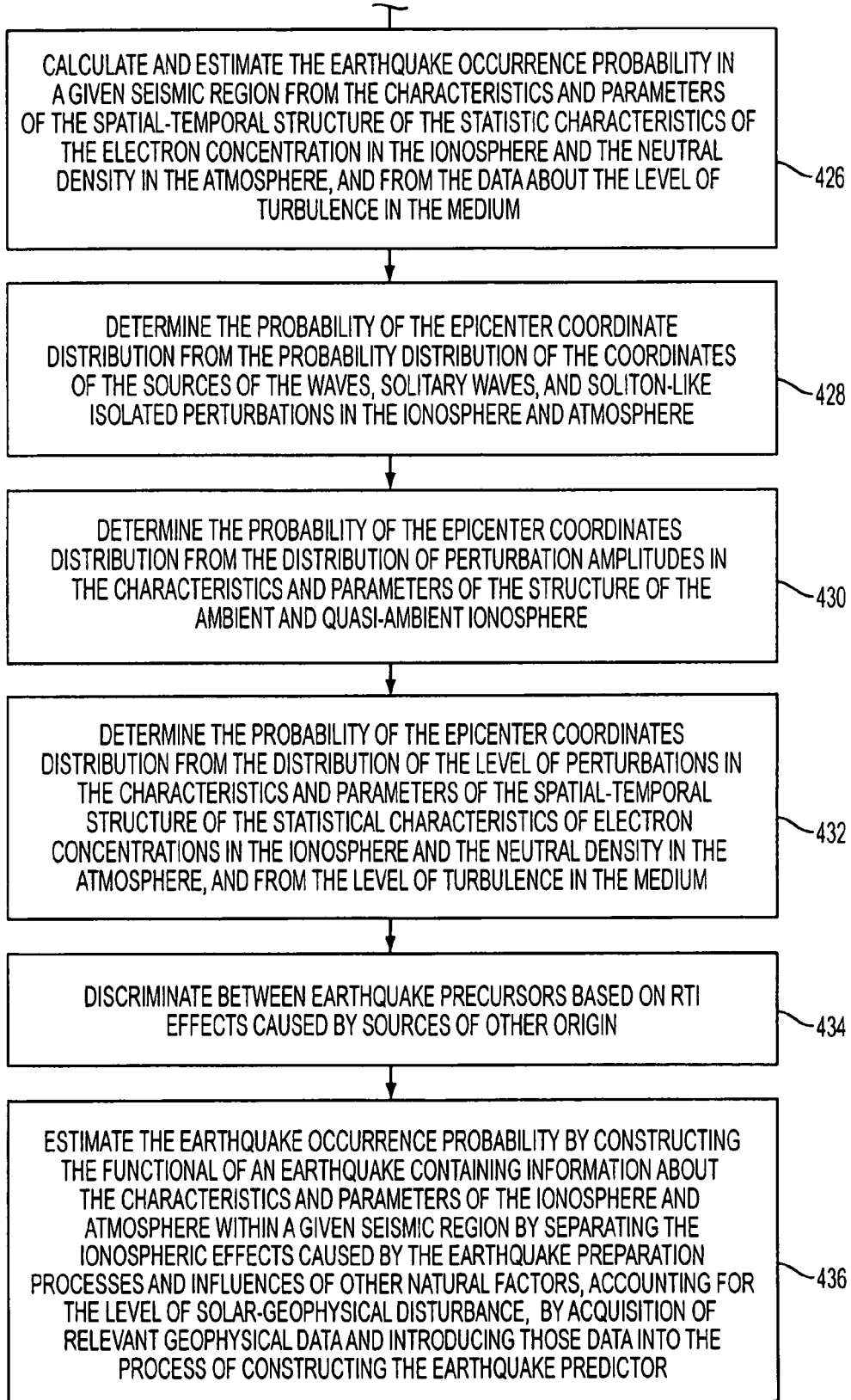

Another step used to enhance earthquake prediction uses the analysis of cellular telephone signal fading. The general concept is shown in FIG. 14, which illustrates cellular telephone links between base stations BS1, BS2, BS3, . . . , BSn, a hypothetical cellular telephone 501 in a global system for mobile communications (GSM). The illustrated path of the transmissions criss-cross the region where earthquake-related atmospheric perturbations (shown as aerosol perturbations) might be found.

Modern cellular telephones incorporate GPS chips, which provide real time position information for the user. By addition of a signal strength monitoring circuit, and memory circuits to record the signal strength, time, and position of the phone, the signal strength can be compared on a periodic basis with the signals normally found at a given location. When those signals change in a pre-determined amount, an alert can be generated in the phone display. Because such cellular phones are so numerous in many seismically active areas, it will be possible to isolate the seismically affected zone of operations from the inactive region, thus enhancing the invention's knowledge of the probable location of the incipient earthquake.

The inventors have demonstrated that cellular telephones experience signal fading (and correlated increases in noise) in the hours and minutes before an earthquake. This phenomenon is consistent with the signal perturbations noted with radar sensing of aerosols, and with the ionospheric technique for earthquake prediction. This cellular telephone signal fading technique assists in refining the geo-positional uncertainty associated with earthquake prediction.

Physics reports have suggested that there are directional changes in the electric fields before earthquakes, and the earthquake-related, electrical field amplitudes can be as much as 1000 volts per meter. References are: (a) Nikiforova N. N., Michnowski S., *Atmospheric electric field anomalies analysis during the great Carpathian Earthquakes at the Polish Observatory*, Swider, Abstr. IUGG XXI General Assembly, Boulder, Colo., VA11D-16, 1995; and (b) Vershinin E. F., Buzevich A. V., Yumoto K., Saita K., Tanaka Y., *Correlations of seismic activity with electromagnetic emissions and variations in Kamchatka region; Atmospheric and Ionospheric Electromagnetic Phenomena Associated with Earthquakes*, Ed. M. Hayakawa. Tokyo: Terra Scientific Publishing Company, 1999. P. 513-517.

Precursory changes in the atmospheric electric field prior to earthquakes in August 1986 and June 1996 showed distinctive increases in background noise, with correlative decreases in signal strength. The inventors' experiments have confirmed that the cellular telephone signals will fade hours to minutes prior to the earthquake, and noise in the cellular network will increase. That noise increase (or fade in the case of the signal) is nonlinear, increasing to a maximum shortly before the event, decreasing markedly, and then rising once more at the instant of the earthquake. The noise level will then decay slowly after the event.

The earthquakes affect cellular telephone signals, such as those from Global System Mobile phone base stations in the same way. The inventors have demonstrated these effects at repeater sites, and with individual cellular telephones.

The earthquake's environmental precursors include electrical deposition on plant leaves and needles. The electrical deposition is known in case of unattached radon daughter clusters, as well as emanations in earthquake precursor gases, which are of unipolar-charge and of high mobility. The electrical flux of these fine particles can dominate on the tips of leaves and needles even in a moderate atmospheric electric field of a few hundred volts per meter, as measured over the ground surface. Unlike diffusion deposition, this electrical deposition is essentially non-uniform: the charge-plate on the tips of leaves and especially on needles of the top branches of conifer trees is more intensive than on the ground surface and the electrically shielded surfaces of plants.

Cellular telephones operate in such environments, and changes of electrical deposition influence the cellular radio transmissions. The weather factor is also an important element on electrical deposition. The role of the electrical deposition essentially depends on the wind velocity. In cases of a low wind (about 1 meter per second, or less), the critical field is comparable to the normal atmospheric electrical field, and electrical deposition of aerosol particles has a considerable role as a factor of redistribution of the deposits on different components of the plants. In a strong wind about 10 meters per second or more, electrical deposition can be considerable only in a thunderstorm situation or on the top branches of trees.

The main losses are losses in the near-field zone due to irregularities in the directional pattern and electrical environment. Base station signals go further - as much as several kilometers, and the signal range depends on (a) the position of Base station (BS) and Mobile Station (MS) and the feature relief, or terrain masking; (b) the power and sensitivity of the MS; (c) the power and sensitivity of the BS; (d) the antenna gain, as installed on either the MS and/or the BS; (e) the season and weather conditions; and (f) the earthquake manifestations and characterization.

The functional format of the Global System for Mobile communications has 124 frequency channels. Cell phones and the BS can work on any frequency chosen by the operator. Signal transmissions in the downlink (from BS to MS) functions at one range of frequencies (perhaps, 935-960 MHz), and the uplink transmissions (from MS to BS) functions at other frequencies (for example, 890-920 MHz).

Cross-correlation of these direct or reflected signals is the method used by the invention to detect time differences, and thus signal fading/perturbations in the earthquake prediction system claimed here. The path of the reflected signals depends on the trees' electrical conditions, which are, in turn, dependent on the incipient earthquake-induced changes in the natural environment. The invention measures the signals (and noise) at either cell phones, or at base stations. A comparison with ambient, non-earthquake-perturbed network signals and noise, with the perturbed network, clearly indicates that an earthquake is imminent. The region with the greatest variance between the ambient and perturbed signals is the region most likely to be affected by the incipient earthquake.

Figure 6:
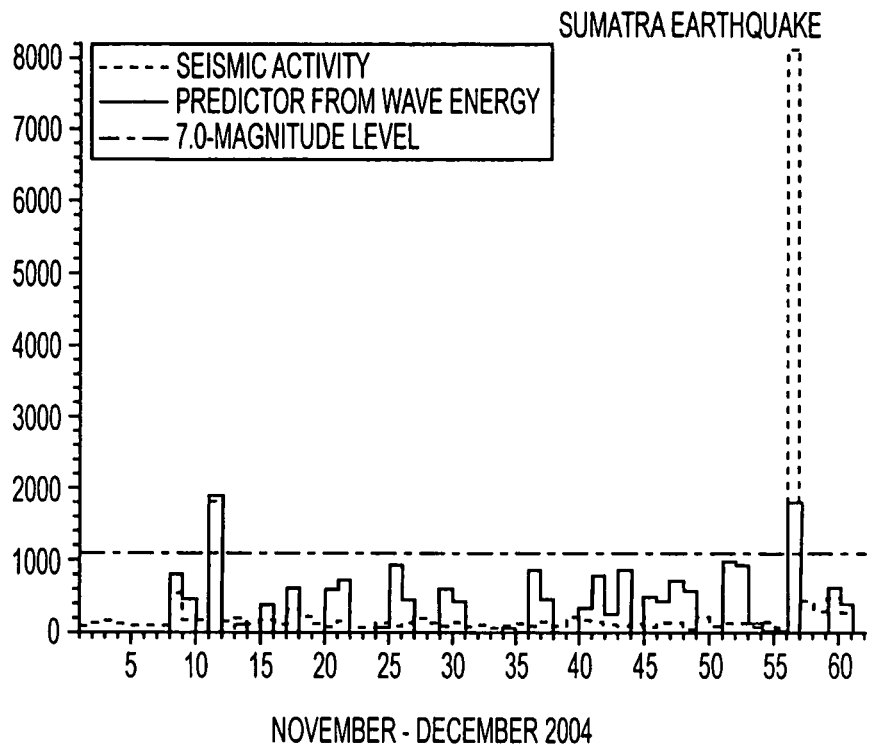
FIG. 6 illustrates the seismic activity that occurred in the Indian Ocean prior to the Sumatra Dec. 26, 2004 earthquake (with the invention's one-day prediction overlaid on the graphic)
Figure 7:
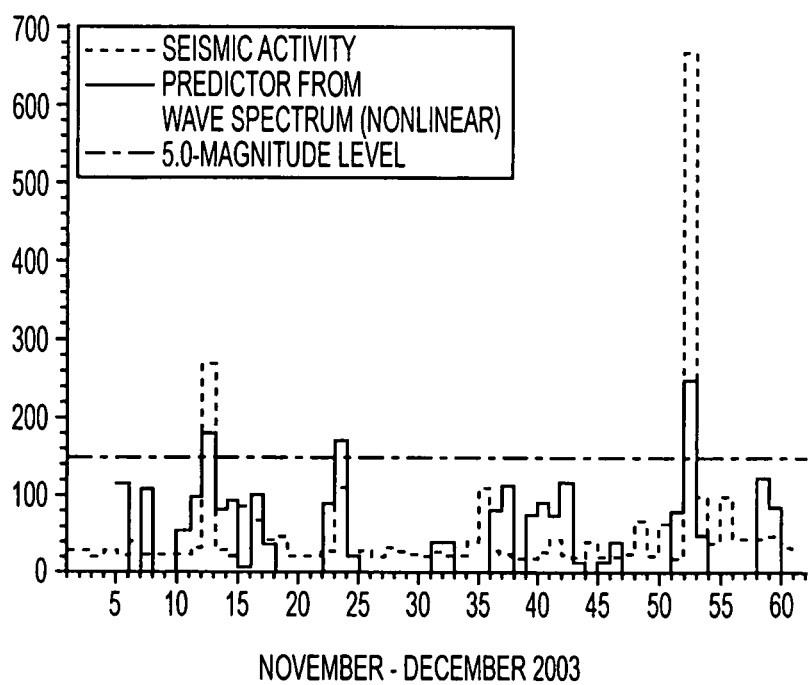
FIG. 7 illustrates the seismic activity that occurred in California prior to the San Simeon event of Dec. 22, 2003 (with the invention's two-day prediction overlaid on the graphic)
Figure 8A:
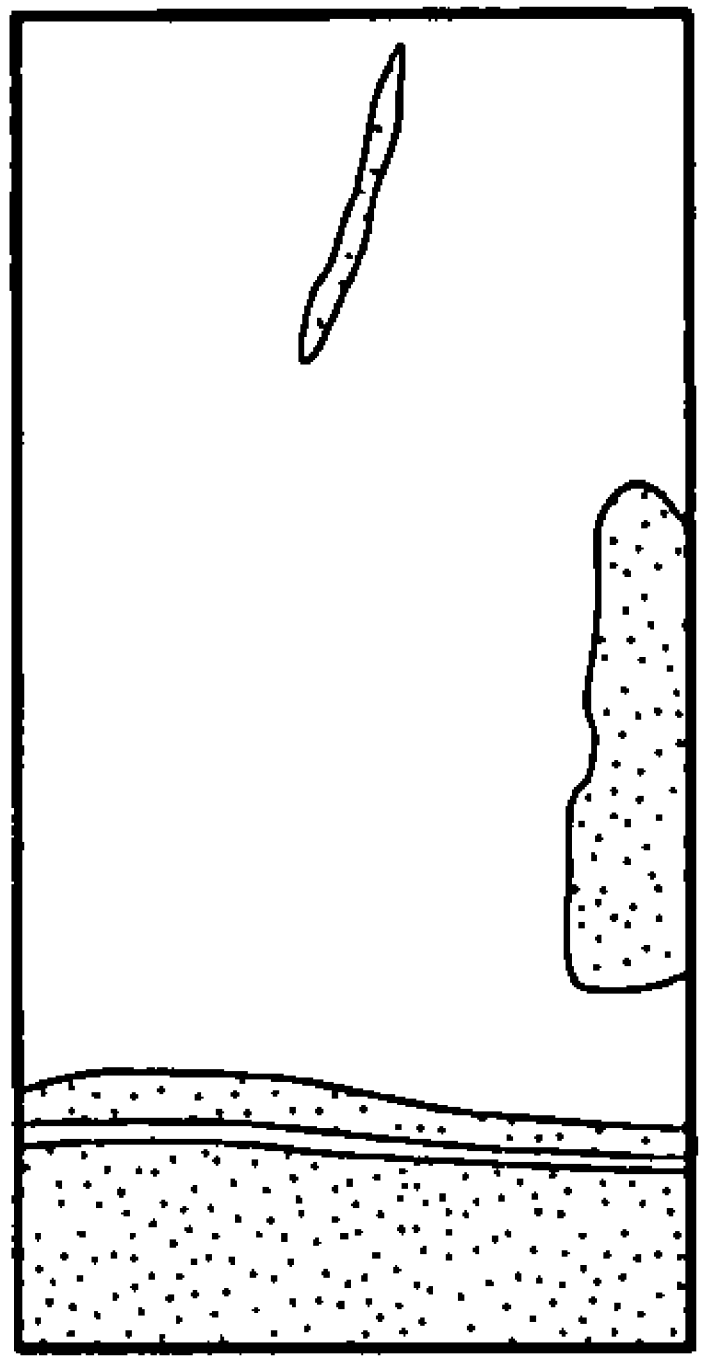
FIGS. 8*a*-8*f* and 9 illustrate precursory earthquake clouds.
Figure 8B:
Figure 8C:
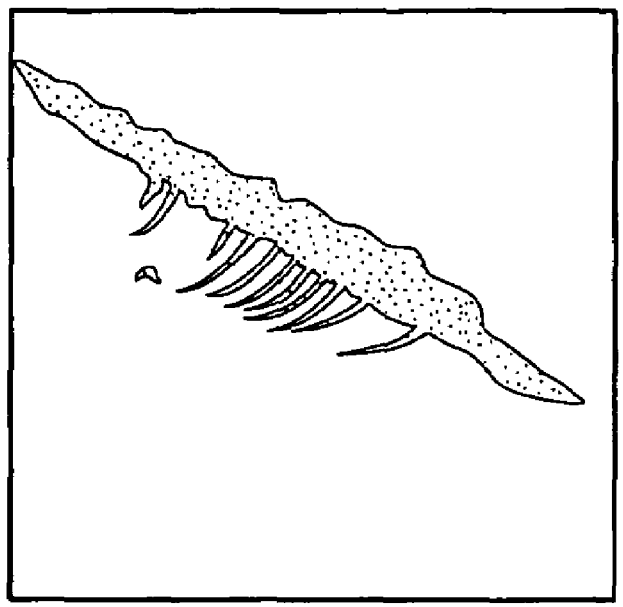
Figure 8D:
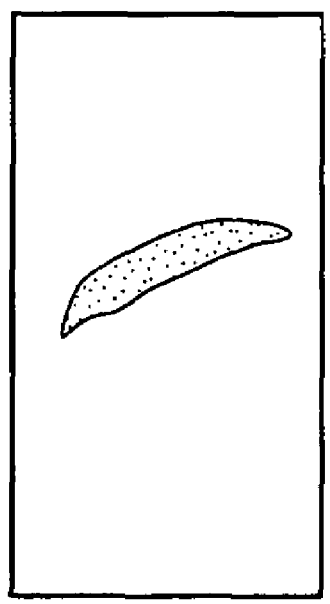
Figure 8E:
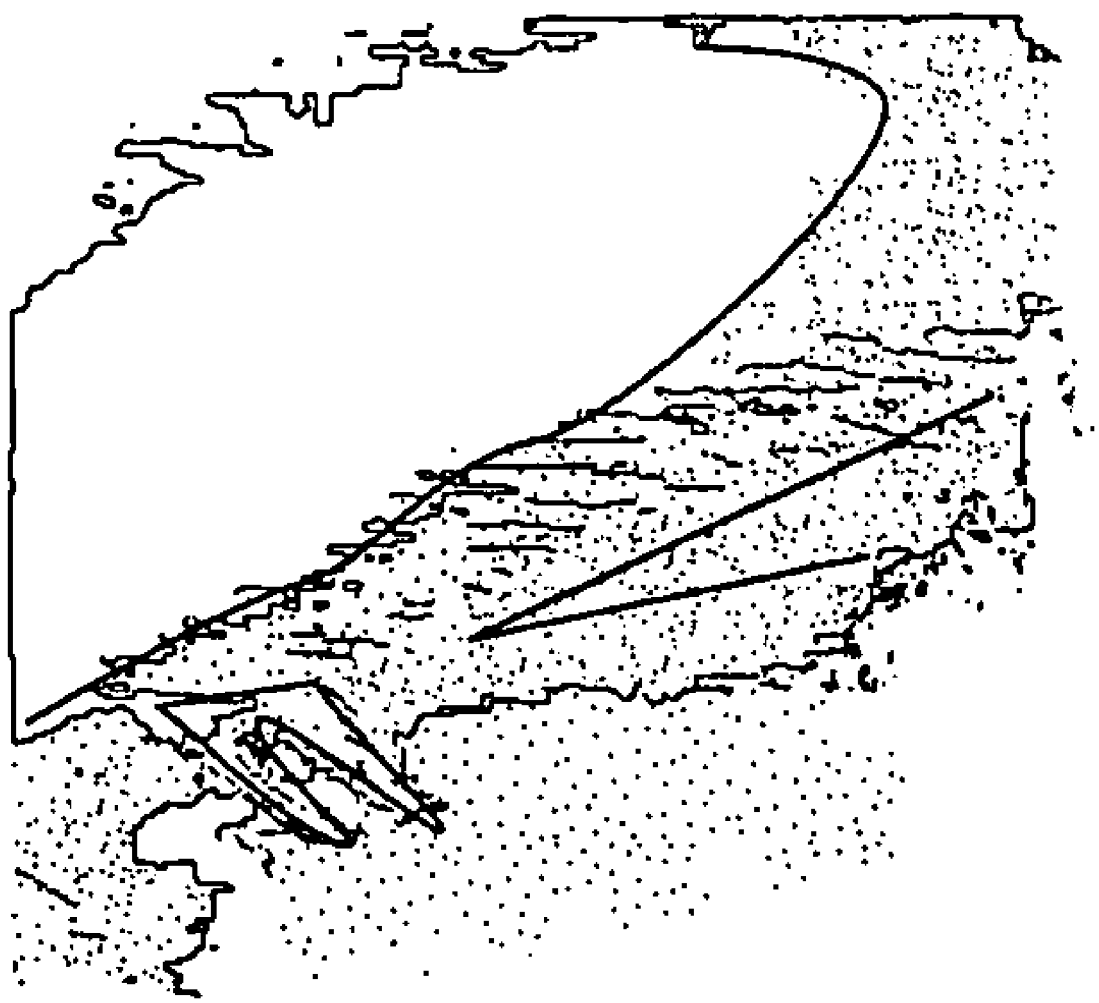
Figure 8F:

Samples of predictor activity are illustrated in FIGS. 6 and 7. In FIG. 6, predictor of seismic activity is based on the use of wave activity and piecewise-quadratic criterion function $\mu(S,S^*)$. The threshold corresponds to magnitude 7. This analysis of the precursors to the large Sumatra earthquake on 26 Dec. 2004 was carried out in less than optimal circumstances, because the network of available GPS receivers (for HORT) available in this region is quite rarefied and contains only a small number of receivers. In this case, one can try to analyze the precursors for only very strong earthquakes (M>7). The number of stations available in the region varied from 21 to 25. The calculated predictor of seismic activity in the given region served to forecast two strong earthquakes (M>7) within the region, including the Sumatra earthquake.

FIG. 7 illustrates seismic activity predictor based on the use of the invention's multiplicative spectral indicator and linear criterion function. An analysis of The San Simeon (35.706°N, 121.102° W) event -22 December 2003, 19:16 UT, M-6.5 is presented. Data from 400-420 receivers with 30-s sampling rate were used for RTI reconstruction. 4-D RTI images (temporal and geospatial) were carried out within a region with dimensions 22×17 degrees (Lat_28-50N, Long_110-127W) half-hourly during November-December 2003 with 1.4°×1.4° resolution, or 156 km in latitude and 62.5 km in height. A total of about 3000 images were obtained. RTI analyses of wave structures during periods preceding the earthquake were preformed. 1-3 days prior to the event, and wave structures were distinctly seen in the region of earthquake preparation. Various types of wave and wavelike structures were apparent; in particular, waves diverging from one source close to the epicenter of the pending earthquake were observed. Structures related to wave interference from two sources were apparent. Based on analysis of the wave fronts, these structures corresponded to a pair of sources within the region of earthquake preparation. A general pattern might comprise an even more complex combination of several sources, these sources emerging and disappearing at time intervals of the order of several hours. Nevertheless, a significant growth of wave activity and the emergence and disappearance of AGW sources was observed in all cases in the region of earthquake preparation. In a similar demonstration (not shown here), the invention calculated predictors of seismic activity during the period of August-September 2004 and made a forecast of two Southern California earthquakes with magnitudes greater than 5, including the San Simeon event. The only "false" prediction made thus far corresponds to a third, actual earthquake with magnitude 4.7 (the invention predicted 5.0). Note that such a "false" prediction can hardly be considered as an essential drawback of the method since the earthquake was, in fact, predicted, however with a slight underestimation in magnitude.

The following is a further description of prior techniques and a brief summary of main features and characteristics of atmospheric, ionospheric, and magnetospheric precursors to earthquakes (referred to herein as environmental precursors). The information is provided solely to provide context to the invention and is not intended to limit the invention in any way. The scientific history of earthquake precursor analysis has extended over several hundred of years. At this time, over one hundred different phenomena can be classified as precursors to earthquakes. These include various physical, chemical, and biological phenomena observed some time before an earthquake (from dozens of years to a few minutes and less).

The randomness of seismic processes in a complex-formed lithosphere having block, mosaic structure is important to note. Failures of a series of earthquake predictions in the USA and Japan, both countries with a wide network of ground observations available, resulted in a pessimistic view of earthquake forecasting. Earthquake precursors in the near-Earth environment (especially in the ionosphere where this invention focuses) fundamentally differ from precursors defined by the solid Earth itself. The near-Earth environment responds to processes of earthquake preparation in a region, the dimensions of which depend on earthquake magnitude, where the mozaic anomalies of the geophysical fields concentrate. Thus, an "averaging" of the near-Earth environmental response to processes of earthquake preparation occurs. The near-Earth space (ionosphere) responds to anomalies in geophysical fields located both in the epicenter of the pending earthquake, and outside of it. As a result of such an "averaging," the effect of anomalies' mozaicity is suppressed over a corresponding region, which gives a hope for increasing efficiency of short-term earthquake prediction.

Earthquake precursors can conventionally be divided into two groups. The first group embraces phenomena caused by earthquake preparation and associated with the development of physical processes and fields and chemical and biological processes in the solid Earth itself. The second group of precursors includes phenomena associated with the influence of various processes and fields caused by earthquake preparation on the Earth's environment (atmosphere, ionosphere, magnetosphere and inner space).

Patterns belonging to the first group of "lithospheric" precursors are as follows: the entire range of horizontal and vertical movements of lithospheric blocks, deformations, pressures, tensions, and tilts preceding an earthquake and associated with accumulation of stresses in the earth's crust; changes in geophysical parameters (geo-electric and geo-magnetic, for example, electric conductivity and magnetic properties, plasma flows, and field changes in the earth's interior; changes in geochemical parameters; in particular, changes in the concentration of radon and other radio-active gases close to the regions of pending earthquake preparation and changes in the subsoil hydrogen concentration; changes in the "mechanical" properties of the earth crust (elasticity, fracturing and so on); these changes result in the water level oscillations in wells, etc.; variations of physical fields (geo-electric, geo-magnetic, magneto-telluric, acoustic and others) caused by changes in mechanical, chemical and geophysical parameters of the earth's crust. Seismo-electric signals are included in this group; and Biological precursors, embracing changes in the electrical "environment" or characteristics of several living species, and changes in the behavior of animals.

An extended literature on "lithospheric" precursors exists. Earthquake preparation in a specified region is considered as a set of processes of non-linear system developments, leading to self-organization of the system, in preparation of the emergence of a large earthquake. Based on historical data about past earthquake onset times, locations, and magnitudes (especially smaller earthquakes in the region of interest), specific functions are proposed as pre-cursors to a pending large earthquake. Some combination of a series of functions is then analyzed. It is shown that in some cases, large earthquakes can be successfully predicted with a few years warning (often referenced to as "intermediate-term" predictions), or, predicted several months in advance (short-term predictions), in both cases prior to the seismic event. These conclusions are based on the retrospective history and statistically based forecasts. Hereinafter, a short-term prediction is understood to be a "prediction of a few days to a few hours in advance of the earthquake, and an intermediate prediction implies "weeks and months" warning. The terminology is quite common in earthquake-related papers. The present invention is for a method, which provides one to three days warning time—a time frame with practical utility.

A team named "Keilis-Borok" successfully predicted earthquakes in California and Japan in 2003 using these functions. Note, however, that the predictions were for months and years into the future: hardly predictions with utility for human response. In any case, several of the Keilis-Borok forecasts have failed. For example, the Keilis-Borok team confidently predicted that an earthquake would strike California before Sep. 5, 2004; an event which never occurred. (Keilis-Borok V. I., Shebalin P. N., and Zaliapin I. V., Premonitory patterns of seismicity months before a large earthquake: Five case histories in Southern California. *Proc. Natl. Acad. Sci.*, Dec. 24, 2002, vol. 99, No. 26, pp. 16562-16567).

Analysis of lithospheric earthquake pre-cursors provides valuable information about earthquake preparation processes. Coupling between a large earthquake and the preceding changes in the physical and chemical properties of the medium has been confirmed many times. However, due to the complexity and variability of the phenomena in a seismic region during earthquake preparation, the specific form of variations in diverse precursory patterns can vary in different seismic events.

No methods have ever been successful (prior to the present invention) to serve as a reliable and trustworthy pre-cursors to earthquakes, capable of forecasting all the impending seismic events of a given magnitude with higher than 50% probability, despite the series of marginally successful predictions made by the Keilis-Borok and related techniques.

It is worth emphasizing that the prediction methods based on the use of lithospheric precursors intrinsically employ only "point" local information about the behavior of these parameters. That is, those methods use values measured in a set of points in the region of interest during a specified time period. Thus, information about the fields of local parameters in the local medium is generated in the analysis. However, it is recognized that during earthquake preparation, manifestations of specific features of geophysical field anomalies have a mosaic, blocky structure over a large geo-physical expanse. That is, a large earthquake can mature as a result of numerous processes that take place at large (hundreds to thousands of kilometer) distances from the epicenter. Thus, surface-based seismic sensors, and vertical viewing ionospheric sensors (ionosondes) fail to provide sufficient "perspective" over the area of interest, and fail as techniques for earthquake prediction. Satellite-borne sensors, operating as independent systems and providing in-situ information, fail for reasons of both long revisit rates and the same isolated perspective over the area of interest.

This circumstance makes it essential to study the spatial-temporal structure of the fields of several integral parameters of the medium over an extended area - such as those contributed by "all" points within the region under consideration. Unfortunately, construction of sufficiently dense networks of "point sensor" measuring devices to study the distributed fields of the parameters of an extended medium in regions of earthquake preparation is not feasible, since this would require many tens of thousands of sensors.

On the other hand, earthquake precursors descriptive of changes in the physical and chemical fields in the medium ambient to the area of earthquake preparation are naturally integrated with respect to the region of earthquake preparation. The earth's environment reacts to the processes of earthquake preparation in the region, the size of which is correlated to the earthquake magnitude, where mosaic anomalies of geophysical fields are concentrated. Thus, "averaging" takes place in terms of the environmental response to the earthquake preparation process. The environment reacts to the anomalies of geophysical fields located both in the epicenter of an impending earthquake and outside as well. As a result of such averaging, manifestations of the anomalous mosaicity over a corresponding region are suppressed, making short-term earthquake prediction feasible.

In the past 30 years, after the successful real-time prediction of a disastrous earthquake in Haicheng (China, 1975), a large number of publications appeared regarding earthquake pre-cursors, promulgated from different countries. Systems of prognostic observations have been actively developed, including such methods as registration of variations in tilting and deformations of the earth's surface, groundwater changes, electric resistivity anomalies, magnetic and electric field perturbations, and geochemical parametric variations, inter alia. These anomalies are mosaically located on the Earth's surface; they demonstrate different types of developments before specific earthquakes in different seismo-active regions; and most. often can hardly be read through the noise.

A predominant view is that most anomalies do not originate from the hypocenter of the forthcoming earthquake. This peculiarity relates to short-term (hours to days) pre-cursors. Failures in predictions of a series of earthquakes in the USA and Japan, despite the existence of widespread observation networks, have resulted in a pessimistic view of the feasibility of such prognoses. Here, the chaotic character of the seismic process in the Earth's crust, having a complex structure as well as a high probability of dynamical development of any fault line into a large earthquake rupture, and the triggering influence of minor external perturbations that cause macro-instabilities and meta-stability of seismo-active regions should be noted. However, a series of experimental facts reveal the pre-cursors to be generated in the hypocenter of the forthcoming earthquake, which opens the possibility of probabilistic prognosis of the disaster in deterministic chaos conditions. Traditional understanding was that most precursors were confined to sources near the epicenter of an imminent earthquake. In recent years, however, it has been commonly accepted that the process of earthquake preparation are not only local, but also take place remotely from the hypocenter of the impending earthquake, covering a certain region, with an expanse that can amount to hundreds or even thousands of kilometers. That region may not necessarily be centered over the hypocenter of the impending earthquake.

It is precisely that circumstance which physically substantiates the present RTI-basis of the present earthquake prediction invention, comprising spatially and temporally integrated parameters measured over the entire region associated with the impending earthquake.

Variations in geophysical fields give rise to corresponding variations in the structure and parameters of the near-earth environment comprising the atmosphere, ionosphere, and magnetosphere. Many facets of specific changes in the near-earth space preceding an earthquake are known, and these can be treated as earthquake precursors.

This group of pre-cursors comprises all scales and statistical properties of horizontal and vertical lithospheric motions, including an increase in the rate of seismic creep and slow movement along the faults; gradual tilting of the land near the fault zone; appearance of a ring-like pattern of micro-quakes surrounding the epicenter of a future quake, called "Mogi's doughnut"; a decrease in the number of micro-quakes and foreshocks; geochemical pre-cursors including increase of hydrogen gas in the soil; changes in the level of subsoil waters; and changes in geo-electrical parameters of the medium.

Also in this group are releases of radon and other radioactive gases in places of earthquake preparation; however, one should bear in mind that this phenomenon can also be related to the second group of precursors as well. In addition, biological pre-cursors such as the strange behavior of birds and animals and changes in electrical properties of several fish species can also be related to this group. This complex of listed pre-cursors (electrical resistivity, electro-telluric field, electrochemical potential, water conductivity and hourly average data of electrical activity of weakly electric fishes are considered in Sidorin A. Ya. "Search for earthquake precursors in multidisciplinary data monitoring of geophysical and biological parameters," Natural Hazards and Earth System Sciences, 2003, 3, 153-158).

Earthquake precursors could be conveniently grouped into "lithospheric" precursors, and "environmental precursors." The first group of "lithospheric" precursors comprises all phenomena taking place in the solid earth itself (various motions, chemical processes, changes in physical and mechanical properties of rocks, inter alia). Biological phenomena also fall into this group. The stereotypical feature of all of these is their spatial-temporal "locality" (each lithospheric precursor intrinsically characterizes local changes of a certain parameter and is measured locally). In one sense, such "lithospheric" precursors can be called "primary."

The second group of "environmental" precursors comprise phenomena developing and taking place in the earth's environment (the earth's geospheres, or the magnetosphere, ionosphere, and atmosphere). They can be treated as "secondary," or "derivative" precursors in the senses that, via various mechanisms of lithosphere-atmosphere-ionosphere-magnetosphere coupling, they are generated by lithospheric precursory effects in the earth's environment. These phenomena are the environmental results of the natural spatial-temporal "integration" of lithospheric precursors. Each of the contributing lithospheric precursors is local, but due to non-linear coupling with each other, and with the earth's environmental medium, their effects naturally integrate in the environment. Depending on the nature of the "primary" phenomena and their characteristic time-space scale, this natural integration suppresses some effects and amplifies others. That is, the integration is spatially-temporally weighted. Thus, the possibility arises of constructing an appropriate time-space filtering window to extract the desired environmental precursor effects as the inventors have done here.

Research techniques for the study of the first group of precursors include seismic and other (remote, geodetic and such) measurements of lithospheric motions and analysis of their properties. By collecting adequate historical data, predictions can be made as to the recurrence frequencies of earthquakes of a certain magnitude at a specific location. Obviously, this is a very difficult thing to do, as the historical database often does not go far enough back in time to provide meaningful predictions within reasonable limits of statistical confidence. Although statistical methods may be more accurate for smaller and more frequently occurring earthquakes, they become totally unreliable in the prediction of the larger and less frequent ones. Predictions based on statistical analysis of historical earthquake data can only be given for the long or intermediate time frames. Thus, such methods are of limited reliability and usefulness.

Recurrence Frequency: Recurrence frequency is the relationship between magnitude and repetition of earthquakes. Statistically speaking, recurrence rates of earthquakes of certain magnitude can be determined by plotting magnitudes versus chronology of historical earthquakes.

Seismic Gap Theory: The Seismic Gap Theory provides a method of earthquake prediction based on estimating earthquake frequency statistically. In this approach, if a segment of a major seismic belt has not been broken over the past 30 years such a region will thus be considered as a seismic gap and a potential site for a future large event.

Slip Rates: A different approach has been used in estimating the average recurrence intervals of earthquakes along major faults. Rather than using historical records of earthquakes which are very recent, it is possible to examine the history of slip rates along a fault as preserved in the geologic record and evidenced by offsets in sediments and in the surface configuration of geo-morphological features.

By fault slip or tectonic creep, basic average recurrence estimates can be obtained which may be applied in understanding the future behavior of the different segments of a fault. The basic assumptions of this approach are that slip of a fault is accomplished by the sudden strain released by the rocks during earthquakes, by gradual slow tectonic aseismic creep, or by a combination of the two processes. It also assumes that in areas of the fault where aseismic creep occurs, strain energy is released gradually. In such areas large catastrophic earthquakes of magnitudes 8 or greater cannot take place. However, along segments of the fault that display little or no creep, very strong earthquakes can occur. Dr. Robert A. Wallace of the U.S. Geological Survey has effectively used such methods for establishing slip rates along the San Andreas fault, where an empirical relationship between probable Richter magnitudes and creep rates has been established.

Note that the use of phenomena linked with motions and deformations of the earth's crust as pre-cursors is attended by fundamental difficulties. Indeed, owing to the advent of modern technical means (GPS, InSAR, Very Broad Band [VBB] seismometers) motions and deformations can be measured to extremely high accuracies. For example, creep motion as slow as a few centimeters per year may be measured. However, many methods employ remote sensing techniques, which imply precise determination of satellite orbits (in the case of GPS measurements), not possible real time, but with some time delay (up to a day), or repetition of measurements over a long period for comparison with reference measurement. GPS data also contain a component caused by atmospheric noise; in order to get rid of a random atmospheric noise, data acquisition over a long time interval is required.

Studies of geo-electrical properties of the lithosphere and deep Earth (telluric currents, rock conductivity and magnetic characteristics, etc.) also relate to the first group.

Variations in electric dE and geomagnetic dH fields as well as their frequency ranges are (Koshevaya S.V., R. Pérez-Enríquez and N. Ya. Kotsarenko, *The detection of electromagnetic processes in the ionosphere caused by seismic activity*, Geofisica Internacional, (www.unam.mx/serv_hem/revistas/ fisica/1997/01/kosheva.html, 1997):

$\delta E = 10^{-7} - 10^{-2}$ V/m, $f = 10^{-2} - 10$ Hz;

$\delta H = 10^{-4} - 10^{-1}$ V/m, $f = 10^{-2} - 10$ Hz.

Variations of the electric field caused by earthquakes were first proposed by Chernyavsky, E., 1925. Electric Storms. Proc. Of CASU, p. 157 (in Russian). Variations in electric dE and geomagnetic dH fields as well as their frequency ranges, are in (Koshevaya S.V., R. Pérez-Enríquez and N. Ya. Kotsarenko, *The detection of electromagnetic processes in the ionosphere caused by seismic activity*, Geofisica Internacional, 1997). Variations of the magnetic field were probably first observed in Kazan in 1880.

Pre-seismic ULF electromagnetic effects from observations at Kamchatka are reported in Molchanov O., E. Fedorov, A. Schekotov, E. Gordeev, V. Chebrov, V. Surkov, A. Rozhnoi, S. Andreevsky, D. ludin, S. Yunga, A. Lutikov, M. Hayakawa, and P. F. Biagi, "*Lithosphere-atmosphere-ionosphere coupling as governing mechanism for preseismic short-term events in atmosphere and ionosphere*", Natural Hazards and Earth System Sciences, 2004, 4, 757-767). The authors found, for the period June 2000 to September 2001, an effect of suppression of ULF intensity 2-6 days before rather strong and not too distant seismic shocks (M=4.0-6.2). This effect was revealed for nighttime and horizontal components of the ULF field (G) in the frequency range 0.01-0.1 Hz.

Anomalous VLF electric field perturbations associated with the Chamoli earthquakes of March/April 1999 are reported by Singh, 2001. Employing borehole and terrestrial antennas, Very Low Frequency (VLF) electric field perturbations associated with the Chamoli earthquakes were monitored at the Agra, India, station (geographic lat. 27.8°N, long. 78°E). The results show that electric field perturbations started appearing in the form of noise bursts 16 days prior to the occurrence of the main shock on 29 Mar. 1999. In the majority of cases of noise bursts, the effect was observed by borehole antenna only, indicating that the signal propagated through the crustal region. This result was interpreted in terms of propagation of signals through conductive channels along the Delhi-Haridwar ridge and parallel to them between the source and the observing station.

Fujinawa and Takahashi have reported precursory times ranging from 0.4 hours to 7.8 days from observations at several stations in Japan. Enomoto and Hashimoto have also reported precursory times between 7 hours to 4 days. However, in these cases the earthquakes were moderate and isolated, and in the case of severe and prolonged seismic activities such as those in Chamoli, the electromagnetic signals were observed much earlier. For example, Matsumoto, et al., reported anomalous electric field changes about two months before the seismic swarm off the East coast of the Izu peninsula.

Studies of earthquake precursors comprise both the investigation of individual specific properties of precursory phenomena (case studies) and the analysis of their statistic and morphological features. For example, the scientific group led by academician V.Keilis-Borok developed a method for predicting the location and time of pending earthquakes several months before the events. Their methods are based on deterministic chaos theory and make use of long time series data about the seismicity of a region. This method showed excellent results in predicting two actual major earthquakes—a magnitude 8.1 earthquake near Hokkaido, Japan, in September of 2003, and a magnitude 6.5 shock that struck Paso Robles, California in December 2003. But the earthquake forecast to hit Southern California on or before Sep. 5, 2004, as predicted by the Keilis-Borok team never occurred.

Not even the "VAN" (Varotsos, Alexopoulos and Nomicos) method (Varotsos, P. And Alexopoulos, K.: 1984b, *Physical properties of the variations of the electricfield of The Earth preceding earthquakes II. Determination of epicenter and magnitude*, Tectonophysics, 1998, 110, 99-125., 1984, 1987), which is the electromagnetic proposal with the highest current impact on seismology, has been accepted as an earthquake prediction technique. By analyzing telluric current anomalies, these authors claim to. have succeeded in the short-term prediction of several earthquakes in Greece. However, their statements are far from being accepted by seismologists (Geller, R. J.:, Earthquake prediction: a critical review, Geophys. J. Int., 1997, 131, 125-150) because they do not fulfill the requirements established by IASPEI (International Association of Seismology and Physics of the Earth's Interior) (Wyss, M. *Second round of evaluations of proposed earthquake precursors*, Pure Appl. Geophys. 1997 149, 3-16), and because the origin of the observed anomalies does not seem well established (Pham, V. N., Boyer, D., Le Mouël, J. L., Chouliaras, G., and Stavrakakis, G. N. *Electromagnetic signals generated in the solid earth by digital transmission of radio waves as a plausible source for some so-called "seismic electric signals"*, Phys. Earth Planet. Int., 1999, 114, 141-163).

Without intention to belittle the merits of earthquake prediction methods based on an analysis of the first group of "ground" precursors, we shall now turn our attention to the less studied second group of earthquake precursors, the existence of which is related to the "over-ground" geospheres - the atmosphere, ionosphere, and magnetosphere. It is from these geospheric regions that the present invention acquires the data necessary to prediction earthquakes.

Among atmospheric precursors there are changes in atmospheric electricity and various perturbations (mostly wave-like forms), including "earthquake clouds". Typical are linear clouds, vortices, and other formations, as shown in FIGS. 8a-8f and 9.

Atmospheric Electric Field ("AEF") Variations before the Mar. 31, 2002 M 6.8 earthquake in Taiwan are discussed in (Kamogawa M., J.-Y. Liu, H. Fujiwara, Y.-J. Chuo, Y.-B. Tsai, K. Hattori, T. Nagao, S. Uyeda, and Y.-H. Ohtsuki. *Atmospheric Field Variations before the Mar.* 31, 2002 *M6.8 Earthquake in Taiwan*. TAO, Vol. 15, No. 3, 397-412, September 2004). AEF variations appear to be due to meteorological effects; however, there seems to have been a correlation between AEF and the M6.8 earthquake. Studies of seismo-electro-magnetics started a few decades ago. The phenomena appear in wide frequency bands ranging from DC and ULF to VHF. In an AEF observation, (Kondo, G. *The variation of the atmospheric field at the time of earthquake*. Mem. Kakioka Magnetic Observatory, 1968, 13, 11-23) measured the AEF during the Matsushiro earthquake swarm in Japan, and reported that the intensity of the AEF slightly decreased (about 10-20%) at the time of 60% earthquakes. The authors have found that AEF variations detected by corona current probes might have appeared before the M6.8 earthquake during the 3-year observation period, which might be the first report of a seismo-AEF correlation. On the other hand, while measurable seismo-ionospheric anomalies also occurred 2 and 4 days before the main shock, no evidence was found that these ionospheric anomalies were associated with the atmospheric electric field variation measured on the ground.

The first known record of clouds as an earthquake precursor is, according to Shou (Shou Zh., D.ll Harrington, Bam Earthquake Prediction & *Space Technology*, http://www.gisdevelopment.net/proceedings/tehran/p_session2/bam.htm, the Chronicle of Lon-De County, China, 381 years ago (recompiled in 1935): "It was sunny and warm; the sky was blue and clear. Suddenly, there appeared threads of black clouds spanning the sky like a long snake. The clouds stayed for a long time, so there would be an earthquake". The predicted earthquake was the magnitude 7.0 Guyuan (36.5 N, 106.3 E), Ningxia province earthquake on Oct. 25, 1622. It was the only big one in Western China (<110 E) within 148 years from Jul. 26, 1561 to Oct. 13, 1709, so this prediction is remarkable. This method was recently revived in Japan and China. On the morning of Mar. 6, 1978 Kagida, the former mayor of Nara city, Japan, predicted the 7.8 Kantow earthquake on Mar. 7 by the clouds.

Shou made his first earthquake prediction in Hangzhou (30.25N, 120.17E), China, by a long line-shaped cloud with a tail pointing in the northwest direction on Jun. 20, 1990. Eighteen hours later, a magnitude 7.7 earthquake struck Iran, and killed or injured 370,000 people. Because the earthquake was the only one bigger than 7 to the northwest of Hangzhou for 333 days from May 31, 1990 to Apr. 28, 1991, Shou believed that there must be a strong relationship between the cloud and the earthquake.

Over the last 10 years, with the aid of satellite weather images available on the Internet, Shou has observed similar correlations in sufficient numbers to enable the development of a successful earthquake prediction method. He has used this method to generate 50 independent predictions certified by the United States Geological Survey (USGS), of which 36 were correct.

Shou first proposed a model for the formation of earthquake clouds. When a huge rock is stressed by external forces, its weak parts break first and small earthquakes occur. For example, the Southern California earthquake data show that small shocks happened before and around all large hypocenters there. The fact that a large earthquake produces a large gap suggests that small shocks generate small crevices, which reduce the cohesion of the rock. Next, underground water percolates into the crevices. Its expansion, contraction, and chemistry further reduce the cohesion. Friction heats the water and eventually generates vapor at high temperature and pressure. The vapor erupts from an impending hypocenter to the surface by the crevices, and rises up. It forms a cloud while encountering cold air. This kind of cloud, whose vapor is from an impending hypocenter, is denoted an earthquake cloud.

Earthquake cloud structures are most likely manifestations of waves propagating in the atmosphere. The waves become visible if the air is wet enough. In dry air these waves are also present but not seen by eye and hardly measurable by any instruments. In certain conditions, we have shown that these waves (and pseudo-clouds) may be manifested on radars. However, in their nature these structures are completely similar to waves in ionospheric plasma, which forms an underlying, and fundamental principle of our invention. These clouds are important to the present invention, because they offer proof of earthquake precursory effects in both the atmosphere (our secondary prediction domain), and the ionosphere (our primary prediction domain).

FIGS. 8*a*-8*f* illustrate six different shapes of earthquake clouds, as originally photographed by Shou from Pasadena (34.14 N, 118.14 W), California. The line-shaped cloud in FIG. 8*a* appeared suddenly like a launching rocket northwest of Pasadena, and predicted the 6.7 Northridge earthquake at 34.21N, 118.53W, in the same direction, on Jan. 17, 1994. The wavelike cloud in FIG. 8*b* was from northwest to northeast, and predicted the 5.3 Northridge earthquake on Mar. 20, 1994. The line-shaped cloud in FIG. 8*c* appeared suddenly from northwest, and predicted the 7.1 off the coast of Northern California during an earthquake at 40.40N, 125.68W on Sep. 1, 1994. The feather-shaped cloud in FIG. 8*d* from northwest to northeast predicted the 6.3 off coast Oregon earthquake at 43.51 N, 127.42W on Oct. 27, 1994. The lantern-shaped cloud in FIG. 8*e* from the northwest predicted the 6.8 off coast Northern California earthquake at 40.55N, 125.53W on Feb. 19, 1995. The radiation-pattern-shaped cloud in FIG. 8*f* rising up from the northeast predicted the 4.4 Joshua Tree earthquake at 34.59N, 116.28W, in the same direction, on Aug. 14, 1996. All of these clouds were not described, nor predicted by meteorology, but both the wave-shaped and radiation-shaped clouds were denoted earthquake clouds by Chinese and Japanese scientists in 1979.

Figure 9:
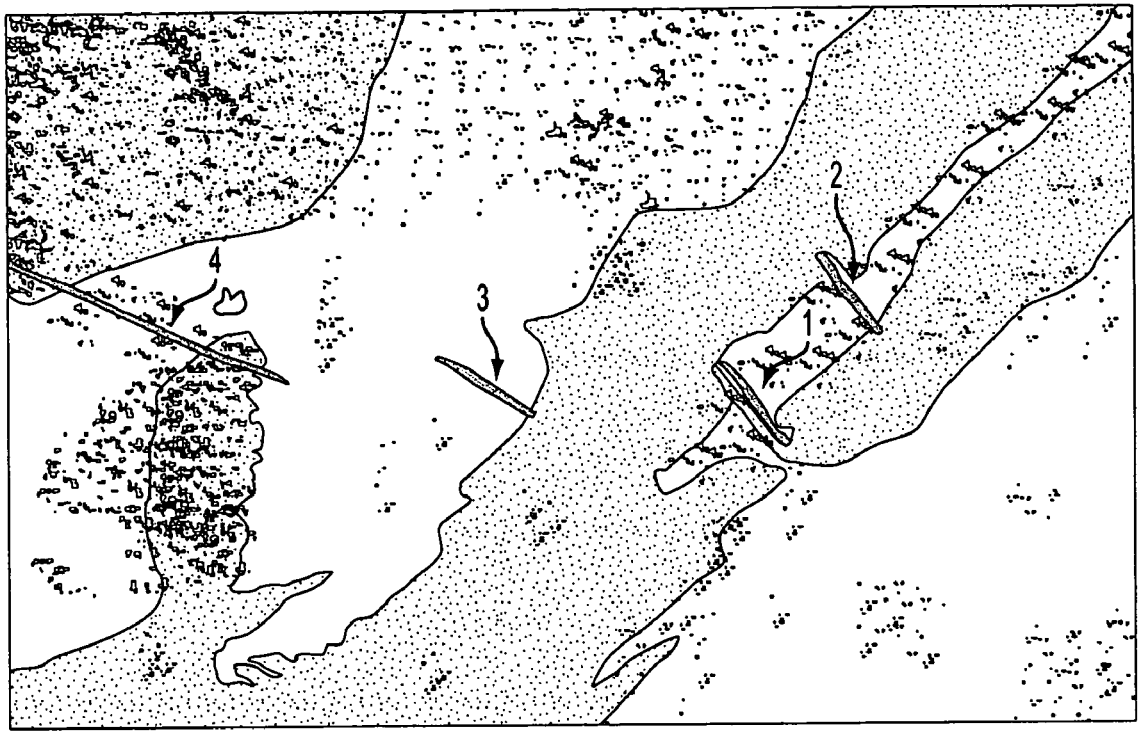

FIG. 9, representing a photograph taken by Shou from Pasadena, Calif., toward the north on Aug. 3, 1997, shows four lines (labeled 1, 2, 3, 4) that appeared about 10 minutes, 8 minutes, 3 minutes, and less than 1 minute respectively, before Shou took the photo. They all emerged suddenly, looking like "line 4," straight, even width, and cloudless in the midst of clouds. They each evolved over about 6 minutes to become a white, linear cloud. In FIG. 9, Lines 1 and 2 had already become clouds, and Line 3 had partially become a cloud, while Line 4 became a cloud 6 minutes after Shou took the photo. On Aug. 21, a pair of M4.9 earthquakes occurred at 38.5N, 118.5W, to the north of Pasadena, and were the only ones of magnitude more than or equal to 4 from 34N to 42N within 175 days from May 7, 1997 to Oct. 28.

The significance of the earthquake clouds is to underscore that earthquake precursory phenomena occur at and above the earth's surface, in the atmosphere, and in the ionosphere, as further discussed below.

Another atmospheric precursor to earthquakes is atmospheric tide disturbances (Arabelos D. N., G. Asteriadis, A. Bloutsos, M. E. Contadakis, and S. D. Spatalas. *Atmospheric tide disturbances as Earthquake precursory phenomena*, Natural Hazards and Earth System Sciences, 2004, 4, 1-7), which relate to the discussion of wave processes, infra. The present invention exploits the phenomena associated with earthquake clouds, by discriminating the geophysical manifestations of the cloud mechanisms using cellular telephone signal fading, cellular telephone noise increases, and radar clutter.

Earthquake clouds are an example of the non-linear process manifestations in the earth's environment (in this case, in the atmosphere), that could be treated as precursory to an earthquake. The present invention exploits the phenomena associated with these non-linear processes, by discriminating the geophysical manifestations of their mechanism using cellular telephone signal fading, cellular telephone noise increases, radar (K-radar and Nexrad, or other radar systems).

Ionospheric precursors. The study of the influence of the seismic activity on the ionosphere began in the mid-20$^{th}$ Century. Some of the observations are the following. An anomaly in the absorption of cosmic ray emission after the 1960 earthquake in Chile lasted for 6 days (Warwick, J. W. *Radioastronomical Techniques for the Studies of the Atmosphere.* (Ed. By J. Aarons). 1963.North Holland, Amsterdam p. 400, Warwick, 1963). Strong changes occurred in the parameters of the ionosphere caused by the large earthquake in Alaska in 1964 (Davis, K. And D. Barker. *Ionospheric Effects Observed Around the Time of the Alaska Earthquake of March,* 1964. J. Geophys. Res., 1965, 70, 2551-2553). Discovery (by Tarantsev, A. And Ya. Birfild. *Discovery: Influence of the Seismic Activity on Ionosphere by Acoustic Waves. Short description of discoveries,* 1963, 128, 157, in Russian) that acoustic waves are involved between seismic activity and the ionosphere.

In 1975, when the Soviet-French experiment "Arkad" was active in the ionosphere and the magnetosphere, processes caused by seismic activity were observed. The identification of these processes took place not at the time of the earthquake but hours or days before. Similar phenomena were observed on "Intercosmos 19", "Intercosmos 24", "OGO-6", "Nimbus", "GEOS 1", "GEOS 2", and other satellites.

A summary of observed ionospheric effects probably related with earthquakes is given by (Gokhberg M.B., Nekrasov A. K., and Shalimov S. L., *A new approach to the problem of the lithosphere-ionosphere coupling before the earthquakes, in: Electromagnetic phenomena related to earthquake prediction,* M. Hayakawa and Y. Fujinawa (Ed.), pp. 619-625, Terra Publ. Sci. Co., Tokyo, 1994) in Table 2 below.

TABLE 2

Summary of observed ionospheric effects probably related with earthquakes

| N$^{\underline{o}}$ | Height | Method | Parameter | Anomaly | Distances (km) | Time |
|---|---|---|---|---|---|---|
| 1 | > F layer | Satellite | ULF-ELF | ↑x10-10$^3$ | 1000 | hours |
| 2 | — | — | ELF-VLF | ↑x10-10$^3$ | φ:1000, λ:6000 | hours-days |
| 3 | F layer | — | density | ↓ | 500 | hours |
| 4 | — | ionosonde | — | ↓ | 500 | hours |
| 5 | — | — | — | ↑ foF2, 20% | φ:1000, λ:6000 | hours-days |
| 6 | — | — | — | ↑x2 for τ ~ 2 h | 500 | Days |
| 7 | — | photometer | 630 nm | ↑15-40% | 200 | Days |
| 8 | — | — | — | ↓15% | 1000 | hours |
| 9 | E layer | ionosonde | density | ↓ | 500 | hours-days |
| 10 | — | — | — | ↑ σ | 500 | Days |
| 11 | — | photometer | 557,7 nm | ↑7% | 200 | hours |
| 12 | — | — | — | ↑ σ | 500 | Days-hours |
| 13 | — | VLF-paths | Δφ | ↑ σ | 2000 | Days-hours |

Statistical results of vertical ionospheric sounding (in one measurement per 15 minutes mode) in seismically-active regions allow one to infer that for strong (M>4.5) earthquakes that occur close to the sounding site (within radius r≦R=exp(M) where R is the radius of deformation for the region with an event of magnitude M: 1) night time sporadic E (Es) is characterized by increasing variability during two days before the earthquake; 2) Es layers tend to bloom; 3) density in the F layer peak starts growing, on average, a few days before the event and has a spatial scale on the order of a few thousand kilometers along latitude and 1000 km in the meredional direction; 4) at the same time, there is also a trend of a relative decrease of the layer density approximately one day prior to the earthquake. This decrease has an eddy-like structure with a scale of ~1000 km, localized at distances ≧500 km from the epicenter; and 5) one to two days before the seismic event, long-period (with time scale of about two hours) wavelike disturbances appear in the spectrum of F layer density variations.

A layer of atomic oxygen emission at 557.7 nm (green line) is located at altitudes of 85-100 km, which corresponds to the E ionospheric layer, and 640 nm emission layer (red line) is at 200-300 km corresponding to the F layer. Therefore, one might expect that the results of photometric measurements and vertical ionospheric sounding would be linked.

Analysis of year-long data series obtained in photometric measurements in seismically active regions leads to the following conclusions: 1) a few days prior to earthquakes the intensity drops as the 557.7 nm line increases, compared with the background period; 2) at the same time, an abnormal increase (on the average) of the green line intensity is detected; 3) for the red line, the growth of emission intensity a few days before an earthquake correlates to a decrease in intensity one day before the event.

It is evident that the growth in intensity drops means an increase in the variability of the 557.7 nm line emission layer. This phenomenon is similar to the increase of sporadic E variability in a seismically-active period. Strong dependence of the 557.7 nm emission intensity on temperature and neutral atmospheric components defines its high sensitivity to dynamical processes and, at the same time, its isolation from plasma. From this, an important conclusion follows: the variability of both parameters (557.7 nm line intensity and Es density) can be caused by one and the same reason—mostly due to the neutral atmospheric component. In particular, when atmospheric internal gravity waves propagate, there are (almost) in-phase variations when sudden increases in 557.7 nm emission intensity coincide with the decreases in Es density emissions. (Gokhberg M. B., Shalimov S. L., *Lithospheric-ionospheric coupling and its modeling,* Russian Journal of Earth Sciences, V.2, No.2, April 2000, pp. 95-107 (in Russian); also Fishkova L. M., *Nighttime radiation of mid-latitude upper atmosphere of the Earth.* Tbilisi, 1983; and K. Eftaxias, P. Kapiris, J. Polygiannakis, A. Peratzakis, J. Kopanas, G. Antonopoulos, and D. Rigas, *Experience of short term earthquake precursors with VLF-VHF electromagnetic emissions;* Natural Hazards and Earth System Sciences, 2003, 3, pp. 217-228.

Major types of ionospheric precursors. According to Kazimirovsky E., M. Herraiz and B. A. De la Morena, "*Effects on the ionosphere due to phenomena occurring below it*", Surveys in Geophysics 24: 139-184, 2003, ionospheric perturbations due to seismic sources can be generally classified into three groups: (1) Anomalies in the parameters or in the behavior of ionospheric layers; (2) Variations in the characteristics of VLF and LF radio waves and in their transmission via the Earth-ionosphere waveguide; and (3) Emissions of VLF and ELF (0.3 kHz) electromagnetic waves in the epicenter region, that can be observed in the ionosphere.

Such ionospheric precursory phenomena as increases of the intensity of luminescence of the ionosphere at the main spectral wavelengths of atomic oxygen 1=5577 Å and 6300 Å are well known. The first mention of these phenomena was described as occurring above Rome in 373 BC. This phenomenon was also reported by Tashkent and Spitak, in Armenia, during the 1966 and 1988 earthquakes, respectively. A magnetospheric phenomena that could be related to precursors are flows of geo-active particles in the magnetosphere.

Anomalies in ionospheric layers. Phenomena in the first group are generally small in size and can be easily masked by other ionospheric perturbations of different origin. Thus, these anomalies are usually more noticeable at night and under quiet magnetic conditions. Logically, their low magnitude diminishes their capability to become real seismic precursors. The first measurements of these anomalies were carried out by ground-based ionosondes located not far from the seismic area (although in several cases anomalies were claimed to have been observed at distances from the epicenter greater than 2500 km), but in recent years most observations have been obtained by topside sounding from satellites (S.Pulinets, K.Boyarchuk. *Ionospheric Precursors of Earthquakes*. Springer-Verlag Berlin Heidelberg 2004). The main anomalies in this first group occur in values of foF2 and foE before an earthquake, sporadic E layer characteristics (Liperovsky V., O. Pokhotelov, E. Liperovskaya, M. Parrot, C.-V. Meister and O.A. Alimov. *Modification of sporadic E-layers caused by seismic activity*, Surveys in Geophysics 21: 449486, 2000), (Ondoh T. Anomalous sporadic-E layers observed before M7.2, Hyogo-ken Nanbu earthquake; *Terrestrial gas emanation model*. Adv. Polar Upper Atmos. Res., 2003,17,96-108), F2 peak height), (Pulinets, S. A. Seismic activity as a source of the ionospheric variability, Adv. Space Res., 1998b, 22, 903-906), (Chmyrev, V. M., Sorokin, V. M., and Pokhotelov, O. A. *Theory of small scale plasma density inhomogeneities produced by conductivity growth of the air above thefuture earthquake center*, In M. Hayakawa (ed.), 1999, Atmospheric and Ionospheric Electromagnetic Phenomena Associated With Earthquakes, Terra. Sci. Publ. Comp., Tokyo, pp. 759-776.) and E layer plasma density (Kim, V. P., Hegai, V. V., and Illich-Svitych, P. V. *On one possible ionospheric precursor of Earthquakes*, Physics Solid Earth, 1994, 30,3, 223-226), Chmyrev et al., 1999, and Liu J. Y., Y. J. Chuo, S. A. Pulinets, H. F. Tsai, and Xiaopang Zeng, *A study on the TEC perturbations prior to the Rei-Li, Chi-Chi and Chia-Yi earthquakes*, in: Seismo-Electromagnetics: Lithosphere-Atmosphere-Ionosphere Coupling, Eds. M. Hayakawa and O. A. Molchanov, TERRAPUB, Tokyo, 2002, pp. 297-301).

In Silina A. S., E. V. Liperovskaya, V. A. Liperovsky, and C.-V. Meister, "*Ionospheric phenomena before strong earthquakes*", Natural Hazards and Earth System Sciences, 2001, 1, 113-118, the number of Es-spread observations is reported to increase one to three days before an earthquake. For "deep" earthquakes the effect is more intensive. Modifications of the Es-layer presumably caused by seismicity are discussed also in Liperovsky V., O. Pokhotelov, E. Liperovskaya, M. Parrot, C.-V. Meister and O.A. Alimov, "*Modification of sporadic E-layers caused by seismic activity*", Surveys in Geophysics 21: 449486, 2000. The effects of a decrease of the mean night-time frequencies fb Es some hours before earthquakes are detected at distances up to 500 km. Also, an increase of the intensity of variations with characteristic time-scales of 10-55 min and 2-5 min is found.

Anomalous sporadic-E layers were observed before the M1., Hyogo-ken Nanbu earthquake and reported in Ondoh T. "*Anomalous sporadic-E layers observed before M7.2, Hyogo-ken Nanbu earthquake; Terrestrial gas emanation model*", Adv. Polar Upper Atmos. Res., 2003,17,96-108 as well. Anomalous foEs increases above 1 MHz were observed at Shigaraki about 120 km northeast of the epicenter and at Kokubunji about 500 km east of it in the daytime on a geomagnetic quiet day of Jan. 15, 1995 before the M7.2 Hyogo-ken Nanbu earthquake of Jan. 15, 1995. A tornado-type upward seismic cloud with rapid air currents over the epicenter region and anomalous increases of radon ion density at an epicentral distance of about 200 km were observed 2 days before the earthquake onset. The anomalous foEs increases and seismic flashes seem to occur about 100 seconds later, after anomalous radon-ion emanations from the active faults.

A decrease in TEC a few days prior to several earthquakes in Taiwan is reported in Liu J. Y., Y. J. Chuo, S. J. Shan, Y. B. Tsai, Y. I. Chen, S. A. Pulinets, and S. B. Yu, "*Pre-earth quake ionospheric anomalies registered by continuous GPS TEC measurements*", Annales Geophysicae, 2004, 22, 1585-1593. Based on GPS TEC data and ionosonde measurements, the authors have found that the pre-earthquake ionospheric anomalies observed in the Taiwan area show that ionospheric TEC decreased markedly during 18:00-22:00 local time ("LT") 1-5 days before the earthquakes. Such changes in TEC form one of several integral elements of the present invention.

TEC decreases two days before a large earthquake of M6.6 occurred on 13 Feb. 2001 at 14:22:05UT in El Salvador, as described in Plotkin V, "*GPS detection of ionospheric perturbation before the 13 Feb. 2001, El Salvador earthquake*", Natural Hazards and Earth System Sciences, 2003, 3, 249-253. However, the authors consider it possible that such TEC changes are simultaneously accompanied by changes due to solar wind parameters and Kp-index.

The foF2 and fbEs decrease 1-2 days before an earthquake were considered in Silina A. S., E. V. Liperovskaya, V. A. Liperovsky, and C.-V. Meister, "*Ionospheric phenomena before strong earthquakes*", Natural Hazards and Earth System Sciences, 2001, 1, 113-118, and a dependence of the intensity on earthquake depth was analyzed. More intense effects are found for deeper earthquakes.

In Popov K. V., Liperovsky V. A, Meister C.-V., Biagi P. F, Liperovskaya E. V, Silina A. S., "*On precursors of earthquakes with scales of 2-3 hours in F-region of ionosphere*", Geophysical Research Abstracts, 2003, Vol. 5, 08416, http://overview.sref.org/1607-7962/gra/EAE03-A-08416, changes in foF2 and in the lower ionosphere are discussed. One to three days before the earthquake, the number of variations with time scales of 2-3 hours increases about 1.4 times in the lower F-layer of the ionosphere at altitudes of about 250 km and distances R<500 from the epicenters. But the number of disturbances of the foF2-frequency with time scales of 2 hours (real altitudes of about 300-350 km, corresponds to the maximal electron density of the F2 layer) does not change or decrease before the earthquakes. The results are confirmed by analysis of hourly data of 6 mid-latitude stations over a total of more than 150 years and more than 150 strong earthquakes. It is concluded that variations of the foF2-frequency with time scales of 2-3 hours cannot be treated as precursors whereas the increase in such variations in the lower ionosphere can. This is one reason the preferred embodiment of the present invention is for use of both HORT and LORT.

Recently, Biagi P. F., R. Piccolo, L. Castellana, T. Maggipinto, A. Ermini, S. Martellucci, C. Bellecci, G. Perna. V.

Capozzi, O. A. Molchanov, M. Hayakawa, and K. Ohta, "*VLF-LF radio signals collected at Bari (South Italy): a preliminary analysis on signal anomalies associated with earthquakes*", Natural Hazards and Earth System Sciences, 2004, 4, 685-689, conducted a preliminary but detailed analysis of the correlation between the global seismic activity distribution and plasma density variations recorded on board the Russian satellite Intercosmos 24. The large size of the database analyzed (cold plasma density averaged from about 10^7 points and earthquakes with magnitude greater than 5.0 occurring between 1989 and 1991) provides a good statistical grounding. With this information, the authors found a significant correlation between seismicity and plasma density at altitudes varying from 500 to 800 km for magnetically quiet days (Kp <3) and during daytime hours (10-16 LT).

Generally, it should be noted that the sign and the characteristics of these anomalies vary from one case to another, which diminishes their applicability. In many cases these perturbations take place 1-5 days before the earthquake. A summary of these anomalies and some differences between them and other kinds of ionospheric perturbations can be found in Pulinets, S. A., "*Seismic activity as a source of the ionospheric variability*", Adv. Space Res., 1998b, 22, 903-906. However, the description of ionospheric precursors of earthquakes made by the authors seems to be too tendentious and the conclusions too prescriptive.

Changes in VLF/LF characteristics and propagation anomalies. The application of sub-ionospheric VLF/LF characteristics and propagation anomalies to earthquake prediction (the second group of perturbations) was introduced by Russian investigators who, using signals from the Omega transmitters (10-15 kHz) and the Omsk-Liberia and Omsk-Reunion links, found significant anomalies of amplitudes and phases preceding earthquakes with magnitude higher than 4 (Gokhberg M.B., Nekrasov A. K., and Shalimov S. L., *A new approach to the problem of the lithosphere-ionosphere coupling before the earthquakes, in: Electromagnetic phenomena related to earthquake prediction*, M. Hayakawa and Y. Fujinawa (Ed.), pp. 619-625, Terra Publ. Sci. Co., Tokyo, 1994). Ninety percent of the perturbations before seismic events were observed at night. The anomalies reached 20 ms for phase delays and 100% for amplitudes, lasted 1.5-7 hours and were observed 1-5 days before the earthquakes. These perturbations confirmed the appearance of anomalous areas in the lower ionosphere preceding the seismic event. Use of this technique has been continued by many authors (see, for instance, Molchanov O., A. Schekotov, E. Fedorov, G. Belyaev, and E. Gordeev, "*Preseismic ULF electromagnetic effect from observation at Kamchatka*", Natural Hazards and Earth System Sciences, 2003, 3, 203-209, and Molchanov O., E. Fedorov, A. Schekotov, E. Gordeev, V. Chebrov, V. Surkov, A. Rozhnoi, S. Andreevsky, D. ludin, S. Yunga, A. Lutikov, M. Hayakawa, and P. F. Biagi, "*Lithosphere-atmosphere-ionosphere coupling as governing mechanism for preseismic short-term events in atmosphere and ionosphere*", Natural Hazards and Earth System Sciences, 2004, 4, 757-767) but is seriously questioned by others. The method seems to be useful only for crustal earthquakes with the epicenter located inside the Fresnel zone (Varotsos, P. And Alexopoulos, K. 1984a, *Physical properties of the variations of the electric field of the Earth preceding earthquakes I*, Tectonophysics, 1984a, 92-98; Varotsos, P. And Alexopoulos, K.: 1984b, Physical properties of the variations of the electric field of The Earth preceding earthquakes II. Determination of epicenter and magnitude, Tectonophysics, 1998b, 110, 99-125; and Varotsos, P. And Alexopoulos, K.: 1987, *Physical properties of the variations of the electricfield of the Earth preceding earthquakes III. Determination of epicenter and magnitude*, Tectonophysics 136, 335-339).

Recently, Biagi P. F., R. Piccolo, A. Ermini, S. Martellucci, C. Bellecci, M. Hayakawa, V. Capozzi, and S. P. Kingsley, "*Possible earthquake precursors revealed by LF radio signals*", Natural Hazards and Earth System Sciences, 2001, 1, 99-104 reported variations in attenuation of low frequency ("LF") radio signals observed at ground-based receivers. Electric field strength measurements using MCO (216 kHz, France) broadcasting station, CLT (189 kHz, Italy) and CZE (270 kHz, Czech Republic) stations were performed at two sites in central Italy. During the monitoring period some evident attenuation of the electric field strength had been observed in some of the radio signals at some of the receivers. The duration of the attenuation observed was several days, so it could possibly be related to particular meteorological conditions. On the other hand, this phenomenon might represent precursors of moderate (M3.0-M3.5) earthquakes that occurred near the receivers (within 50 km) along the transmitter-receiver path. In this case, it is possible that the pre-seismic processes could have produced irregularities in the troposphere, such as ducts, reflecting layers, and scattering zones, so that some local tropospheric defocusing of the radio signals might have occurred.

Biagi P. F., R. Piccolo, L. Castellana, T. Maggipinto, A. Ermini, S. Martellucci, C. Bellecci, G. Perna. V. Capozzi, O. A. Molchanov, M. Hayakawa, and K. Ohta, "*VLF-LF radio signals collected at Bari (South Italy): a preliminary analysis on signal anomalies associated with earthquakes*", Natural Hazards and Earth System Sciences, 2004, 4, 685-689 used an OmniPAL receiver installed in Southern Italy to measure the electric field strength of five VLF-LF signals transmitted from United Kingdom (f-16 kHz), France (f-20.9 kHz), Germany (f=23.4 kHz), Iceland (f=37.5 kHz) and Italy (f-54 kHz) with 5 second sampling. Two distinct intensity decreases in April 2002 and in August-September 2002 were revealed in the signal from the Italian transmitter. At those times, earthquakes of M=4.3 and M=5.6 respectively took place near the transmitter-receiver path and a precursor effect in the previous decreases appeared. All of the five radio trends in the time interval March 2002-February 2003 were more disturbed than in other periods, which might be due to general excitation of the interface between the African and European plates. By examining the terminator time (evening) changes for the Italian transmitter in July-September 2002 the authors found significant deviations from the mean value at the end of August, which is supportive of precursory ionospheric signatures of earthquakes.

Results of sub-ionospheric radio LF monitoring prior to the Tokachi (M=8, Hokkaido, 25 Sep. 2003) earthquake are reported in Shvets A. V., M. Hayakawa, and S. Maekawa, "*Results of subionospheric radio LF monitoring prior to the Tokachi (M=8, Hokkaido, 25 Sep.* 2003) *earthquake*", Natural Hazards and Earth System Sciences, 2004, 4, 647-653. The authors analyzed nighttime amplitude fluctuations of the Japanese Time Standard Transmitter (JG2AS, 40 kHz) signal received at Moshiri (Japan, 142 E, 44N) and at Petropavlovsk-Kamchatski (Russia, 158E, 53N). As possible precursory signatures, synchronous intensification of quasi-periodical 16-day variations of the dispersion in the signals received at both observation stations before the earthquake was recorded. The strongest deviations observed as a rule were depletions of signal amplitude probably connected with increase of loss in the ionosphere by the enhancement of turbulence. This is due to dissipation IGW at the lower ionosphere elevations.

The existence of electromagnetic emissions originating during the pre-seismic period (a third group of perturbations) was first observed at ground level (Gokhberg M.B., Nekrasov A. K., and Shalimov S. L., *A new approach to the problem of the lithosphere-ionosphere coupling before the earthquakes, in: Electromagnetic phenomena related to earthquake prediction*, M. Hayakawa and Y. Fujinawa (Ed.), pp. 619-625, Terra Publ. Sci. Co., Tokyo, 1994, and Gokhberg M.B., Nekrassov A.K., Shalimov S.L. On the effect of unstable release of greenhouse gases in seismo-active region on the ionosphere. Physics of Earth, 1996, 8, 52-55, in Russian) and was unsuccessfully proposed to IASPEI as a seismic precursor in 1997. The corresponding spatial scale of the mosaicity of electromagnetic emission precursors is studied in Morgounov V. A. and A. G. Zdorov, "*Spatial Scale of the Mosaicity of Electromagnetic Emission Precursors*", Izvestiya, Physics of the Solid Earth, 2003, Vol. 39, No. 11, pp. 885-897 (Translated from Fizika Zemli, No. 11, 2003, pp. 16-28). The results of in-situ investigations of short-term precursors of weak earthquakes in the territory of the Kavminvody research area over the period from 1991 through 2001 were presented in that work, showing that the spatial mosaicity scale of weak earthquake precursors estimated from synchronous continuous observations of EME at network stations is approximatelylo kilometers. Simultaneous recording of EME and electrical resistivity showed that EME outbursts correlate in time with the largest gradients of variations in electrical resistivity. Network observations indicate the existence of EM disturbances moving away from the epicenter of a forthcoming earthquake at velocities of a few kilometers per day, which comports with available information on deformation waves.

Specific observations of VLF radiation in the upper ionosphere over seismo-active areas made onboard satellites were initiated by the low-apogee Intercosmos 19 satellite in the late 1970s. This satellite crossed zones of well-located seismic activity and detected an anomalous increase in the intensity of radiowave emissions with frequencies ranging between 0.1 and 16 kHz.

This kind of observation has continued by many other satellites over very different seismic areas (see, for instance, (Molchanov O., A. Schekotov, E. Fedorov, G. Belyaev, and E. Gordeev. Preseismic *ULF electromagnetic effect from observation at Kamchatka*, Natural Hazards and Earth System Sciences, 2003, 3, 203-209, and Molchanov O., E. Fedorov, A. Schekotov, E. Gordeev, V. Chebrov, V. Surkov, A. Rozhnoi, S. Andreevsky, D. Iudin, S. Yunga, A. Lutikov, M. Hayakawa, and P. F. Biagi. *Lithosphere-atmosphere-ionosphere coupling as governing mechanism for preseismic short-term events in atmosphere and ionosphere*. Natural Hazards and Earth System Sciences, 2004, 4, 757-767), also see (Chmyrev, V. M., Sorokin, V. M., and Pokhotelov, O. A. *Theory of small scale plasma density inhomogeneities produced by conductivity growth of the air above the future earthquake center*, In M. Hayakawa (ed.), 1999, *Atmospheric and Ionospheric Electromagnetic Phenomena Associated With Earthquakes*, Terra. Sci. Publ. Comp., Tokyo, pp. 759-776). See Kim, V. P., Hegai, V. V., and Illich-Svitych, P. V. *On one possible ionospheric precursor of Earthquakes*, Physics Solid Earth, 1994, 30,3,223-226), and see (Borisov, N., Chmyrev, V., and Rynbachek, S. *A new ionospheric mechanism of electromagnetic ELF precursors to earthquakes*, J. Atmos. Sol-Terr. Phys., 2000, 63, 3-10). Although in some cases no clear correlation between anomalous electromagnetic radiation in the upper ionosphere and seismic activity in the area below was established, the large number of cases in which this correlation seems clear gives strong grounds for belief in a real influence of earthquakes on the ionosphere. Satellite-based measurements have also led to the detection of electric fields and hydromagnetic waves in the ionosphere over seismo-active areas (Chmyrev).

The diversity of the phenomena described above indicates that the physical processes involved in pre-cursor generation must be multiple and complex. Following Kazimirovsky E., M. Herraiz and B. A. De la Morena, "*Effects on the ionosphere due to phenomena occurring below it*", Surveys in Geophysics 24: 139-184, 2003, there appear to be two possible mechanisms of energy transfer from lithosphere to ionosphere.

First considerations necessarily refer to the mechanisms that generate the electric and magnetic anomalies in the hypocentral area preceding earthquakes. At this point, due to the low efficiency of stress variations in generating electromagnetic signals, the existence of some other physical processes is required. Emanation of chemical substances (mainly radon, light gases and aerosols with a high metal content) from the Earth has long been considered a strong candidate by many authors. Changes in the chemistry of the near-ground layer caused by these emissions can alter the electrodynamic characteristics (particularly the electrical conductivity) of the atmosphere over the seismo-active area and cause strong modifications (up to hundreds of Volts per meter) of the vertical electric field near the surface (Kim, V. P., Hegai, V. V., and Illich-Svitych, P. V. *On one possible ionospheric precursor of Earthquakes*, Physics Solid Earth, 1994, 30,3,223-226). The anomalies observed in the transmission of VLF waves over the seismic area can be explained by these changes in the electrodynamic conditions as well.

A second factor concerns transmission of electromagnetic anomalies from the epicentral area to the ionosphere (Kim et al., 1994) solved this problem for a strong electrostatic field (assumed to have a Gaussian-like distribution) and showed that the efficiency of the penetration depends directly on the extent of the seismic source area, being noticeable only when the scale exceeds 100 kilometers, and the initial vertical field exceeds 1000 Volts per meter. They also observed that the efficiency at night is much greater than in the daytime.

The third factor (effects on the ionosphere) is the influence of this quasi-stationary electric field. The electron temperature of the E layer is increased by Joule heating, giving rise to small-scale ionospheric anomalies (Pulinets, 1998) and AGW (Hegai et al., 1997) that generate a dissipative instability at the Brunt-Vaisala frequency and give rise to periodic irregularities in the horizontal conductivity. Observed ELF waves can be explained in either the context of the interaction of these irregularities with the electric field and Alfven waves (Chmyrev et al., 1999) or, according to (Borisov et al., 2001), as the result of the emission in the upper ionosphere of whistler mode waves. These latter waves are generated by the interaction of thunderstorm-related electromagnetic radiation and irregularities in ionospheric conductivity in the lower ionosphere with an earthquake-related origin.

The second possible mechanism of wave energy transfer from lithosphere to the ionosphere is AGW excitation by small (vertical) displacements of the ground caused by pre-seismic and seismic events.

Since 1960, experiments have shown that perturbations of the ionosphere can occur after earthquakes, by way of dynamic coupling between seismic surface waves and the atmosphere. It is known that the atmosphere serves as an amplifier for upward propagating AGW and IGW due to the exponential decrease of its density with altitude. Thus, even very small-amplitude (but large scale for tectonic processes) atmospheric oscillations originating from near-surface sources can be transformed to high-amplitude waves at the lower ionosphere elevations.

After large earthquakes, the vertical displacement due to Rayleigh wave propagation induces upward-propagating AGW in the atmosphere through continuity of displacement at the surface. This is depicted in FIG. 4.

Modeling results (Artru J., Ph. Lognorme. *Normal modes modelling of post-seismic ionospheric oscillations*, Geophysical Research Letters, 2001, V. 28, No. 4, 697-700) show, however, that viscosity effects attenuate the amplification of oscillations at large heights. For an earthquake of magnitude 8, surface waves typically produce teleseismic effects of a few millimeters displacement of the ground. Those displacements are amplified to one hundred meters at 100 kilometer elevations in the ionosphere. At higher altitudes, these displacements are attenuated by the increasing dynamic viscosity of the rarefied atmosphere and are finally completely lost in heat. A comparison of 1999-2000 results of HF Doppler sounder measurements of vertical oscillations of ionospheric layers with modeling such signals using 1-D normal-mode simulations is described in Artru J., Th. Farges and Ph. Lognorme "*Acoustic waves generated from seismic surface waves: propagation properties determined from Doppler sounding observations and normal-mode modeling*", Geophys. J. Int., 2004, 158, 1067-1077. Observed velocity and amplification of the atmospheric waves show good agreement from the ground up to moderate sounding altitudes (140-150 km); however, at higher altitudes the propagation speed is found to be much smaller than predicted and attenuation is underestimated. In the authors' opinion, this shows that the standard formalism of AGW in the atmosphere, as used in their simulations, cannot efficiently describe propagation in the ionized atmosphere.

Some authors believe that effects of AGW propagation could in principle allow for the whole complex of ionospheric phenomena attributed to seismicity as it is described here below (Gokhberg, 2000). To-date, there is no common notion that would allow interpreting the observational results of the ionosphere above seismically-active regions, although there is no lack of hypotheses. However, if the presence of IGW is assumed, the whole range of measurements listed in Table 1 could be explained.

Indeed, when propagating upwards, the IGW will dissipate (mostly at altitudes 80-100 km), which will result in an increase of turbulence and a growth of neutral temperatures, T.

It was believe earlier that IGW dissipate at altitudes of the mesopause and could not penetrate above, into the mesosphere. Recent research has shown that this is not the case. In fact, the IGW are generated by non-linear processes of the medium coupling with acoustic modes in the mesopause, from which location the IGW propagate upwards, reaching ionospheric and magnetospheric heights. However, dissipation of the "primary" IGW, propagating from the earth's surface upwards, does take place at altitudes of 80-100 kilometers.

Long-period wave dissipation provides the most contribution (dozens of K/day). The increase in neutral temperature will lead to: 1) abrupt (drop-like) decrease of 557.7 nm intensity (since $I_{557.7} \sim [O]^3/T^2$); 2) rapid reduction of temperature gradient dT/dh at heights 80-120 km, which is also supported by turbulence enhancement manifested as a growth in the coefficient of turbulent diffusion $K \sim (dT/dh)^1$.

Here, due to the growth in K, vertical turbulent transfer of molecular NO and atomic O from the region of their active production (100-150 km) will occur. Growth in T and NO concentration will result in increasing electron concentration in the lower ionosphere (and, thus, to phase and amplitude anomalies at radio-wave paths, see Table 2). Redistribution of O will begin to increase the intensity of 557.7 nm emission, thus compensating for the "drop"-effect caused by T growth. Increase in 557.7 nm intensity on average can be explained here by predominant effect of one of the rival processes (either growth of T or transfer of O atoms)- the transfer of atomic oxygen.

The presence of IGW is not left unnoticed. First, in vertical sounding at a given height (for example, h ~300 km) IGW should be manifest as quasi-wave oscillations in density, which is observed in practice (see Table 2). Second, it becomes possible to tie enhanced variability of Es layers density with the presence of long-period IGW within a framework of wind shear theory.

It has been experimentally proven and theoretically substantiated that long-period IGW can act as triggers for development of plasma bubbles, or regions of depleted density (due to Rayleigh-Taylor, R-T, instability in the equatorial ionosphere and Perkins, P, instability in the midlatitude ionosphere) (Kelley M. C., *The Earth's ionosphere: Plasma Physics and Electrodynamics*, 485 pp., Academic Publ. Comp., San Diego, Calif., 1989). Regions of decreased plasma densities are, evidently, correlated to decreased intensity of 630 nm emission. In turn, sharp plasma irregularities - the boundaries of bubbles could be a source of ELF-VLF waves detected by satellites (see Table 1). For example, within a range of 140 Hz to 15 kHz filter channel of Intercosmos-19 satellite, electrostatic noises at 140 Hz and 15 kHz were maximum amplitudes.

It is natural to link the generation of drift-dissipation instability with the irregular boundaries of regions of decreased plasma densities. In the weak-collision plasma of the upper ionosphere, SLF-ULF waves ($f \leq 140$ Hz) are associated with the development of this instability. Here, the "trough" in the noise intensity within a range of 200 Hz to 1000 Hz observed in experiments is caused by damping of the drift waves by ion-ion collisions (Galeev, A. A., Moiseev, S S, Sagdeev, R. Z., *Theory of stability of inhomogeneous plasma and anomalous diffusion*, Atomnaya energiya, No. 15, pp 451-467, 1963 (in Russian).

As a result of R-T/P instabilities, formation of depleted plasma regions and subsequent neutral heating, an upward motion of the neutral component will start. This upward motion of neutrals will lead to plasma density enhancement above the peak F layer since this will hamper plasma "dripping" down to the region of enhanced recombination.

Finally, the relative locality of ionospheric perturbations associated with earthquake preparation becomes clear (see Table 2 where the distances between the epicenter and detected precursors vary from a few hundreds of kilometers up to several thousand kilometers. Indeed, from the dispersion equation for undamped IGW we determine that the group velocity is almost horizontal. If the wave period is of the order of 2 hours, $h \sim 10^2$ km, then for such waves horizontal distances $L\perp$ at which ionospheric effects are detected will be of the order of 2000 km, in accordance with experimental data (see Table 2).

From the above it is clear that there are IGW that should be considered as a mechanism of lithospheric-ionospheric coupling in seismic regions. This is more natural if one takes into account that atmospheric stratification facilitates an enhancement of neutral component perturbations rising close to the ground. Note that the presence of acoustic (infrasound) range perturbations is not proven by direct measurements in seismic regions, although successfully modeled. At the same time, in this region there are favorable conditions for IGW generation.

For example, for strong enough earthquakes, variations in the elastic energy flow can be caused by so-called seismo-gravitational oscillations having periods on the order of 1-3 hour (Lin'kov E. M., Petrova L. N., Zuroshvili D. D. *Seismo-gravitational oscillations of the Earth and related atmospheric disturbances*, USSR AS Reports, 1989, 306,2, 315-317. (in Russian)). These global oscillations exist permanently but intensify a few days prior to large earthquakes. According to experiments, long-period oscillations act as a source of accompanying atmospheric oscillations (for example, lines of spheroidal oscillation multiplet $_0S_2$ were revealed in the spectra of micro barograph measurements). Most significant vertical displacements of the ground surface should take place in seismically-active regions with the pronounced block structure of the earth's crust, like tidal deformations which are most significant in regions of crustal faults (Latynina, L. A., Shishkina, T. P., *On the intensity of tidal and tectonic motions in the Surkhobfault zone*, Izvestiya AN SSSR, Earth's Physics, 6, pp. 87-93, 1978 (in Russian). Acting like a piston on the atmosphere, these oscillations can generate IGW (Shalimov S. L., Lithosphere-ionosphere relationship: *A new way to predict earthquakes?*, Intern. Geosci. Newsmag. Episodes, 1992, 15, 4, 252-254).

Another mechanism of IGW generation predominantly in seismically-active regions immediately before an earthquake is associated with results obtained in satellite studies of the infrared radiation from the Earth. In particular, analysis of continuous (100-250 days) nighttime heating images obtained from NOAA series satellites during a 10-year interval made it possible to detect several anomalies of infrared radiation flow in the Mediterranean seismic region (Gorny V. I., Salman A. G., Tronin A. A., Shilin B. V. Outgoing infrared radiation of the Earth as a marker of seismic activity. USSR AS Reports, 1988, 301, 67-69, in Russian). Existence of two types of flow anomalies (stationary and non-stationary) has been shown. The last arise, as a rule, in regions of fault intersections and have an enhanced (by a few degrees) temperature, lifetimes of the order of 2-10 days and an area of the order of $10^4$ m$^2$. The most interesting conclusion following, in particular, from analysis of non-stationary anomaly behavior of an infrared anomaly in the area of the Karatau and Tamdy-Tokrau fault intersection is a coincidence of anomaly intensification with the period of seismicity (a few days before an earthquake) of crustal blocks adjacent to these faults. Anomalies precede only crustal earthquakes with M$\geq$4,3. These non-stationary thermal anomalies can be associated with local greenhouse effects caused by intensification of lithospheric gases ($CH_4$, $CO_2$) degassing before earthquakes. Unstable thermal anomalies can be sources for IGW (Gokhberg et al., 1996, Shalimov 1992, and Gokhberg et al., 1994).

It is well known that among the most prominent manifestations of activity before earthquakes there is a change in dynamics of lithospheric gas release, which is caused by the high permeability of fault zones in seismically-active regions (Voitov G. I., Dobrovol'ski I. P. *Chemical and isotopic-carbon instabilities of natural gas flows in seismo-active regions*, Physics of Earth, 1994, 3, 20-31, in Russian)). Correspondingly, fluid motion leads to increasing density of gas flow from sub-soil into the near-ground atmosphere. Lithospheric gas content in the near-ground atmosphere above tectonically broken structures is, on average, a few times higher than above regions without tectonic breaking. Release of natural gases becomes most dense (often increasing by several orders in magnitude) during periods of tectonic earthquakes preparation, producing in the near-surface atmosphere abnormal effects like enhanced (compared to background) concentrations of specific, mostly carbon gases: $CO2$, $CH4$ and its homologues (Voitov, Dobrovol'sky, 1994).

Essential for the further discussion trait in the dynamics of gases release is non-stationarity of degassing. Since a few-hour insertion of gas release exists, gas variations are modulated by deformation processes on similar time scales. These can be seismo-gravitational pulsations of the Earth with periods of 1 to 3 hours (Lin'kov, E. M, Petrova, L. N., Zuroshvili, D. D., *Seismo-graviational oscillations of the Earth and related atmospheric disturbances*, Doklady AN SSSR, 306, 2, pp. 315-317, 1989) as well as tides. Experimental evidences have been obtained for periodic variations of gaseous concentrations of radio-geneous gases with periods from two hours to several days in thermal waters. In particular, modulation has been found recently of carbon-hydrogen gases inflow from interstitial traps into seam headers of tectonically complex oil and gas fields by natural oscillations of the Earth (Voitov et al., 1992). In seismic regions the degassing periodicity can be complicated by releases occurring immediately before an event. But for our purposes, only low-frequency non-stationarity of lithospheric gases inflow into the near-ground atmosphere where concentrations above the ambient background are reached during periods of earthquake preparation.

Thus, we can presume at least three mechanisms of predominant generation of IGW in seismically active regions. These mechanisms can be related with 1) "piston" motion of the Earth crust that has a block structure; 2) unstable thermal anomalies caused by greenhouse gas release into the atmosphere through fault zones of the Earth crust; and 3) unstable inflow of lithospheric gases in the atmosphere.

A comparison of IGW generation mechanisms efficiency shows that the energy flow in case of IGW generation by the Earth's natural oscillations is of the order of $2 \cdot 10^{31\ 3}$ erg/cm$^2$s and in case of generation by the gas inflow of the order of $10^{-1}$ erg/cm$^2$s, that is, two orders more efficient. Note that the wave parameters (in particular, the altitude where the waves dissipate) depend on specific conditions (including the wind or phase velocity direction). Correspondingly, with different wave parameters we shall have one or another type of IGW transformation into ionospheric plasma perturbations, and one or another type of ionospheric effects caused by IGW transit will develop.

Acoustic-gravity waves as a phenomenon possibly triggering a wide range of electromagnetic ionospheric precursors are discussed also in Grimalsky V., S. Koshevaya, J. Siqueiros, R. Perez Enriquez, A. Kotsarenko, "*Acoustic and acousto-gravitj wave pulses caused by sources of a seismic origin*", Geophysical Research Abstracts, Vol. 5, 04514, 2003, where specific features of propagation of AGW excited by seismic events are considered. Nonlinear excitation of ultra-low frequency (ULF<1 Hz) AW by extremely low frequency (ELF, 10-1000 Hz) acoustic bursts are also discussed. It is shown that the ELF wave is excited as the burst-like envelope of a finite transverse scale by a seismic motion of the Earth's surface. Then, it propagates upwards and is subject to both non-linearity and dissipation. Nonlinearity leads to the generation of higher harmonics and, thus, to a saw-tooth-like wave structure, and to an increase of the ULF part of the wave spectrum at the altitudes 0-100 km. Only ULF AGW can reach the ionosphere dynamo layer (120-200 km), where this wave excites the ionosphere plasma waves.

Some authors believe that the main mechanism responsible for earthquake onset, IGW excitation and, thus, ionospheric disturbances development accompanying earthquakes is upward migration of fluid substrate matter (Molchanov, O., Fedorov, E., Schekotov, A., Gordeev, E., Chebrov, V., Surkov, V., Rozhnoi A., Andreevsky, S., Iudin, D., Yunga, S, Lutikov, A., Hayakawa, M., and Biagi, P. F., *Lithosphere-atmosphere-ionosphere coupling as governing mechanism for pre-seismic short-term events in atmosphere and ionosphere*, Natural Hazards and Earth System Sciences, 4, pp., 757-767, 2004).

Upward migration of fluid substrate matter (bubble) can lead to ousting of the hot water/gas near the ground surface and cause an earthquake itself in the strength-weakened area. Thus, time and place of the bubble appearance could be random values, but the earthquake, geochemistry anomaly, and foreshocks (seismic, SA and ULF electromagnetic) are causally connected. Atmospheric perturbation of temperature and density could follow pre-seismic hot water/gas release resulting in the generation of atmospheric gravity waves (AGW) with periods in a range of 6-60 min. Seismo-induced AGW could lead to modification of the ionospheric turbulence and to the change of over-horizon radio-wave propagation in the atmosphere, perturbation of LF waves in the lower ionosphere and ULF emission depression at the ground.

But, whatever the mechanism of AGW generation may be, from the multitude of experimental evidence and theoretical studies one can conclude with certainty that these waves are indeed related to seismicity and they do cause noticeable perturbations at ionospheric heights and thus can, if analyzed carefully, serve as precursory phenomena. We have demonstrated this to be true in the present invention.

Surface seismic waves that can excite wavelike perturbations in the ionospheric plasma are considered in Kouba J. "*Measuring seismic waves induced by large Earthquakes with GPS.*", Stud. Geophys. Geod., 47 (2003), 741-755. GPS measurements of surface seismic waves are reported. Surface seismic waves with periods of about 20 sec and amplitudes of up to 20 cm were detected up to 4,000 km from the epicenter of M7.9 Denali Fault, Alaska earthquake of Nov. 3, 2002. This indicates that, in principle, wavelike ionospheric disturbances can arise even distant from the earthquake epicenter.

AGW have been observed both near the seismic source and at teleseismic distances. In general, two types of measurements aimed at detecting waves in the ionosphere can be performed: (1) Doppler sounding [e.g., (Ducic V., J. Artru, Ph. Lognorme, *Ionospheric remote sensing of the Denali Earthquake Rayleigh surface waves*. Geophysical Research Letters, 2003, 30, No. 18, pp. SDE 8-1 . . . SDE 8-4, 1951), which provides the vertical velocity of the ionosphere (Artru, J., Lognorme, P., Blanc, E., *Normal modes modeling of post-seismic ionospheric oscillations*, Geophysical Research Letters, V. 28, No. 4, pp. 697-700, 2001). at the reflection altitude of the sounding electromagnetic signal and for the biggest quakes Doppler ionospheric soundings have revealed displacements of several tens of meter of the ionized layers E and F; (2) Total Electron Content measurements. The first published observations were obtained after the great Alaska earthquake in 1964. Using ionospheric sounding networks, (Bolt, B. A., Seismic airwaves from the great alaska earthquake, Nature, 1964, 202, 1095-1096.) and (Davis, K. And D. Barker. Ionospheric Effects Observed Around the Time of the Alaska Earthquake of March, 1964. J. Geophys. Res., 1965, 70, 2551-2553.) observed perturbations showing both an atmospheric perturbation propagating from the epicenter region and the ionospheric signature of the Rayleigh wave propagation at the sounder location. An extensive literature exists that documents examples of the coupling between terrestrial events and the ionosphere. A review of earlier observations is found in (Blanc, E., 1985. *Observations in the upper atmosphere of infrasonic waves From natural or artificial sources: A summary*, Ann. Geophys., 1985, 3, 673-688.).

Recent works have similarly identified these two different types of coupling: Calais, E. & Minster, J. B., "*GPS detection of ionospheric perturbations Following the Jan. 17, 1994, Northridge earthquake*", Geophys. Res. Lett., 1995, 22, 1045-1048, detected perturbations in the ionospheric total electron content above Southern California after the Northridge earthquake (M=6.7, 1994 January 17) using GPS measurements; and (Ducic, V., Artru, J., Lognorme, Ph., *Ionospheric remote sensing of the Denali Earthquake Rayleigh surface waves*, Geophysical Research Letters, 30, No. 18, pp. SDE 8-1. SDE 8-4, 2003) observed the perturbation associated with the Rayleigh wave propagation from the M7.9 Denali earthquake (2002 Nov. 3) and were able to measure the horizontal group velocity of the waves in the ionosphere. Detection using satellite to ground receiver signals (GPS in these cases) is, however, challenging because they are sensitive to perturbations at high altitude, where most of the signal is already dissipated; furthermore, the integrated nature of the measurement acts as a low-pass first-order filter, and the TEC perturbations are not a direct measurement of the velocity field.

Methods for detecting the ionospheric response of strong earthquakes are reported in (Calais and Minster, 1995), of rocket launches in (Calais and Minster, 1996), and of industrial surface explosions in Fitzgerald, T. J., "Observations of total electron content perturbations On GPS signals caused by a ground level explosion", J. Atmos. Terr. Phys., 1997, 59, 829-834; (Calais et al., 1998). In theses works the AW phase velocity was determined by estimating the time delay of SAW arrival at sub-ionospheric points corresponding to different GPS satellites observed at a given time.

Afraimovich E. L., Kosogorov E. A., Lesyuta O. S. Et al. "*Geomagnetic control of the spectrum of traveling ionospheric disturbances based on datafrom a global GPS network*", Ann. Geophys., 2001a, 19, No. 7, 723-731, and Afraimovich E. L., N. P. Perevalova, A. V. Plotnikov, and A. M. Uralov "*The shock-acoustic waves generated by earthquakes*", Annales Geophysicae, 2001, 19, 395-409, investigate the form and dynamics of "fast" acoustic waves—shock-acoustic waves generated by earthquakes. They use the method for detecting and locating the sources of ionospheric impulsive disturbances, based on using data from a global network of receivers of the GPS navigation system, and require no a-priori information about the place and time of the associated effects. The practical implementation of the method is illustrated by a case study of earthquake effects in Turkey (17 August and 12 Nov. 1999), in Southern Sumatra (4 Jun. 2000), and off the coast of Central America (13 Jan. 2001). The authors found that the time period of the ionospheric response was 180-390 seconds, and the amplitude exceeded, by a factor of two as a minimum, the standard deviation of background fluctuations in total electron content in this range of periods under quiet and moderate geomagnetic conditions. The elevation of the wave vector varied within a range of 20-44°, and the phase velocity (1100-1300 m/s) approached the sound velocity at the heights of the ionospheric F-region maximum. The calculated (by neglecting refraction corrections) location of the source roughly corresponds to the earthquake epicenter.

Another, unusual type of TEC variation -TEC spikes (TECS)— are studied in Afraimovich E. L., E. A. Kosogorov, and A. V. Plotnikov, "*Shock-Acoustic Waves Generated during Rocket Launches and Earthquakes*", Cosmic Research, Vol. 40, No. 3, 2002, pp. 241-254. (Translated from Kosmicheskie Issledovaniya), Vol. 40, No. 3, 2002, pp. 261-275. TECS, medium-scale traveling ionospheric disturbances of the non-wave type, are isolated ionospheric disturbances manifesting themselves in total electron content (TEC) variations in the form of single aperiodic negative TEC disturbances of about 10-min duration. TECS morphology is presented for 170 days with various geomagnetic activity and number of GPS stations ranging from 4 to 240. TECS variations are close in amplitude, form and duration to the TEC response to shock-acoustic waves (SAW) generated during rocket launchings (Calais E. and Minster J. B. GPS, *earthquakes, the ionosphere, and the Space Shuttle*, Physics of Earth and Planetary Interiors. (1998). 105. 167-181.); (Li, Y. Q., Jacobson, A. R., Carlos, R. C., Massey, R. S., Taranenko, Y. N., and Wu, G., *The blast wave of the Shuttle plume at ionospheric heights*. Geophys. Res. Lett., 1994, 21, 2737-2740.); (Afraimovich, E., Kosogorov, E., Palamarchouk, K., Perevalov, N., Plotnikov, A., *The use of GPS arrays in detecting the ionospheric response during rocket launchings*, Earth Planets Space, 52, 1061-1066, 2002) earthquakes (Calais, E., and Minster, J. B., *GPS detection of ionospheric perturbations following the Jan.* 17, 1994 *Northridge earthquake*, Geophysical Research Letters, 22, 1045-1048, 1995); and Afraimovich, E. L., Perevalov, N. P., Plotnikov, A. V., and Uralov, A. M., *The shock-acoustic waves generated by earthquakes*, Annales Geophysicae, 19, pp. 395-409, 2001); (Afraimovich et al., 2001), and explosions (Fitzgerald, T. J., *Observations of total electron content perturbations On GPS signals caused by a ground level explosion*, J. Atmos. Terr. Phys., 1997, 59, 829-834), and (Calais, E., Minster, J. B., Hofton, M. A., and Hedlin, M. A. Ha, *Ionospheric signature of surface mine blasts from Global Positioning System measurements*, Geophysical Research Int., 132, pp. 191-202, 1998.) However, the isolated ionospheric disturbance propagation velocity is less than the SAW velocity (800-1000 m/s) and most likely corresponds to the velocity of background medium-scale acoustic-gravity waves (AGW) on the order of 100-200 m/s. The TECS were observed during a quiet interval with no rise in geomagnetic activity, no solar flux anomalies and no earthquakes in the region of study. This example shows that ionospheric perturbations of similar character can actually be caused by quite different influences.

In Ducic V., J. Artru, Ph. Lognorme, "*Ionospheric remote sensing of the Denali Earthquake Rayleigh surface waves*", Geophysical Research Letters, 2003, 30, No. 18, 1951, a GPS observation of ionospheric waves associated with long-period Rayleigh waves form Denali-2002 (M=7.9) earthquake is reported. The techniques provide a direct measurement of the local group velocity of Rayleigh waves by imaging the wavefront in space and time. The dense California GPS networks allowed authors to map the ionospheric perturbations and to compute the group velocity with a high spatial resolution above the Pacific coasts. Due to a low sampling rate, a large error in the velocity determination remains. Nonetheless, it demonstrates that bi-static remote sensing measurements of seismic waves with GPS networks can be performed.

GPS observations of ionospheric perturbations possibly caused by the Rayleigh surface waves generated by the Tokachi-oki earthquake, Sep. 25, 2003 are reported in Heki K. "*Ionospheric perturbation by the surface wave of the* 2003 *Tokachi-Oki earthquake (M=8.0) detected using a dense GPS array, Linkages among tectonics, seismicity, magma genesis and eruption in volcanic arcs*", IV International Biennial Workshop on Subduction Processes Emphasizing the Japan-Kurile-Kamchatka-Aleutian Arcs. Petropavlovsk-Kamchatsky Aug. 21-27, 2004. www.avo.alaska.edu/kasp/kasp04/abstracts/heki.pdf.

Arabelos D. N., G. Asteriadis, A. Bloutsos, M. E. Contadakis, and S. D. Spatalas, "*Atmospheric tide disturbances as Earthquake precursory phenomena*", Natural Hazards and Earth System Sciences, 2004, 4, 1-7, reports on tidal disturbances as possible precursors to earthquakes. The tidal changes of the barometric pressure in the area of Thessaloniki were studied by analyzing a sample of 21-year-long, hourly measurements. The resultant tidal parameters (amplitude and phase difference) were considered as "mean values" of the corresponding parameters for this long time period. Using these parameters, barometric changes were computed and subtracted from the observations. There was an observable correlation of the amplitude of most of the tidal waves to Earthquakes of magnitude >4, which occurred close to Thessaloniki in the test period.

Calais E., J. S. Haase, J. B. Minster, "*Detection of ionospheric perturbations using a dense GPS array in Southern California*", Geophysical Research Letters, 2003, 30, No. 12, 1628, presented observations of high-frequency ionospheric perturbations detected using Global Positioning System (GPS) data from the Southern California Integrated GPS Network (SCIGN), a densely spaced GPS array of about 250 stations centered on the Los Angeles area. Perturbations with 3-10 minute periods that may result from coupling between the ionosphere and neutral gravity waves generated in the lower atmosphere were revealed. Authors applied multi-station array processing techniques initially proposed for seismic data processing. This technique allowed authors to take advantage of the high spatial density of the measurements and the coherence of the signal over a region the size of the SCIGN to considerably improve the detection capability.

Comparison of TEC perturbations with geomagnetic oscillations as possible precursors of earthquakes are considered in Naaman Sh., L. S. Alperovich, Sh. Wdowinski, M. Hayakawa, and E. Calais, "*Comparison of simultaneous variations of the ionospheric total electron content and geomagnetic field associated with strong earthquakes*", Natural Hazards and Earth System Sciences, 2001, 1, 53-59. Authors describe several cases of simultaneous TEC observations and geomagnetic oscillations measurement before strong earthquakes. It is concluded that in case of minor vertical displacement TEC variations do not show any signatures precursory to the earthquake whereas geomagnetic oscillations (mainly in horizontal component) were observed several hours before the shock. On the other hand, a case is reported when no geomagnetic precursors were revealed.

Numerous attempts to separate any reliable precursors that could serve as a basis for reliable earthquake forecasts have failed. One reason is strong variability in the specific manifestations of precursors associated with a specific earthquake. Specific anomalies in ionospheric parameters reported as ionospheric precursors are rather contradictory as to both their sign and magnitude. Another reason is that all the ionospheric phenomena currently considered as earthquake precursors can be caused not only by earthquakes but by solar and geomagnetic activity as well. Moreover, some researchers find that there is a direct influence of solar activity on processes of preparation and triggering the earthquakes (for example, via changes in atmospheric pressure). Therefore a careful analysis is needed to distinguish between the effects of solar and geomagnetic activity in the ionosphere and those caused by earthquake preparation processes. We illustrate this proposition below with Table 3, a table adopted from S. Pulinets, K. Boyarchuk, "*Ionospheric Precursors of Earthquakes*", Springer-Verlag Berlin Heidelberg 2004. In Table 3 an attempt is made to summarize major differences between ionospheric precursors to earthquakes and ionospheric phenomena caused by geomagnetic storms. Authors note that the results shown are obtained mostly from ionosonde measurements.

regions on the Earth and, thus, locally specific in character or intensity. Note that the "locality" of ionospheric precursors such as wave-like structures is also not too local: region where wave-like ionospheric precursors can be encountered can extend up to several thousands of kilometers and reach continental scales. In addition, if one seeks to monitor "local" ionospheric precursors using ionosondes, one would have to know the position of the impending earthquake. Locality of ionospheric precursors intrinsically cannot be determined by means of single-point measurements such as ionosondes; spatial monitoring is needed for this purpose.

2) The indicated temporal scales of geomagnetic disturbances (48-hour duration) are also quite doubtful. High variability of storm-induced phenomena (including their duration) is well known, and the authors' opinion as to 48-hour duration of disturbances is beneath criticism. On the other hand, not all seismo-induced phenomena are tied to the same local time and they can last a long time.

3) The same argument relates also to the shape and time of low-latitude disturbances, which are reported to be rather

TABLE 3

Ionospheric variations during the magnetic storm (left column) and seismo-ionospheric variations (right column)

| | Ionospheric variations during magnetic storm | Seismo-ionospheric variations |
|---|---|---|
| 1 | Variations have the global character and observed worldwide | Variations are observed only over the area of earthquakes preparation (with some shift equatorward) |
| 2 | Variations are significant in magnitude and duration and represent the continuous process lasting 48 hours | Variations have sporadic character and appear at the same local time every day but do not have continuous character |
| 3 | Disturbances in low latitudes are observed, basically, during night-time with positive and negative phases noticed, first of all in a period between sunset and sunrise | Variations are observed during daytime too, and main statistically confirmed precursor in low latitudes is negative deviation during afternoon hours |
| 4 | The $\Delta h_m F2$ value during a storm is 60-80 km with hmF2 in quiet conditions not less than 250 km | The $\Delta h_m F2$ before earthquakes may reach 150 km |
| 5 | As a result of development of a storm average molecular mass at heights of F-layer was increased owing to increase of the mass relation $([N_2] + O_2)/[O]$. The mean ion mass during the storm is also increased due to increase of relation $NO^+/O^+$ | The seismo-ionospheric variations result in reduction of mean ion mass at heights of F-layer owing to variations of magnetospheric flows of ions $O^+$ and increase of concentration of light ions ($H^+$ and $He^+$) |
| 6 | The positive and negative deviations during magnetic storm depend on the storm development phase | The positive and negative deviations of seismo-ionospheric variations depend on the local time, relative position of the observation point and epicenter, and on the sign of anomalous electric field |
| 7 | Large heating of electrons and ions (2000-3000 K) during the storm | Practically no heating before earthquakes (~300 K) |

From the analysis of the data summarized in the table 2 it can be clearly seen that the distinction between non-seismic ionospheric phenomena and ionospheric precursors is hardly capable of being employed for practical prediction purposes. There are no quantitative estimates in the table which could be taken as guidelines in monitoring ionospheric precursors to earthquakes. Additionally, there are no prominent qualitative distinctions between storm-induced and seismo-induced ionospheric manifestations.

1) As to globality/locality of geomagnetic ionospheric variations vs seismo-ionospheric changes, this feature is not helpful in real-time distinguishing between geomagnetic and seismo-induced effects, since ionospheric variations caused by a geomagnetic storm will be quite different in different irregular, regardless of whether caused by geomagnetic or seismic events. 4) Variations in $h_m F2$ during magnetic storms can be much higher that those indicated in the table. For example, during the storm of October-November 2003, the top height of F2-layer repeatedly reached 800 km, according to (Huang, C. Y., Burke, W. J., Holeman, E. (2004), *Observations of Ionospheric Effects During the October-November* 2003 *Storms*, Eos Trans. AGU, 85(17), Jt. Assem. Suppl., Abstract SH53A-14 (17-21 May 2004 THE 2004 JOINT ASSEMBLY, a partnership between CGU, AGU, SEG and EEGS, Montreal, Canada).

5) There is no means for continuous monitoring the magnetospheric flow at F region heights. 6) As stated in the table, positive and negative deviations of seismo-ionospheric variations depend on the local time, relative position of the observation point and epicenter, and on the sign of the anomalous electric field. This means that the position of the epicenter must be known beforehand. 7) Noticeable heating during magnetic storms and no heating before earthquakes means only that ion and electron heating is not a precursory effect, leaving aside the issue that wide-coverage measurements of ion and electron heating are not feasible.

There is no denial that many diverse phenomena exist that could be considered as precursory to earthquakes. At the same time, obviously, most would not agree that a single precursor alone could successfully be used to predict an earthquake. The experimental and theoretical results indicate that the whole complex of premonitory phenomena should be considered. Among theses, AGW and wavelike ionospheric perturbations resulting from lithosphere-ionosphere coupling in regions of earthquake preparation are most promising candidates to serve as reliable precursors. However, one should take into account that there are several difficulties and obstacles that hamper distinguishing the ionospheric precursors from those caused by solar and geomagnetic activity.

1) Data from ionosondes, essentially single-point measurements, cannot be taken as an adequate basis for studying earthquake precursory phenomena, for (i) there is not a dense enough net of ionosondes and (ii) the signal measured by ionosondes can in fact be reflected not from the ionospheric region right above the sounder but, due to non-ideal antenna radiation patterns, it may come from a side region as well. Therefore data from ionosondes are not always correct. In addition, in disturbed ionospheric conditions there will often not be any reflected signal due to strong absorption of the signal in the lower ionosphere.

2) Additionally, specialized satellites such as DEMETER, VULCAN, and WARNING, intended for studying ionospheric phenomena related to earthquakes, do not provide worldwide and continuous coverage. These satellites actually make measurements at separate time instants defined by satellite transit over a region of interest, and are capable only of potentially detecting earthquakes along their orbits. Wide spatial and time coverage of a region of interest will be provided by the GESS mission to be run in full in 2018. However, even that system is basically intended for ground motion measurements, and a search for ionospheric waves precursory to earthquakes is not directly implied in that mission.

3) Many works (Calais, E., Minster, J.B., Hofton, M.A., and Hedlin, M. A. H., *Ionospheric signature of surface mine blastsfrom Global Positioning System measurements*, Geophysical J. Int., 132, pp. 191-202, 1998); generation of internal gravity waves (Francis S. H., *Global propagation of atmospheric gravity waves: a review*, J. Atmos. Terr. Phys. (1975). 37. 1011-1054); (Fitzgerald T. J., *Observations of total electron content perturbations on GPS signals caused by a ground level explosion*, J. Atmos. Sol.-Terr. Phys. (1997). 59(7). 829-834); eddy motions of neutral atmosphere excited after acoustic pulse passage (Andreeva, E. S., M. B. Gokhberg, V. E. Kunitsyn, E. D. Tereshchenko, B. Z. Khudukon, and S. L. Shalimov, (2001): *Radiotomographical Detection of Ionosphere Disturbances Caused by Ground Explosions*. Space Investigations, V.39, No 1, 13-17, 2001); and (Afraimovich E. L., N. P. Perevalova, A. V. Plotnikov, and A. M. Uralov, *The shock-acoustic waves generated by earthquakes*, Annales Geophysicae, 19, 395409, 2001) are dedicated to the study of ionospheric response to perturbations caused by pulse influence on the Earth atmosphere. Sources of such perturbations are nuclear tests, industrial explosions and earthquakes. AGW generated in the atmosphere by these sources propagate up to high altitudes with increasing amplitude where they can drive ionospheric plasma owing to collisional interaction between neutrals and charged particles. Since the atmospheric density decreases almost exponentially with height, energy conservation implies that the amplitude of the wave grows with height. For near-ground sources, wave amplitude gain factor can reach $10^4$ at ionospheric heights (Calais and Minster, 1998). In the literature there is a wide spread in data concerning main parameters of AGW generated by mentioned processes, and specific mechanism of these perturbations generation is not clear yet. Various authors proposed different models to explain ionospheric disturbances: generation of infrasound waves (Calais and Minster, 1998), generation of internal gravity waves (Francis, 1975), eddy motions of neutral atmosphere excited after acoustic pulse passage (Andreeva et al., 2001), shock-acoustic waves generation (Afraimovich et al., 2001), and others.

4) Wavelike disturbances caused by earthquake preparation processes seem to be a sound candidate to serve as an earthquake precursor. Wave traces in the ionospheric plasma are TEC wavelike structures. Detecting wavelike structures in TEC and electron density distributions is not an easy task, since the values of perturbations are rather small and the waves can arise from not a single region due to the mozaicity of earthquakes. Therefore the method for the study of wavelike manifestations of earthquake preparation should provide good spatial coverage and continuous monitoring of a region of interest. In light of all the foregoing commentary, we determined that complex radio tomography based on signals from high-orbital navigational satellites (GNSS) and signals from low-orbital satellites like Transit-Tsikada seem to be the most suitable method for detection ionospheric precursors of pending earthquakes.

Since the early 1990's, we have led the world's research efforts in radio tomographic of the ionosphere (RTI), and have developed methods capable of reconstructing the spatial structure of the electron density distribution in the ionosphere from data obtained from signals transiting the ionosphere. FIGS. 1-4 capture the essence of the present invention's methodology. The existing LO satellite navigational systems having circular orbits at about 1000-1150 km altitudes, and ground receiving chains provide time series of tomographic data along different rays. In RTI experiments, the reception of two coherent satellite signals at 150 and 400 MHz and registration of phase differences between these carriers (reduced phase) is carried out at a set of several ground-based receivers arranged along the ground track of the satellite, spaced about a hundred kilometers apart. Measurements of the reduced phase N at several receiving sites are input data for tomographic reconstruction. Electron density N is integrated along rays between the ground receiver and satellite transmitter is proportion to the absolute (total) phase $\Phi$ including the unknown initial phase $\varphi_0$ (equation (1) discussed above provided below for further reference):

$$a\lambda r_e \int_L N d\sigma = \Phi = \varphi + \varphi_0, \qquad (1)$$

Where $\lambda$ is the probing wavelength, $r_e$ is the classical electron radius, non-dimensional coefficient of proportionality $\alpha \sim 1$ is defined by the frequencies chosen.

We rewrite equation (1) in operator form, adding typical uncorrelated experimental noise $\xi$:

$$PN=\Phi+\xi, \qquad (2)$$

Here P is projection operator mapping the 2D distribution N into the set of 1D functions (projections) $\Phi$. Thus, the problem of tomographic reconstruction is to solve the system of linear integral equations (2) and to find electron density N. However, there are no direct means to solve a system of linear equations (SLE) like (2). One of possible ways is to discretize (approximation) of the projection operator P and its replacement by a discrete operator L. In this case we come to a corresponding system of linear equations (SLE):

$$LN=\Phi+\xi+E, \; E=LN-PN \qquad (3)$$

Where E is an error of approximation, a correlated error depending on the solution itself. Here, the operator L will be defined by the choice of approximation type or by the representation of the sought function N. Note that equations (2) and (3) are equivalent. But the error of approximation E is unknown in the RTI experiment, and in fact we are solving a different system:

$$LN=\Phi+\xi, \qquad (4)$$

System (4) is not equivalent to system (3), and all errors and distortions linked with the error of approximation will become apparent in the reconstruction. The closer the projection operator L approximation is to the true projection operator P, the less the error E. But none of SLE solution methods are capable of revealing the structures which contribution to the data is much less than the distortions inherent in the image processing caused by the error of approximation E [3].

It is important to note that, to solve the tomographic SLE (4), an absolute (total) phase $\Phi$ is to be known, that is, the unknown initial phase $\phi_0$ is to be determined. Errors in estimation of initial phase values $\phi_0$ for different receivers can lead to contradictions and inconsistency of the data, and, as a result, to a poor quality of reconstructions. Therefore, a method of phase-difference RTI, or RTI based on linear integral differences at close rays has been developed. This method does not require the initial phase determination (5) [4, 5]. SLE for phase-difference RTI (5) is defined by the corresponding difference:

$$\left.\begin{array}{l} LN = \Phi \\ L'N = \Phi' \end{array}\right\} \to AN = \Phi - \Phi' = D + \xi \qquad (5)$$

Where $LN=\Phi$ is original SLE and $L'N=\Phi'$ is SLE formed from a set of close rays. Phase-difference RTI provide much better results and has much higher sensitivity as compared with phase methods, which is confirmed by experimental results [6-10]. Resolution of ray RTI problem in its linear statements is 20-30 km in horizontal and 30-40 km in vertical direction. If the refraction of sounding rays is taken into account, the spatial resolution of ray RTI method can be improved up to 10-20 km.

A lot of algorithms, both direct and iterative, exist for solving the SLE (4,5). Nowadays in ray RTI of the ionosphere iterative algorithms are often used; also, non-iterative algorithms are employed such as methods of singular decomposition and its modifications, regularization of rms deviation, orthogonal decomposition, maximum entropy, quadratic programming and its varieties, Bayesian approach and so on [2, 10]. During the last fifteen years, in numerical simulations and a large number of experimental RTI reconstructions, efficient combinations of various methods and algorithms have been found providing reconstructions of highest quality.

In recent years, ray RTI became one of our primary tools for investigation of electron density distributions in the ionosphere, and it now forms the crux of this earthquake prediction invention.

As discussed above, wave processes occur in the atmosphere and ionosphere during periods of earthquake preparation which we term Acoustic-gravity waves (AGW). During a process of earthquake preparation, various mechanical phenomena develop due to variations of tilt and deformation strains in the lithosphere. Anomalies in the lithospheric geophysical fields can be understood as earthquake precursors: changes in water level, geochemical parameters, degassing rate and others. Numerous mechanical processes will necessarily entail oscillatory, wave and wavelike motions in the lithosphere. Owing to complex block structure of the lithosphere, the oscillatory and wave processes are complicated and non-linear. Theses oscillatory and wave processes in the lithosphere call forth acoustic-gravity waves in the atmosphere. Significant growth should be mentioned in amplitude of AGW caused by faint oscillations of ground surface during the earthquake preparation processes, as they propagate up to the upper atmosphere. Low amplitudes of AGW in the lower troposphere significantly increase due to the decreasing atmospheric density, and caused by them variations in plasma density can be successfully detected by radio physical methods.

Oscillations and waves on the ground that take place a few days before an earthquake have been repeatedly observed. However, the atmosphere and ionosphere respond to oscillatory and wave fields located both in the epicenter of a pending earthquake and far from the epicenter. As a result of such "averaging," the effect of wave field mosaicity gets suppressed over corresponding areas, which raises hopes for more efficient, short-term forecasts of earthquakes. Thus, wave activity and the character of AGW motions during earthquake preparation open the possibility of predicting the time and location of earthquakes.

We have shown that a solution to the problem of the earthquake preparation processes influence on the atmosphere/ionosphere requires both acoustic and internal gravity waves to be taken into account, that is, a non-linear problem of AGW propagation is to be solved. Earlier we have carried out a numerical simulation of generation and atmospheric propagation of AGW caused by various ground sources, both quasi monochromatic and pulsed (Ahmadov R. R., Kunitsyn V. E. *Simulation of generation and propagation of acoustic gravity waves in the atmosphere during rocket flight*, Intern. J. Geomagn. Aeron. (2004), 5, G12002, doi:10.1029/2004GI000064). During earthquake preparation possible sources of AGW could be ground surface motions and variations of Earth degassing. The pulsed source is in the epicentral region of the earthquake. A quasi-monochromatic source is, for example, a surface Rayleigh wave propagating off the epicenter.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Any modification, though presently unforeseeable, of the present inven-

What is claimed as new and desired to be protected by Letters Patent of the United States is:

1. A method of processing geospheric data to predict a large entity event, said method comprising the steps of:
   acquiring data at receiving stations located near the earth's surface, wherein the acquired data comprises one or more of high orbiting radio-tomography (HORT), low orbiting radio-tomography (LORT), radar clutter, and cellular telephone signal fading and noise data;
   correlating said acquired data with secondary data, wherein the secondary data comprises at least one of archival data, magnetospheric data, seismic data from a region of interest, solar data, data relating to man-made activities that may influence the prediction, and other cosmic, solar, geophysical, or terrestrial data which may have an impact on the prediction;
   comparing said correlated data with archived data sets, in an iterative process, revisiting the correlated data to remove false signals or irrelevant noise and to extract meaningful trends; and
   evaluating said data for presence of large entity event precursors.

2. The method of claim 1, further comprising the step of disseminating an alert if it is determined from said evaluated data that a large entity event is imminent.

3. The method of claim 1, wherein said large entity event is an earthquake.

4. The method of claim 1, wherein said large entity event is a seaquake.

5. The method of claim 1, wherein said large entity event is a tsunami.

6. The method of claim 3, wherein said acquired data comprises HORT data and said act of acquiring said HORT data comprises the steps of:
   acquiring and combining the HORT data at a plurality of receiving sites in the region of interest, wherein the HORT data comprises the characteristics of wave fields, phases, group delays, amplitude of navigational signals at two coherent frequencies $f_1$ and $f_2$, as transmitted from high orbiting navigational satellites;
   transferring the acquired and combined data to at least one data processing and analysis center; and
   pre-processing said transferred acquired data by averaging, filtering, removal of phase ambiguities and related preparatory procedures.

7. The method of claim 6, wherein said correlating step further comprises the steps of:
   measuring combined signals in said combined data;
   measuring, at numerous receiving sites in the given region of the wave field, characteristics (phases, phase delays, group delays, phase and amplitude variances, correlation functions, coherence functions, moments and distribution functions, and amplitudes of navigational satellites at two or three coherent frequencies $f_1$, $f_2$ and $f_3$) transmitted from specialized satellite systems;
   measuring, at numerous receiving sites in a given region of fluctuation, characteristics of the wave fields (variances, correlation functions, coherence functions, corresponding moments and distribution functions of phases and amplitudes of signals at two coherent frequencies $f_1$ and $f_2$);
   space-time imaging of ionospheric electron density and refraction index distribution in the neutral atmosphere by tomographic methods employing phase-difference radio tomography employing phase difference data in time or location of the satellite-borne transmitter, reducing the reconstruction problem to a function of differences of linear integrals, avoiding ambiguity of phase measurements and increasing reconstruction accuracy;
   space-time imaging of statistic characteristics of ionospheric electron concentration and density of the neutral atmosphere by tomographic methods using the data on statistical characteristics of the wave fields;
   determining structural parameters of regular and quasi-regular ionosphere;
   determining structure and parameters of the disturbed ionosphere, including determination of the intensity and sizes of perturbations: patches, blobs, bubbles, and other irregularities;
   calculating characteristics and parameters of ionospheric and atmospheric wave perturbations in the ionosphere and atmosphere including amplitude, frequency, wavelength, and velocity of acoustic, internal gravity waves, acoustic-gravity waves in the ionosphere and atmosphere, and estimation of the location of the wave sources; and
   calculating characteristics and parameters of solitary waves, soliton-like waves, isolated perturbations in the ionosphere and atmosphere, including determination of amplitudes and velocities of the perturbations, to aid in location of the wave sources.

8. The method of claim 7, wherein said comparing step further comprises the steps of:
   calculating and estimating an earthquake occurrence probability in a given seismic region from the characteristics and parameters of wavelike disturbances in the ionosphere and atmosphere, using amplitude, frequency, wavelength, velocity of acoustic, internal gravity wave (IGW), and acoustic gravity wave (AGW) in the atmosphere and ionosphere, by constructing a functional of the earthquake containing information about wave activity in said seismic region, determining spectral parameters of wave disturbances and the characteristics of perturbations using wavelet analysis, and separating acoustic, internal gravity wave, and acoustic gravity wave wavelike disturbances by analysis of the images, frequencies, wavelengths, and velocities of the perturbations;
   calculating and estimating the earthquake occurrence probability in a given seismic region from the characteristics and parameters of solitary waves, soliton-like isolated perturbations in the ionosphere and atmosphere, by constructing the functional of the earthquake containing information about wave activity in said seismic region, where the wave activity is determined by energy parameters in solitary waves, and in soliton-like isolated perturbations in the ionosphere and atmosphere;
   calculating and estimating the earthquake occurrence probability in a given seismic region from the characteristics and parameters of the structure of the ambient and quasi-ambient ionosphere (height and thickness of layers, concentration levels, parameters of ionization troughs in northern and southern latitudes, and parameters of the equatorial anomaly in equatorial latitudes), wherein the parameters of the structure of the ambient and quasi-ambient ionosphere which define the disturbance level of quasi-stationary electromagnetic fields in said seismic region are related to perturbations in geophysical fields within the region of earthquake preparation, and calculation of the earthquake occurrence probability is performed by constructing the functional of the earthquake, containing information about the parameters of the structure of the ambient and quasi-ambient ionosphere, the level of disturbance in the parameters of the structure of ambient and quasi-ambient ionosphere defining the magnitude of the oncoming earthquake;

calculating and estimating the earthquake occurrence probability in a given seismic region from the characteristics and parameters of the spatial-temporal structure of the statistic characteristics of the electron concentration in the ionosphere and the neutral density in the atmosphere, and from the data about the level of turbulence in the medium, wherein estimation of the earthquake occurrence probability is performed by constructing the functional of an earthquake containing information about the statistical characteristics of the electron concentration in the ionosphere and neutral density in the atmosphere, and the perturbation level of the statistical characteristics of electron concentration in the ionosphere and neutral density in the atmosphere defines the level of turbulence in the medium and the magnitude of the oncoming earthquake;

determining a probability of epicenter coordinate distribution from the probability distribution of the coordinates of the sources of the waves, solitary waves, and soliton-like isolated perturbations in the ionosphere and atmosphere, wherein the probability distribution of the coordinates of all wave and wavelike disturbances during periods of high probability of an earthquake define the probability of distribution of the coordinates of the oncoming earthquake;

determining a probability of the epicenter coordinates distribution from the distribution of perturbation amplitudes in the characteristics and parameters of the structure of the ambient and quasi-ambient ionosphere, wherein the distribution of the perturbation amplitudes in the characteristics and parameters of the structure of the ambient and quasi-ambient ionosphere during periods of high probability of an earthquake defines the probability of distribution of the coordinates of the oncoming earthquake; and determining a probability of the epicenter coordinates distribution from the distribution of the level of perturbations in the characteristics and parameters of the spatial-temporal structure of statistical characteristics of electron concentrations in the ionosphere and the neutral density in the atmosphere, and from the level of turbulence in the medium, wherein the distribution of amplitudes of the statistical characteristics of electron density in the ionosphere, the neutral density in the atmosphere, and the distribution of the level of turbulence in the medium during periods of high probability of an earthquake defines the probability of distribution of the coordinates of the oncoming earthquake.

9. The method of claim 8, wherein said step of evaluating said data for presence of large entity event precursors further comprises the steps of:

discriminating between earthquake precursors based on RTI effects caused by sources of other origin;

estimating the earthquake occurrence probability by constructing the functional of an earthquake containing information about the characteristics and parameters of the ionosphere and atmosphere within a given seismic region by separating the ionospheric effects caused by the earthquake preparation processes and influences of other factors, accounting for the level of solar-geophysical disturbance, by acquisition of relevant geophysical data and introducing those data into the process of constructing the earthquake predictor; and estimating the earthquake occurrence probability by constructing the functional of an earthquake containing information about the characteristics and parameters of the ionosphere and atmosphere within a given seismic region by construction of the predictor with an iterative, self-learning procedure, using all available information about all previous strong earthquakes in a given region, archival data, lessons learned in the course of successful and failed predictions, and drawing on information about subsequent earthquakes.

10. The method of claim 3, wherein said acquired data comprises LORT data and said act of acquiring said LORT data comprises the steps of:

acquiring and combining the LORT data at a plurality of receiving sites in a region of interest, wherein the LORT data comprises the characteristics of wave fields, further comprising phases, group delays, amplitude of navigational signals at two coherent frequencies $f_1$ and $f_2$, as transmitted from orbiting navigational satellites;

transferring the acquired and combined data to at least one data processing and analysis center;

pre-processing said transferred acquired data by averaging, filtering, removal of phase ambiguities, and related preparatory procedures, and recording for permanent archival access.

11. The method of claim 10, wherein said correlating step further comprises the steps of:

measuring combined signals in said combined data;

measuring, at numerous receiving sites in a given region of the wave field, characteristics (phases, phase delays, group delays, phase and amplitude variances, correlation functions, coherence functions, moments and distribution functions, and amplitudes of navigational satellites at two or three coherent frequencies $f_1$, $f_2$ and $f_3$) transmitted from specialized satellite systems; wherein the measured RTI quantities are all related to a distribution of electron density;

measuring, at numerous receiving sites in a given region of fluctuation, characteristics of the wave fields (variances, correlation functions, coherence functions, their moments and distribution functions of phases and amplitudes of signals at two coherent frequencies $f_1$ and $f_2$);

space-time imaging of ionospheric electron density and refraction index distribution in the neutral atmosphere by tomographic methods, using phase-difference radio tomography employing phase difference data in time or location of the satellite-borne transmitter, reducing the reconstruction problem to a function of differences of linear integrals, avoiding ambiguity of phase measurements and increasing reconstruction accuracy;

space-time imaging of statistic characteristics of ionospheric electron concentration and density of the neutral atmosphere by tomographic methods using the data on statistical characteristics of the wave fields;

determining structural parameters of regular and quasi-regular ionosphere;

determining structure and parameters of the disturbed ionosphere, including determination of the intensity and sizes of perturbations: patches, blobs, bubbles, and other irregularities;

calculating the characteristics and parameters of ionospheric and atmospheric wave perturbations in the ionosphere and atmosphere: amplitude, frequency, wavelength, and velocity of acoustic, internal gravity waves, acoustic-gravity waves in the ionosphere and atmosphere, and estimation of the location of the wave sources; and calculating the characteristics and parameters of solitary waves, soliton-like waves, isolated perturbations in the ionosphere and atmosphere, including determination of amplitudes and velocities of the perturbations, to aid in location of the wave sources.

12. The method of claim 11, wherein said comparing step further comprises the steps of:

calculating and estimating an earthquake occurrence probability in a given seismic region from the characteristics and parameters of wavelike disturbances in the ionosphere and atmosphere, using amplitude, frequency, wavelength, velocity of acoustic, internal gravity wave (IGW), and acoustic gravity wave (AGW) in the atmosphere and ionosphere, by constructing the functional of the earthquake containing information about wave activity in said seismic region, determining spectral parameters of wave disturbances and the characteristics of perturbations using wavelet analysis, and separating acoustic, IGW, and AGW wavelike disturbances by analysis of the RTI images, frequencies, wavelengths, and velocities of the perturbations;

calculating and estimating the earthquake occurrence probability in a given seismic region from the characteristics and parameters of solitary waves, soliton-like isolated perturbations in the ionosphere and atmosphere, by constructing the functional (predictor) of the earthquake containing information about wave activity in said seismic region, where the wave activity is determined by energy parameters in solitary waves, and in soliton-like isolated perturbations in the ionosphere and atmosphere;

calculating and estimating the earthquake occurrence probability in a given seismic region from the characteristics and parameters of the structure of the ambient and quasi-ambient ionosphere (height and thickness of layers, concentration levels, parameters of ionization troughs in northern and southern latitudes, and parameters of the equatorial anomaly in equatorial latitudes), wherein the parameters of the structure of the ambient and quasi-ambient ionosphere which define the disturbance level of quasi-stationary electromagnetic fields in said seismic region are related to perturbations in geophysical fields within the region of earthquake preparation, and calculation of the earthquake occurrence probability is performed by constructing the functional (predictor) of the earthquake, containing information about the parameters of the structure of the ambient and quasi-ambient ionosphere with the level of disturbance in the parameters of the structure of ambient and quasi-ambient ionosphere defining the magnitude of the oncoming earthquake;

calculating and estimating the earthquake occurrence probability in a given seismic region from the characteristics and parameters of the spatial-temporal structure of the statistic characteristics of the electron concentration in the ionosphere and the neutral density in the atmosphere, and from the data about the level of turbulence in the medium, wherein estimation of the earthquake occurrence probability is performed by constructing the functional of an earthquake containing information about the statistical characteristics of the electron concentration in the ionosphere and neutral density in the atmosphere, and the perturbation level of the statistical characteristics of electron concentration in the ionosphere and neutral density in the atmosphere defines the level of turbulence in the medium and the magnitude of the oncoming earthquake;

determining a probability of epicenter coordinate distribution from the probability distribution of the coordinates of the sources of the waves, solitary waves, and soliton-like isolated perturbations in the ionosphere and atmosphere, wherein the probability distribution of the coordinates of all wave and wavelike disturbances during periods of high probability of an earthquake define the probability of distribution of the coordinates of the oncoming earthquake;

determining a probability of the epicenter coordinates distribution from the distribution of perturbation amplitudes in the characteristics and parameters of the structure of the ambient and quasi-ambient ionosphere, wherein the distribution of the perturbation amplitudes in the characteristics and parameters of the structure of the ambient and quasi-ambient ionosphere during periods of high probability of an earthquake defines the probability of distribution of the coordinates of the oncoming earthquake; and determining a probability of the epicenter coordinates distribution from the distribution of the level of perturbations in the characteristics and parameters of the spatial-temporal structure of statistical characteristics of electron concentrations in the ionosphere and the neutral density in the atmosphere, and from the level of turbulence in the medium, wherein the distribution of amplitudes of the statistical characteristics of electron density in the ionosphere, the neutral density in the atmosphere, and the distribution of the level of turbulence in the medium during periods of high probability of an earthquake defines the probability of distribution of the coordinates of the oncoming earthquake.

13. The method of claim 12, wherein said step of evaluating said data for presence of large entity event precursors further comprises the steps of:

discriminating between earthquake precursors based on RTI effects caused by sources of other origin;

estimating the earthquake occurrence probability by constructing the functional of an earthquake containing information about the characteristics and parameters of the ionosphere and atmosphere within a given seismic region by separating the ionospheric effects caused by the earthquake preparation processes and influences of other factors, accounting for the level of solar-geophysical disturbance, by acquisition of relevant geophysical data and introducing those data into the process of constructing the earthquake predictor; and estimating the earthquake occurrence probability by constructing the functional of an earthquake containing information about the characteristics and parameters of the ionosphere and atmosphere within a given seismic region by construction of the predictor with an iterative, self-learning procedure, using all available information about all previous strong earthquakes in a given region, archival data, lessons learned in the course of successful and failed predictions, and drawing on information about subsequent earthquakes.

14. The method of claim 6, wherein said acquired data further comprises cellular telephone signal fading (CTSF) data; and wherein said method further comprises:

acquiring signal strength and noise data from a plurality of ground stations, mobile stations, and cellular telephones in the region of interest;

comparing and contrasting said acquired signal strength and noise data over an extended period of time, recording trends in said signal strength and noise data;

eliminating known diurnal, seasonal, and associated effects from said data;

correlating signal strength and noise trends against a predictive model; and refining the geo-spatial and temporal predictions relating to the impending earthquake based on the knowledge that the earthquake will be focused in the region of maximum noise change.

15. The method of claim 14, wherein said model predicts a gradual rise in noise, and correlative decrease in signal strength, followed by a sharp decrease shortly before the earthquake, with a rapid rise to the previous maximum just minutes or seconds prior to the event.

16. The method of claim 10, wherein said acquired data further comprises cellular telephone signal fading (CTSF) data; and wherein said method further comprises:

acquiring signal strength and noise data from a plurality of ground stations, mobile stations, and cellular telephones in the region of interest;

comparing and contrasting said acquired signal strength and noise data over an extended period of time, recording trends in said signal strength and noise data;

eliminating known diurnal, seasonal, and associated effects from said data;

correlating signal strength and noise trends against a predictive model; and refining the geo-spatial and temporal predictions relating to the impending earthquake based on the knowledge that the earthquake will be focused in the region of maximum noise change.

17. The method of claim 6 or 10, wherein said acquired data further comprises radar clutter map data and said method further comprises the steps of:

acquiring the radar clutter map data from Nexrad and K-band radars over an extended period of time in areas identified as at risk for impending earthquakes;

performing frame-to-frame comparisons of the clutter map data over varying periods of time to determine the presence of persistent versus sporadic clutter;

eliminating from consideration clutter typically present due to seasonal, daily, or diurnal changes in the atmosphere;

eliminating from consideration clutter typically present due to man-made or natural anomalies other than earthquake preparation process;

eliminating from consideration clutter which is associated with changing weather patterns;

focusing the K-band radar on those sectors of the clutter map showing persistent clutter and in the general vicinity of the impending earthquake as previously predicted;

determining from K-band radar data the presence of active aerosols, which are indicative of precursory earthquake activity;

refining the geo-spatial and temporal predictions relating to the impending earthquake based on knowledge that the earthquake will be focused near the region of maximum Nexrad and K-band clutter.

18. A system for processing geospheric data to predict a large entity event, said system comprising:

a plurality of receiving stations for acquiring data, the acquired data comprising one or more of high orbiting radio-tomopraphy (HORT), low orbiting radio-tomopraphy (LORT), radar clutter, and cellular telephone signal fading and noise data;

means for correlating said acquired data with secondary data, wherein the secondary data comprises at least one of archival data, magnetospheric data, seismic data from a region of interest, solar data, data relating to man-made activities that may influence the prediction, and other cosmic, solar, geophysical, or terrestrial data which may have an impact on the prediction;

means for comparing said correlated data with archived data sets, in an iterative process, revisiting the correlated data to remove false signals or irrelevant noise and to extract meaningful trends; and means for evaluating said data for presence of large entity event precursors.

19. The system of claim 18, further comprising means for disseminating an alert if it is determined from said evaluated data that a large entity event is imminent.

20. The system of claim 18, wherein said large entity event is an earthquake.

21. The system of claim 18, wherein said large entity event is a seaquake.

22. The system of claim 18, wherein said large entity event is a tsunami.

* * * * *